United States Patent
Yoshino et al.

(10) Patent No.: US 8,000,563 B2
(45) Date of Patent: Aug. 16, 2011

(54) INTERPOLATION DEVICE

(75) Inventors: Kyouji Yoshino, Tokyo (JP); Motonobu Tonomura, Tokyo (JP); Hajime Seino, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 1004 days.

(21) Appl. No.: 11/891,207

(22) Filed: Aug. 9, 2007

(65) Prior Publication Data

US 2008/0056618 A1    Mar. 6, 2008

(30) Foreign Application Priority Data

Aug. 31, 2006    (JP) ................. 2006-235169

(51) Int. Cl.
*G06K 9/00* (2006.01)
*G06K 9/40* (2006.01)
*G06K 9/32* (2006.01)
*G06F 7/38* (2006.01)

(52) U.S. Cl. ........ 382/300; 382/162; 382/254; 382/293; 382/298; 708/290

(58) Field of Classification Search ................. 382/162, 382/254, 293, 298, 300; 708/290

See application file for complete search history.

(56) References Cited

U.S. PATENT DOCUMENTS

| | | | |
|---|---|---|---|
| 7,382,489 B2 * | 6/2008 | Curry et al. | 358/1.9 |
| 7,551,805 B2 * | 6/2009 | Namie et al. | 382/300 |
| 2005/0201616 A1 | 9/2005 | Malvar et al. | |
| 2006/0013499 A1 * | 1/2006 | Namie et al. | 382/254 |

FOREIGN PATENT DOCUMENTS

JP    2005-269645 A    9/2005

* cited by examiner

*Primary Examiner* — John B Strege
*Assistant Examiner* — Bernard Krasnic
(74) *Attorney, Agent, or Firm* — Ladas & Parry LLP

(57) ABSTRACT

An interpolation process for scaling is performed directly on raw data from an image pickup apparatus. Raw data, constituted by inputted Bayer pattern array are as a set of pixels positioned on respective lattice points on a square lattice. A position of an interpolation point Q is designated by an upper address that indicates a lattice point near the upper left and a lower address that indicates a position inside a lattice frame, a specific color is designated for which a pixel value is to be determined. An interpolation reference frame is determined, formed of a smallest square, which contains the interpolation point Q and with which the four vertices are formed by lattice points of the designated color, and an interpolation origin, constituted by the upper left lattice point of the interpolation reference frame, interpolation proportions d* and e* are determined. An interpolation calculation is performed.

16 Claims, 23 Drawing Sheets

R-COLOR RAW DATA

R-COLOR PLANE DATA

B-COLOR RAW DATA

B-COLOR PLANE DATA

G-COLOR RAW DATA

G-COLOR PLANE DATA

POSITION ORIGIN α (2i, 2j)

INTERPOLATION POINT Q:
UPPER ADDRESS (X, Y)
LOWER ADDRESS (x, y)

WITH $0 \leq x < 1$
AND $0 \leq y < 1$

FIG. 30

|   | POSITION ORIGIN (ADDRESS (X, Y)) | DETAILED POSITION (ADDRESS (x, y)) | INTERPOLATION ORIGIN (ADDRESS (X*, Y*)) | INTERPOLATION PROPORTIONS (d*, e*) |
|---|---|---|---|---|
| R | $\alpha(2i, 2j)$ | | $\beta(2i, 2j)$ | $\left(\frac{x}{2}, \frac{y}{2}\right)$ |
| R | $\alpha(2i+1, 2j)$ | | $\beta(2i, 2j)$ | $\left(\frac{x+1}{2}, \frac{y}{2}\right)$ |
| R | $\alpha(2i, 2j+1)$ | | $\beta(2i, 2j)$ | $\left(\frac{x}{2}, \frac{y+1}{2}\right)$ |
| R | $\alpha(2i+1, 2j+1)$ | | $\beta(2i, 2j)$ | $\left(\frac{x+1}{2}, \frac{y+1}{2}\right)$ |
| B | $\alpha(2i, 2j)$ | | $\beta(2i-1, 2j-1)$ | $\left(\frac{x+1}{2}, \frac{y+1}{2}\right)$ |
| B | $\alpha(2i+1, 2j)$ | | $\beta(2i+1, 2j-1)$ | $\left(\frac{x}{2}, \frac{y+1}{2}\right)$ |
| B | $\alpha(2i, 2j+1)$ | | $\beta(2i-1, 2j+1)$ | $\left(\frac{x+1}{2}, \frac{y}{2}\right)$ |
| B | $\alpha(2i+1, 2j+1)$ | | $\beta(2i+1, 2j+1)$ | $\left(\frac{x}{2}, \frac{y}{2}\right)$ |
| G | $\alpha(2i, 2j)$ | $y \leq -x+1$ | $\beta(2i, 2j-1)$ | $\left(\frac{y+x+1}{2}, \frac{y-x+1}{2}\right)$ |
| G | $\alpha(2i, 2j)$ | $y > -x+1$ | $\beta(2i+1, 2j)$ | $\left(\frac{y+x-1}{2}, \frac{y-x+1}{2}\right)$ |
| G | $\alpha(2i+1, 2j)$ | $y \leq x$ | $\beta(2i+2, 2j-1)$ | $\left(\frac{y+x}{2}, \frac{y-x+2}{2}\right)$ |
| G | $\alpha(2i+1, 2j)$ | $y > x$ | $\beta(2i+1, 2j)$ | $\left(\frac{y+x}{2}, \frac{y-x}{2}\right)$ |
| G | $\alpha(2i, 2j+1)$ | $y \leq x$ | $\beta(2i+1, 2j)$ | $\left(\frac{y+x}{2}, \frac{y-x+2}{2}\right)$ |
| G | $\alpha(2i, 2j+1)$ | $y > x$ | $\beta(2i, 2j+1)$ | $\left(\frac{y+x}{2}, \frac{y-x}{2}\right)$ |
| G | $\alpha(2i+1, 2j+1)$ | $y \leq -x+1$ | $\beta(2i+1, 2j)$ | $\left(\frac{y+x+1}{2}, \frac{y-x+1}{2}\right)$ |
| G | $\alpha(2i+1, 2j+1)$ | $y > -x+1$ | $\beta(2i+2, 2j+1)$ | $\left(\frac{y+x-1}{2}, \frac{y-x+1}{2}\right)$ |

$$\begin{pmatrix} Kxr = Hx/2 \\ Kyr = Hy/2 \end{pmatrix}$$

$$\begin{pmatrix} Kxb = (Hx-1)/2 \\ Kyb = (Hy-1)/2 \end{pmatrix}$$

$$\begin{pmatrix} Kxg=(Hy+Hx-1)/2 \\ Kyg=(Hy-Hx+1)/2 \end{pmatrix}$$

INTERPOLATION DEVICE

CROSS REFERENCE TO RELATED APPLICATIONS

This application claims priority to Japanese application 2006-235169, filed on Aug. 31, 2006.

BACKGROUND OF THE INVENTION

The present invention relates to a device that carries out an interpolation of pixel values for performing magnification, reduction, or other scaling process on an image obtained by a color image pickup apparatus, and particularly relates to an interpolation art suited for performing an interpolation calculation on an image taken by a single-panel color image pickup apparatus, in which a Bayer pattern array is employed as an array of light receiving elements.

Light receiving elements generally have detection sensitivities that are wavelength dependent, and each light receiving element is made to serve as an element for detecting light of a wavelength range for which its sensitivity is highest. Thus in a color image pickup apparatus, for example, a total of three types of light receiving elements that are respectively associated with the three primary colors of R (red), G (green), and B (blue) are respectively positioned in plurality on an image pickup surface. With a single-panel color image pickup apparatus, the light receiving elements for the respective colors must be respectively positioned periodically according to predetermined regular patterns on the same image pickup surface. For example, in the case of a Bayer pattern array, which is used most generally, the respective light receiving elements for the three primary colors of R (red), G (green), and B (blue) are positioned according to the pattern, RGRGRGRGR . . . , along each odd row of a square lattice and according to the pattern, GBGBGBGBGB . . . , along each even row. A honeycomb array, with which the Bayer pattern array is rotated by 45° is also used.

Thus with a single-panel color image pickup apparatus, even if m rows and n columns of light receiving elements are arrayed on the image pickup surface, because each individual light receiving element can only output a pixel value concerning a specific color, a color image constituted of m rows and n columns cannot be obtained from just the pixel values output from the respective light receiving elements of the color image pickup apparatus. For example, because a light receiving element for the R-color outputs only a pixel value for the R color, pixel values for the G and B colors will be missing with the pixel corresponding to the position of this light receiving element. A process of using pixel values, which are positioned in a surrounding region and correspond to the same colors as the missing colors, to interpolate the pixel values of the missing colors is thus performed. Such an interpolation process is generally called "demosaicing."

The abovementioned "demosaicing" process is normally performed by a linear interpolation, such as determining the average of two or four pixel values in the surroundings of the pixel subject to interpolation. However, with a simple linear interpolation process, a problem occurs in edge enhancement of an image and thus, for example, a "demosaicing" process method, with which the edge enhancement problem is prevented by calculating correction terms and performing further interpolation, is disclosed in Japanese Patent Publication No. 2005-269645A.

Because the abovementioned "demosaicing" process is strictly an interpolation process of interpolating the pixel values of missing colors for each individual pixel, the arrangement of the pixel array (definition of the image) does not change after the process. Thus when magnification, reduction, or other scaling process is performed on an image, an interpolation process for the scaling must be performed anew. This interpolation process is a process of defining new pixels at positions at which light receiving elements do not exist at all on the image pickup surface and determining the pixel values of the new pixels using the pixel values of the existing surrounding pixels. As such an interpolation process for performing scaling, a simple linear interpolation calculation may be performed or a cubic interpolation calculation or other high-order interpolation calculation may be performed.

Thus conventionally, a process was employed in which an interpolation process for demosaicing is performed on so-called raw data output from the respective light receiving elements of a color image pickup apparatus to prepare plane data without missing portions for the respective colors and thereafter, an interpolation process for scaling is executed on the respective color plane data. However, with this conventional method, because a simple liner interpolation calculation is performed as the interpolation process for demosaicing, even if a high-order interpolation calculation, such as a cubic interpolation calculation, is performed as the interpolation process for scaling thereafter, the essential effects of the high-order interpolation calculation cannot be obtained. That is, because a rough interpolation is performed at the demosaicing stage, even if interpolation of high precision is performed at the scaling stage, the proper effects are not obtained. A high-grade magnified image thus cannot be obtained.

SUMMARY OF THE INVENTION

Thus an object of the present invention is to provide an interpolation device that can perform an interpolation process for scaling directly on data before performing a demosaicing process.

(1) The first feature of the present invention resides in an interpolation device that determines pixel values of m types of colors of an interpolation point Q at any position on an XY coordinate system by interpolation calculation based on individual pixel values obtained by an image pickup apparatus, in which a total of m types of light receiving elements, each having functions of detecting, in regard to a received light, a light amount of a specific color and outputting the light amount as a pixel value, are respectively positioned periodically according to predetermined regular patterns at positions of specific lattice points on a square lattice defined on the XY coordinate system, the interpolation device comprising:

a pixel value input unit that inputs the pixel values output from the individual light receiving elements that constitute the image pickup apparatus;

a pixel value storage unit that stores the input pixel values in the form of a pixel value array, with which the pixel values are associated with positions of respective lattice points;

an interpolation point designating unit that, in regard to the interpolation point Q for which pixel values are to be determined by interpolation calculation, determines a smallest square which contains the interpolation point Q and whose four vertices are constituted by the lattice points, as a position reference frame, determines, as a position origin $\alpha$, a vertex, which, among the four vertices constituting the position reference frame, occupies a relative position that has been determined in advance, and designates a position of the interpolation point Q by an upper address (X, Y) that indicates a position of the position origin $\alpha$ in the square lattice and a lower address (x, y) that indicates the position of the interpolation point Q in an xy coordinate system defined as a local coordinate system inside the position reference frame;

a calculation target color designating unit that designates one of the m types of colors in turn as a calculation target color for which a pixel value is to be computed;

an interpolation reference frame determining unit that uses the upper address (X, Y) and the lower address (x, y) and a regular pattern of the calculation target color designated by the calculation target color designating unit to determine an interpolation reference frame, formed of a smallest square which contains the interpolation point Q and whose four vertices are constituted by lattice points, at which are positioned pixels corresponding to light receiving elements having a function of detecting the calculation target color, and determining, as an interpolation origin β, a vertex, which, among the four vertices forming the interpolation reference frame, occupies a relative position that has been determined in advance;

an interpolation proportion determining unit that, when a direction parallel to a first "pair of opposing sides" that constitute the interpolation reference frame is set as a first direction and a direction parallel to a second "pair of opposing sides" is set as a second direction, determines a distance d between the interpolation origin β and the interpolation point Q in regard to the first direction and a distance e in regard to the second direction on the basis of the upper address (X, Y) and the lower address (x, y) and determines values d* and e*, with which the determined distances d and e are normalized by a length of a side of the interpolation reference frame, respectively as an interpolation proportion in regard to the first direction and an interpolation proportion in regard to the second direction; and an interpolation calculation unit that reads the pixel values of at least the light receiving elements positioned at the four vertices of the interpolation reference frame as interpolation reference values from the pixel value storage unit and performs an interpolation calculation based on the interpolation reference values and the interpolation proportions d* and e* to determine a pixel value of the interpolation point Q for each calculation target color.

(2) The second feature of the present invention resides in the interpolation device according to the first feature, wherein the interpolation point designating unit uses integer portions of coordinate values, on the XY coordinate system, of the interpolation point Q as the upper address (X, Y) and uses decimal portions of the coordinate values as the lower address (x, y), wherein vertical and lateral lattice intervals of the square lattice defined on the XY coordinate system are set to 1.

(3) The third feature of the present invention resides in the interpolation device according to the second feature, wherein the interpolation point designating unit automatically designates, on the basis of vertical direction and lateral direction magnification factors provided from the exterior, a plurality of interpolation points Q, for each of which interpolation calculation is required, at pitches that are the inverse of the magnification factors.

(4) The fourth feature of the present invention resides in the interpolation device according to the second feature, wherein the interpolation reference frame determining unit determines the interpolation origin β using one of four mutually different interpolation origin determining algorithms according to whether X in the designated upper address (X, Y) is even or odd and whether Y in the designated upper address (X, Y) is even or odd.

(5) The fifth feature of the present invention resides in the interpolation device according to the first feature, wherein the interpolation reference frame determining unit determines the interpolation reference frame using the upper address (X, Y) when the calculation target color is designated to be a color having a pixel array, with which is formed an interpolation reference frame having respective sides that are parallel to the lattice line of the square lattice, and determines the interpolation reference frame using both the upper address (X, Y) and the lower address (x, y) when the calculation target color is designated to be a color having a pixel array, with which is formed an interpolation reference frame having respective sides that are not parallel to the lattice lines of the square lattice.

(6) The sixth feature of the present invention resides in the interpolation device according to the first feature, wherein the interpolation reference frame determining unit selects, from among vertices of the smallest Y coordinate value among the four vertices forming the interpolation reference frame, a vertex of the smallest X coordinate value and determines a selected vertex as the interpolation origin β.

(7) The seventh feature of the present invention resides in the interpolation device according to the first feature, wherein the interpolation reference frame determining unit uses a predetermined regular pattern based on a Bayer pattern array to determine the interpolation reference frame, and the interpolation calculating unit determines the interpolation reference values to be read by taking into consideration the predetermined regular pattern based on the Bayer pattern array.

(8) The eighth feature of the present invention resides in the interpolation device according to the seventh feature, wherein in regard to three primary colors R, G, and B, a Bayer pattern array, with which odd-number rows have an RGRGRGRGR . . . arrangement and even-number rows have a GBGBGBGBGB . . . arrangement, is used.

(9) The ninth feature of the present invention resides in the interpolation device according to the eighth feature, wherein the interpolation point designating unit uses integer portions of coordinate values, on the XY coordinate system, of the interpolation point Q as the upper address (X, Y) and uses decimal portions of the coordinate values as the lower address (x, y), wherein vertical and lateral lattice intervals of the square lattice defined on the XY coordinate system are set to 1.

(10) The tenth feature of the present invention resides in the interpolation device according to the ninth feature, wherein when i and j are integers, the interpolation reference frame determining unit determines a position of a lattice point indicated by an address (2i, 2j) as the interpolation origin β when the designated calculation target color is the R-color and the designated upper address (X, Y) is expressed in a form of (2i, 2j), determines a position of a lattice point indicated by the address (2i, 2j) as the interpolation origin β when the designated calculation target color is the R-color and the designated upper address (X, Y) is expressed in a form of (2i+1, 2j), determines a position of a lattice point indicated by the address (2i, 2j) as the interpolation origin β when the designated calculation target color is the R-color and the designated upper address (X, Y) is expressed in a form of (2i, 2j+1), determine a position of a lattice point indicated by the address (2i, 2j) as the interpolation origin β when the designated calculation target color is the R-color and the designated upper address (X, Y) is expressed in a form of (2i+1, 2j+1), determines a position of a lattice point indicated by an address (2i−1, 2j−1) as the interpolation origin β when the designated calculation target color is the B-color and the designated upper address (X, Y) is expressed in a form of (2i, 2j), determines a position of a lattice point indicated by an address (2i+1, 2j−1) as the interpolation origin β when the designated calculation target color is the B-color and the designated upper address (X, Y) is expressed in a form of (2i+1, 2j), determines a position of a lattice point indicated by an address (2i−1, 2j+1) as the interpolation origin β when the designated calculation target color is the B-color and the designated upper address (X, Y) is expressed in a form of (2i, 2j+1), determines a position of a lattice point indicated by an address (2i+1, 2j+1) as the interpolation origin β when the designated calculation target color is the B-color and the designated upper address (X, Y) is expressed in a form of (2i+1, 2j+1), determines a position of a lattice point indicated by an address (2i, 2j−1) as the interpolation origin β when the designated calculation target color is the G-color, the designated upper address (X, Y) is expressed in a form of (2i, 2j), and the designated lower address (x, y) meets a condition, $y \leq -x+1$, determines a position of a lattice point indicated by an address (2i+1, 2j) as the interpolation origin β when the designated calculation target color is the G-color, the designated upper address (X, Y) is expressed in a form of (2i, 2j), and the designated lower address (x, y) meets a condition, $y > -x+1$, determines a position of a lattice point indicated by an address (2i+2, 2j−1) as the interpolation origin β when the designated calculation target color is the G-color, the designated upper address (X, Y) is expressed in a form of (2i+1, 2j), and the designated lower address (x, y) meets a condition, $y \leq x$, determines a position of a lattice point indicated by the address (2i+1, 2j) as the interpolation origin β when the designated calculation target color is the G-color, the designated upper address (X, Y) is expressed in a form of (2i+1, 2j), and the designated lower address (x, y) meets a condition, $y > x$, determines a position of a lattice point indicated by the address (2i+1, 2j) as the interpolation origin β when the designated calculation target color is the G-color, the designated upper address (X, Y) is expressed in a form of (2i, 2j+1), and the designated lower address (x, y) meets a condition, $y \leq x$, determines a position of a lattice point indicated by the address (2i, 2j+1) as the interpolation origin β when the designated calculation target color is the G-color, the designated upper address (X, Y) is expressed in a form of (2i, 2j+1), and the designated lower address (x, y) meets a condition, $y > x$, determines a position of a lattice point indicated by the address (2i+1, 2j) as the interpolation origin β when the designated calculation target color is the G-color, the designated upper address (X, Y) is expressed in a form of (2i+1, 2j+1), and the designated lower address (x, y) meets a condition, $y \leq -x+1$, and determines a position of a lattice point indicated by the address (2i+2, 2j+1) as the interpolation origin β when the designated calculation target color is the G-color, the designated upper address (X, Y) is expressed in a form of (2i+1, 2j+1), and the designated lower address (x, y) meets a condition, $y > -x+1$.

(11) The eleventh feature of the present invention resides in the interpolation device according to the ninth feature, wherein when i and j are integers, the interpolation proportion determining unit determines the respective interpolation proportions d* and e* by using the designated lower address (x, y) to perform calculations, $d^* = x/2$ and $e^* = y/2$, when the designated calculation target color is the R-color and the designated upper address (X, Y) is expressed in a form of (2i, 2j), determines the respective interpolation proportions d* and e* by using the designated lower address (x, y) to perform calculations, $d^* = (x+1)/2$ and $e^* = y/2$, when the designated calculation target color is the R-color and the designated upper address (X, Y) is expressed in a form of (2i+1, 2j), determines the respective interpolation proportions d* and e* by using the designated lower address (x, y) to perform calculations, $d^* = x/2$ and $e^* = (y+1)/2$, when the designated calculation target color is the R-color and the designated upper address (X, Y) is expressed in a form of (2i, 2j+1), determines the respective interpolation proportions d* and e* by using the designated lower address (x, y) to perform calculations, $d^* = (x+1)/2$ and $e^* = (y+1)/2$, when the designated calculation target color is the R-color and the designated upper address (X, Y) is expressed in a form of (2i+1, 2j+1), determines the respective interpolation proportions d* and e* by using the designated lower address (x, y) to perform calculations, $d^* = (x+1)/2$ and $e^* = (y+1)/2$, when the designated calculation target color is the B-color and the designated upper address (X, Y) is expressed in a form of (2i, 2j), determines the respective interpolation proportions d* and e* by using the designated lower address (x, y) to perform calculations, $d^* = x/2$ and $e^* = (y+1)/2$, when the designated calculation target color is the B-color and the designated upper address (X, Y) is expressed in a form of (2i+1, 2j), determines the respective interpolation proportions d* and e* by using the designated lower address (x, y) to perform calculations, $d^* = (x+1)/2$ and $e^* = y/2$, when the designated calculation target color is the B-color and the designated upper address (X, Y) is expressed in a form of (2i, 2j+1), determines the respective interpolation proportions d* and e* by using the designated lower address (x, y) to perform calculations, $d^* = x/2$ and $e^* = y/2$, when the designated calculation target color is the B-color and the designated upper address (X, Y) is expressed in a form of (2i+1, 2j+1), determines the respective interpolation proportions d* and e* by using the designated lower address (x, y) to perform calculations, $d^* = (y+x+1)/2$ and $e^* = (y-x+1)/2$, when the designated calculation target color is the G-color, the designated upper address (X, Y) is expressed in a form of (2i, 2j), and the designated lower address (x, y) meets a condition, $y \leq -x+1$, determines the respective interpolation proportions d* and e* by using the designated lower address (x, y) to perform calculations, $d^* = (y+x-1)/2$ and $e^* = (y-x+1)/2$, when the designated calculation target color is the G-color, the designated upper address (X, Y) is expressed in a form of (2i, 2j), and the designated lower address (x, y) meets a condition, $y > -x+1$, determines the respective interpolation proportions d* and e* by using the designated lower address (x, y) to perform calculations, $d^* = (y+x)/2$ and $e^* = (y-x+2)/2$, when the designated calculation target color is the G-color, the designated upper address (X, Y) is expressed in a form of (2i+1, 2j), and the designated lower address (x, y) meets a condition, $y \leq x$, determines the respective interpolation proportions d* and e* by using the designated lower address (x, y) to perform calculations, $d^* = (y+x)/2$ and $e^* = (y-x)/2$, when the designated calculation target color is the G-color, the designated upper address (X, Y) is expressed in a form of (2i+1, 2j), and the designated lower address (x, y) meets a condition, y>x, determines the respective interpolation proportions d* and e* by using the designated lower address (x, y) to perform calculations, d*=(y+x)/2 and e*=(y−x+2)/2, when the designated calculation target color is the G-color, the designated upper address (X, Y) is expressed in a form of (2i, 2j+1), and the designated lower address (x, y) meets a condition, y≦x, determines the respective interpolation proportions d* and e* by using the designated lower address (x, y) to perform calculations, d*=(y+x)/2 and e*=(y−x)/2, when the designated calculation target color is the G-color, the designated upper address (X, Y) is expressed in a form of (2i, 2j+1), and the designated lower address (x, y) meets a condition, y>x, determines the respective interpolation proportions d* and e* by using the designated lower address (x, y) to perform calculations, d*=(y+x+1)/2 and e*=(y−x+1)/2, when the designated calculation target color is the G-color, the designated upper address (X, Y) is expressed in a form of (2i+1, 2j+1), and the designated lower address (x, y) meets a condition, y≦−x+1, and determines the respective interpolation proportions d* and e* by using the designated lower address (x, y) to perform calculations, d*=(y+x−1)/2 and e*=(y−x+1)/2, when the designated calculation target color is the G-color, the designated upper address (X, Y) is expressed in a form of (2i+1, 2j+1), and the designated lower address (x, y) meets a condition, y>−x+1.

(12) The twelfth feature of the present invention resides in the interpolation device according to the tenth or eleventh feature, wherein in a portion or all of the cases in which a conditional judgment concerning the lower address (x, y) is made, "<" is used in place of the "≦" in the conditional formulae and ">" is used in place of the "≧" in the conditional formulae.

(13) The thirteenth feature of the present invention resides in the interpolation device according to the first feature, wherein the interpolation calculation unit reads pixel values of light receiving elements positioned at four vertices of the interpolation reference frame as the interpolation reference values from the pixel value storage unit and performs a linear interpolation calculation based on four pixel values read and the interpolation proportions d* and e*.

(14) The fourteenth feature of the present invention resides in the interpolation device according to the first feature, wherein the interpolation calculation unit reads pixel values of light receiving elements positioned at a total of sixteen vertices, with which twelve surrounding vertices in surroundings of four vertices of the interpolation reference frame are added to said four vertices, as the interpolation reference values from the pixel value storage unit and performs a high-order interpolation calculation based on sixteen pixel values read and the interpolation proportions d* and e*.

(15) The fifteenth feature of the present invention resides in the interpolation device according to the first feature, wherein the pixel value input unit executes, in inputting respective individual pixel values, a process of extracting only pixel values of a specific color and repositioning said pixel values at positions of respective lattice points of a new square lattice, the pixel value storage unit stores pixel values for each individual color as a pixel array according to each individual color, the interpolation reference frame determining unit executes conversion processes to make the upper address (X, Y) and the lower address (x, y), designated by the interpolation point designating unit, compatible to the pixel arrays for the respective individual colors and determines the interpolation reference frames using respective converted addresses, and the interpolation proportion determining unit executes conversion processes to make the upper address (X, Y) and the lower address (x, y), designated by the interpolation point designating unit, compatible to the pixel arrays for the respective individual colors and determines the interpolation proportions using respective converted addresses.

With the interpolation device according to the present invention, on the basis of so-called raw data before the performing of a demosaicing process, that is, on the basis of an array of pixels, with missing colors, that are positioned on respective lattice point positions of a square lattice, pixel values of respective colors can be determined for an interpolation point Q defined at an arbitrary coordinate position. An interpolation process for scaling can thus be performed directly on the so-called raw data before the demosaicing process is performed. A magnified image of high grade can thus be obtained at the final stage.

BRIEF DESCRIPTION OF THE DRAWINGS

FIG. 30 is a table of relationships of position origins, detailed positions, interpolation origins, and interpolation proportions for performing the interpolation calculation process using the interpolation device according to the present invention.

DESCRIPTION OF THE PREFERRED EMBODIMENTS

The present invention shall now be described based on illustrated embodiments.

<<<Section 1. General, Conventional Interpolation Process>>>

Figure 1:
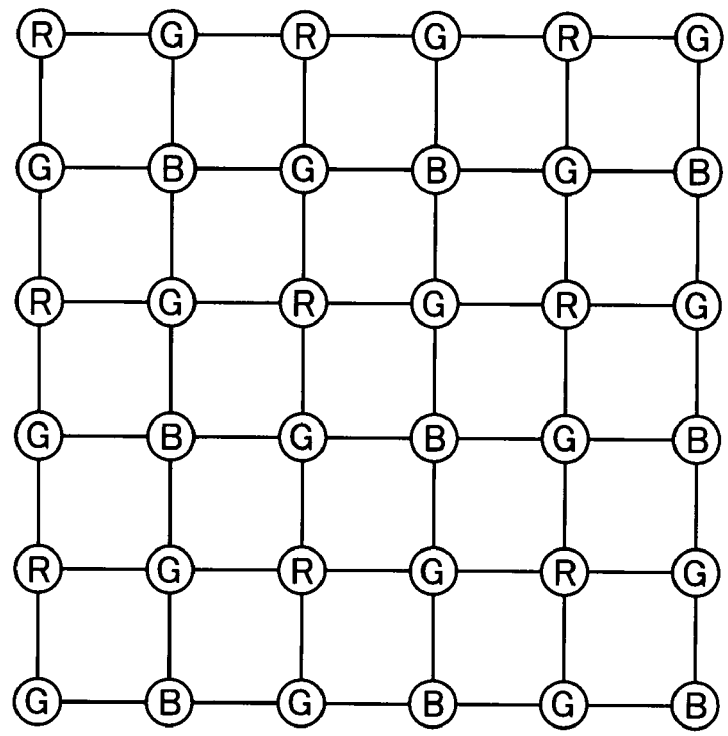
FIG. 1 is a plan view of an example of a pixel array based on a general Bayer pattern.

First, for the sake of description, a conventional interpolation process, performed on image data output from an image pickup device that employs a Bayer pattern array, which is used most generally presently, shall be described briefly. FIG. 1 is a plan view of an example of a pixel array based on a general Bayer pattern. Although here, a small, 6×6 pixel array is shown for the sake of illustration, a larger pixel array is obviously prepared on an image pickup surface of an actual image pickup apparatus. As illustrated, with this pixel array, a pixel of a predetermined color is positioned at each lattice point position of a square lattice. In the figure, "R" indicates a red pixel, "G" indicates a green pixel, and "B" indicates a blue pixel. In the case of a pixel array based on the general Bayer pattern, for the three primary colors of R, G, and B, pixels of the respective colors are positioned in the order of RGRGRGRGR . . . in each odd column and in the order of GBGBGBGBGB . . . in each even column as illustrated.

In the actual image pickup apparatus, a light receiving element, having good detection sensitivity for the wavelength band of the corresponding color, is positioned at the position of each pixel. That is, this image pickup apparatus is arranged by periodically positioning three types of light receiving elements, each having a function of detecting the amount of light of a specific color (R, G, or B) and outputting this amount as a pixel value, to a certain lattice point on a square lattice respectively in accordance to predetermined regular patterns. From each light receiving element, a signal that indicates the pixel value as the amount of detected light of a specific color is output. Thus for each of the pixels of the array shown in FIG. 1, a certain pixel value is provided to an interpolation device that processes the output signals from the image pickup apparatus.

Figure 2:
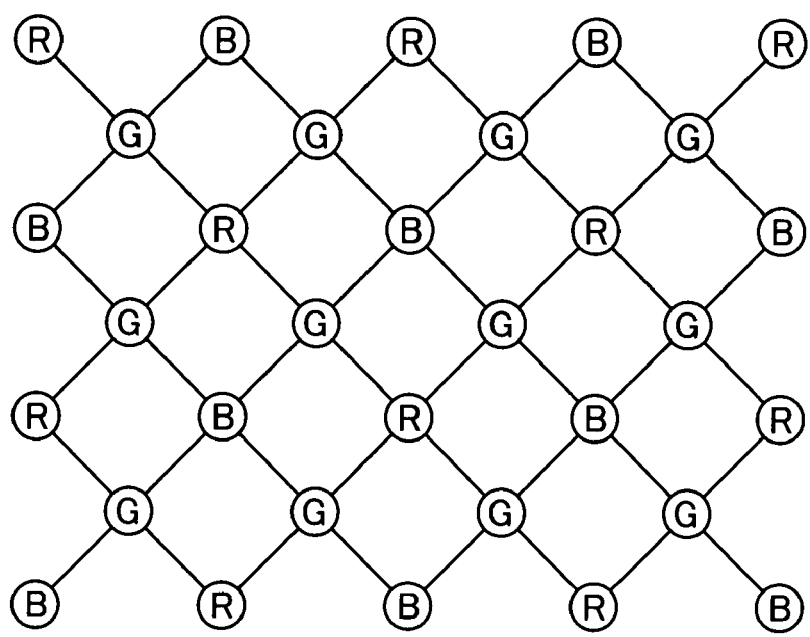
FIG. 2 is a plan view of an example of a honeycomb pixel array obtained by rotating the pixel array, shown in FIG. 1, by 45°.

An interpolation process that is performed on image data, obtained by the image pickup apparatus with the Bayer pattern pixel array shown in FIG. 1, shall now be described. When the Bayer pattern pixel array, shown in FIG. 1, is rotated by 45°, a honeycomb pixel array, such as shown in FIG. 2, is obtained. This honeycomb pixel array has a structure, with which the Bayer pattern pixel array shown in FIG. 1 is simply rotated, and the interpolation process described below is likewise applicable to this honeycomb pixel array as well.

Raw image data (so-called raw data) obtained from the image pickup apparatus are not complete color image data, and with each individual pixel, there exist missing colors. That is, in the case of the example shown in FIG. 1, each of the individual pixels positioned in six rows and six columns has a pixel value for only one color among the three primary colors and the remaining two colors are missing colors. For example, because the upper left pixel has only an R-color pixel value, B-color and G-color pixel values must be interpolated for this pixel to obtain proper color image data. As mentioned above, such an interpolation process is called a "demosaicing process."

Figure 3A:
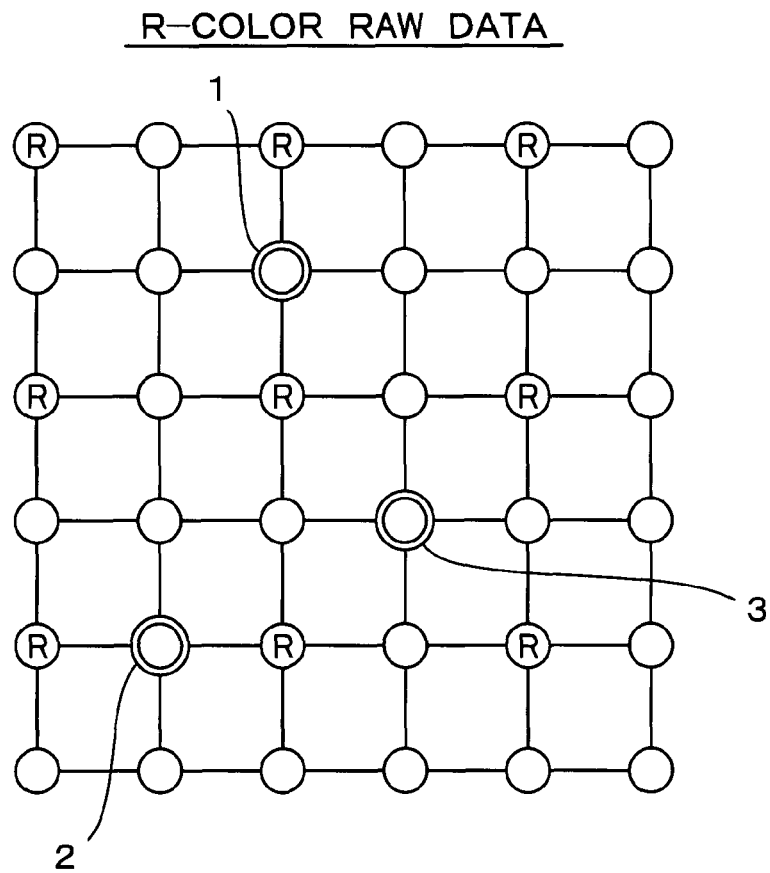
FIG. 3A is a plan view of R-color raw data, obtained by taking out just the red (R) pixels from the pixel array shown in FIG. 1.
Figure 3B:
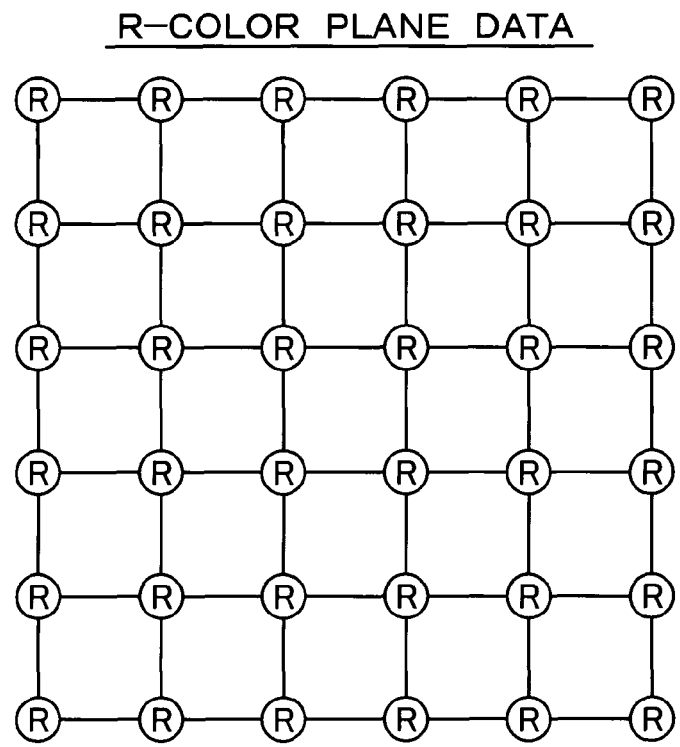
FIG. 3B is a plan view of R-color plane data, obtained by performing a demosaicing process on the R-color raw data.

FIG. 3A is a plan view of R-color raw data, obtained by taking out just the red (R) pixels from the pixel array shown in FIG. 1, and FIG. 3B is a plan view of an arrangement of R-color plane data, obtained by performing a demosaicing process on the R-color raw data. Although as shown in FIG. 3B, the R-color plane data are data constituted of the R-color pixel values of individual pixels positioned in six rows and six columns, because, as shown in FIG. 3A, pixel values are provided only to some of the pixels (the pixels indicated by R in the figure) at the stage of the R-color raw data, R-color pixel values must be provided anew to the other pixels (pixels indicated by white circles in the figure).

Normally, such a demosaicing process is performed by a linear interpolation, such as determining the average of two or four pixels in the surroundings of the pixel subject to interpolation. For example, the pixel value of a pixel 1, indicated by a double circle in figure. 3A, can be determined as the average value of the pixel values of a pair of pixels adjacent above and below, the pixel value of a pixel 2 can be determined as the average value of the pixel values of a pair of pixels adjacent to the left and right, and the pixel value of a pixel 3 can be determined as the average value of the pixel values of four diagonally adjacent pixels. By applying the demosaicing process on the R-color raw data, shown in FIG. 3A, by performing such a linear interpolation, the R-color plane data, shown in FIG. 3B, is obtained.

Figure 4A:
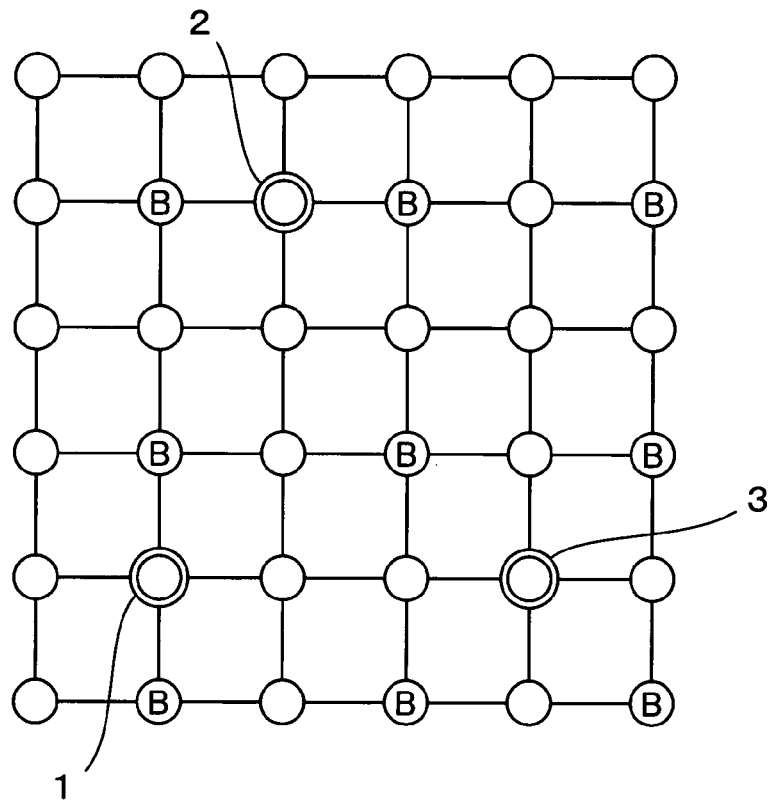
FIG. 4A is a plan view of B-color raw data, obtained by taking out just the blue (B) pixels from the pixel array shown in FIG. 1.
Figure 4B:
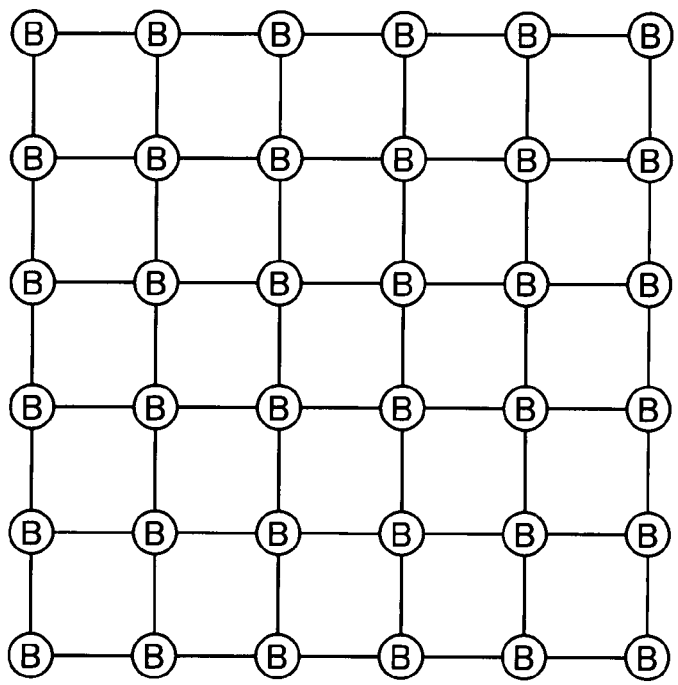
FIG. 4B is a plan view of B-color plane data, obtained by performing a demosaicing process on the B-color raw data.

Likewise, FIG. 4A is a plan view of an arrangement of B-color raw data, obtained by taking out just the blue (B) pixels from the pixel array shown in FIG. 1, and FIG. 4B is a plan view of an arrangement of B-color plane data, obtained by performing a demosaicing process on the B-color raw data. For example, the pixel value of a pixel 1, indicated by a double circle in FIG. 4A, can be determined as the average value of the pixel values of a pair of pixels adjacent above and below, the pixel value of a pixel 2 can be determined as the average value of the pixel values of a pair of pixels adjacent to the left and right, and the pixel value of a pixel 3 can be determined as the average value of the pixel values of four diagonally adjacent pixels in this case as well.

Figure 5A:
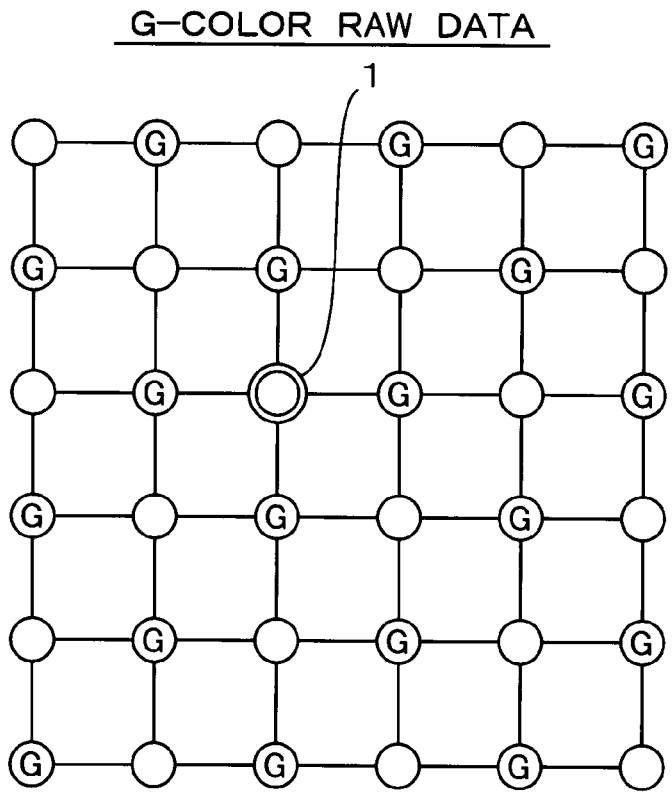
FIG. 5A is a plan view of G-color raw data, obtained by taking out just the green (G) pixels from the pixel array shown in FIG. 1.
Figure 5B:
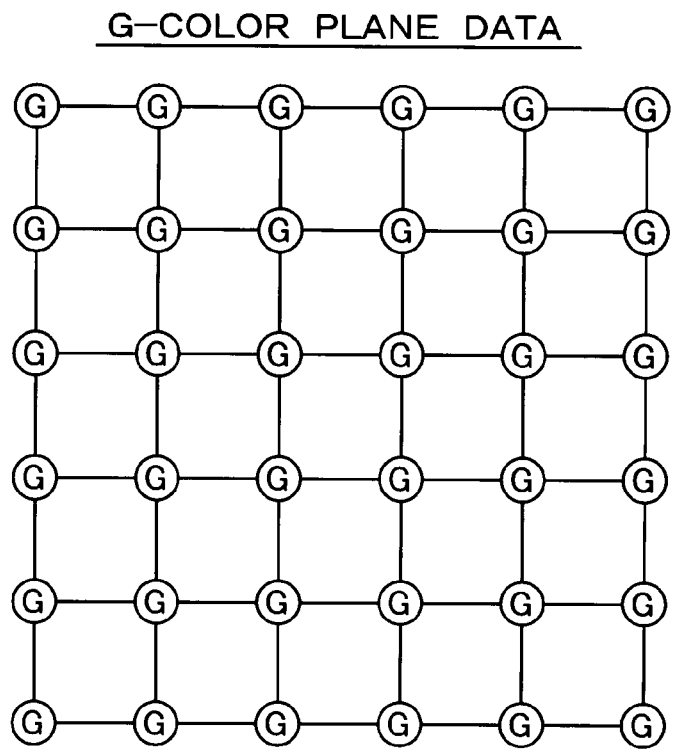
FIG. 5B is a plan view of G-color plane data, obtained by performing a demosaicing process on the G-color raw data.

Furthermore, FIG. 5A is a plan view of an arrangement of G-color raw data, obtained by taking out just the green (G) pixels from the pixel array shown in FIG. 1, and FIG. 5B is a plan view of an arrangement of G-color plane data, obtained by performing a demosaicing process on the G-color raw data. With a Bayer pattern array, because the G-color is positioned at twice the density of the R and B colors, interpolation for each pixel is performed by referencing four pixels in the surroundings. For example, the pixel value of a pixel 1, indicated by a double circle in FIG. 5A, can be determined as the average value of the pixel values of four pixels that are adjacent above, below, and to the left and right.

Respective color plane data, such as shown in FIGS. 3B, 4B, and 5B, are thus obtained by performing the demosaicing process on raw data, such as shown in FIG. 1. These three sets of plane data provide pixel values of all of the three primary colors R, G, and B for each individual pixel constituting the array of six rows and six columns and are the proper color image data.

When magnification, reduction, or other scaling process is to be performed on the image data thus obtained, an interpolation process for scaling must be performed. In many cases recently, a cubic interpolation calculation or other high-order interpolation calculation is performed instead of a simple linear interpolation calculation as the interpolation process for scaling.

Figure 6:
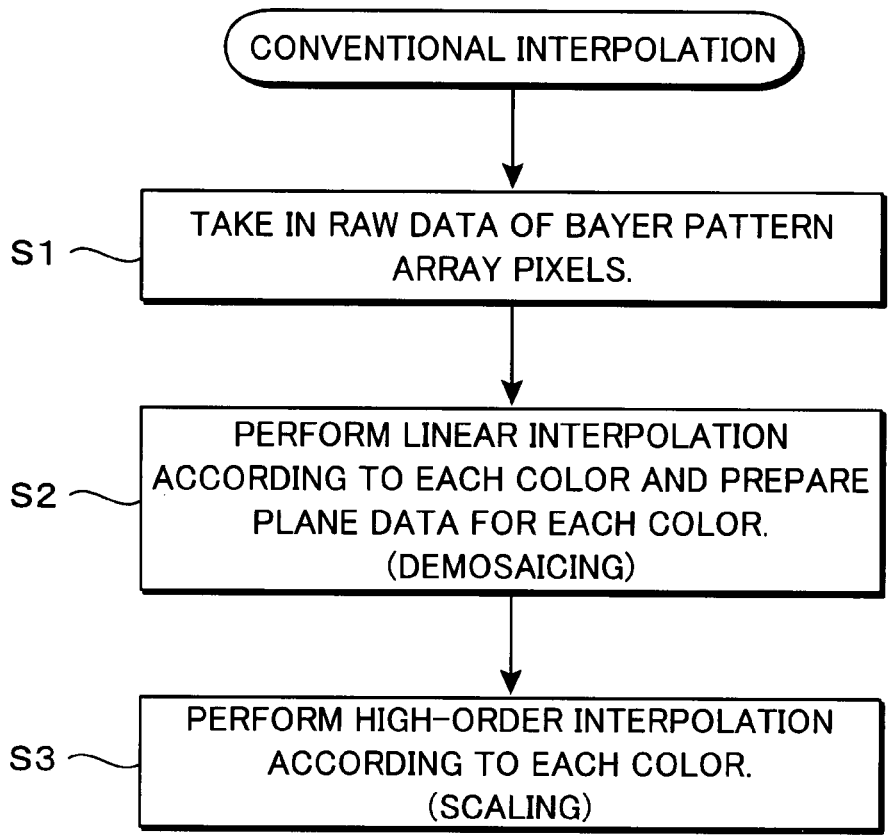
FIG. 6 is a flowchart of a procedure of an interpolation calculation process according to a conventional method.

FIG. 6 is a flowchart of a procedure of an interpolation calculation process according to a general, conventional method that includes scaling. First in step S1, the raw data of Bayer pattern array pixels are taken in. Specifically, the data of the pixel values of the individual pixels of an array, such as that shown in FIG. 1, are taken in. In step S2 that follows, linear interpolation is performed according to each color to prepare plane data of the respective colors. This process is called "demosaicing" as mentioned above. Then in step S3, a high-order interpolation process is performed on each color plane. This interpolation process is a process for "scaling."

Though the interpolation calculation becomes complex in comparison to a simple, linear interpolation process, a high-order interpolation process provides the merit that an interpolation image of high quality can be obtained. Basic concepts of such a high-order interpolation process shall now be described briefly with a model of a one-dimensional image, shown in FIG. 7. Here, it shall be deemed that four pixels $P(-1)$, $P(0)$, $P(1)$, and $P(2)$ are positioned as illustrated at a predetermined pitch along a one-dimensional coordinate axis and that a certain pixel value is defined for each pixel. When a scaling process of magnifying such a one-dimensional image by three times is to be performed, interpolation points (indicated in the figure by stars) are defined at positions, by which the interval between each pixel is divided equally into three, and for each interpolation point, a pixel value must be determined by interpolation calculation.

Here, a case of determining the pixel value of an interpolation point Q between the pixels $P(0)$ and $P(1)$ shall be considered. In a general linear interpolation, the pixel value of the interpolation point Q is determined based on the pixel values of the pair of pixels $P(0)$ and $P(1)$ that are adjacent at the respective sides. Specifically, if the pixel pitch is 1, the position coordinate of the pixel $P(0)$ is 0, the pixel value thereof is $f(0)$, the position coordinate of the pixel $P(1)$ is 1, the pixel value thereof is $f(1)$, the position coordinate of the interpolation point Q is x (x=1/3 in the present example), and the pixel value thereof is $f(x)$, the pixel value $f(x)$ of the interpolation point Q can be determined by the computation equation: $f(x)=(1-x)\cdot f(0)+x\cdot f(1)$. Here, x takes on a value in the range, $0<x<1$, and is generally referred to as an "interpolation proportion."

Meanwhile, with a high-order interpolation, interpolation based on a larger number of pixels is performed. For example, it is known that in a case where a high-order interpolation method called "four-point referencing bi-cubic spline interpolation" is employed to determine the pixel value $f(x)$ of the interpolation point Q in FIG. 7, the four pixels, $P(-1)$, $P(0)$, $P(1)$, and $P(2)$, are used as reference pixels, and using the respective pixel values $f(-1)$, $f(0)$, $f(1)$, and $f(2)$ of these reference pixels, the pixel value $f(x)$ of the interpolation point Q is obtained by the computation equation:

$$f(x) = 1/5 \cdot \{(-3f(-1) + 7f(0) - 7f(1) + 3f(2)) \cdot x^3 +$$
$$(7f(-1) - 13f(0) + 8f(1) - 2f(2)) \cdot x^2 +$$
$$(-4f(-1) + f(0) + 4f(1) - f(2)) \cdot x\} + f(0).$$

Figure 8:
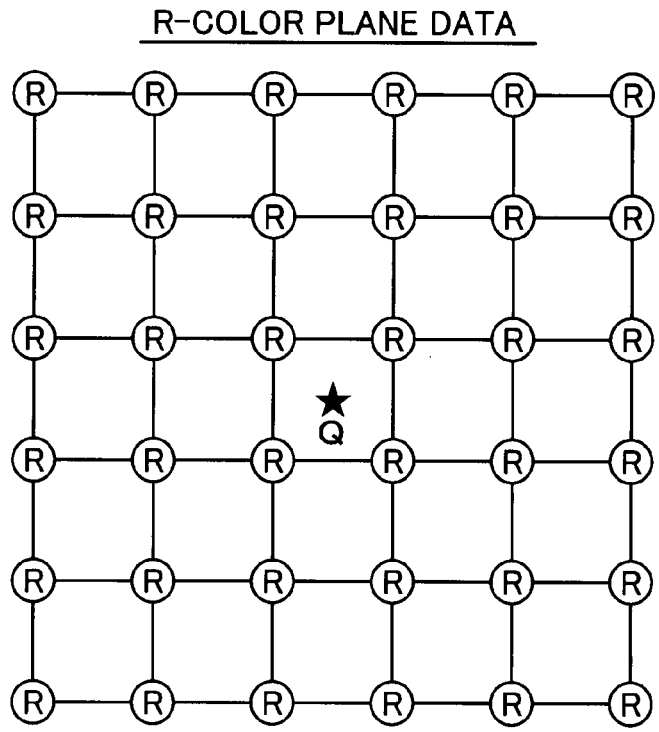
FIG. 8 is a plan view of a state in which an interpolation point Q is defined at an arbitrary position of the R-color plane data, shown in FIG. 3B.

This high-order interpolation method can be extendingly applied to a two-dimensional image by the following process. Here, a procedure for determining an R-color pixel value of an arbitrary interpolation point Q on a pixel array plane by "four-point referencing bi-cubic spline interpolation" when R-color plane data, such as shown in FIG. 8, have been obtained shall be described.

Figure 9:
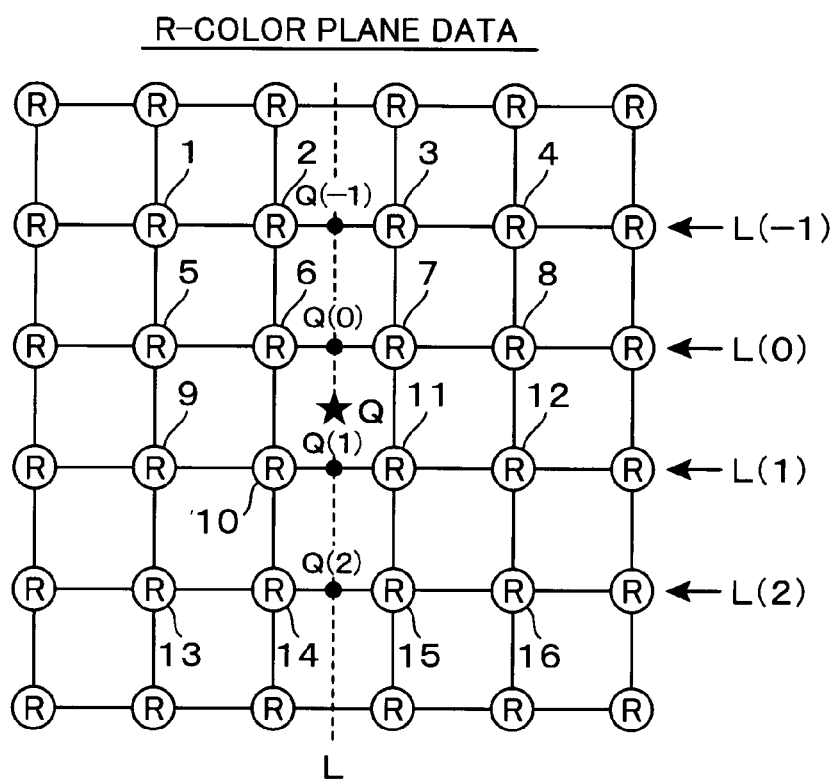
FIG. 9 is a plan view of a first half of a process for performing a high-order interpolation process for the interpolation point Q.

First, as shown in FIG. 9, an interpolation line L, which is parallel to vertical lattice lines of a square lattice, is drawn at the position of the interpolation point Q, and intermediate interpolation points Q(−1), Q(0), Q(1), and Q(2) are defined at positions of intersection with horizontal lattice lines L(−1), L(0), L(1), and L(2) of the square lattice. The respective pixel values of the intermediate interpolation points Q(−1), Q(0), Q(1), and Q(2) are then determined by interpolation using the high-order interpolation method for one-dimensional image that was described with FIG. 7. For example, the pixel value of the intermediate interpolation point Q(−1) can be determined by the calculation equation given above by using the method described with FIG. 7 and the respective pixel values of four pixels 1, 2, 3, and 4 that are aligned along the lattice line L(−1). Likewise, the pixel value of the intermediate interpolation point Q(0) can be determined using the respective pixel values of four pixels 5, 6, 7, and 8 that are aligned along the lattice line L(0), the pixel value of the intermediate interpolation point Q(1) can be determined using the respective pixel values of four pixels 9, 10, 11, and 12 that are aligned along the lattice line L(1), and the pixel value of the intermediate interpolation point Q(2) can be determined using the respective pixel values of four pixels 13, 14, 15, and 16 that are aligned along the lattice line L(2).

Figure 10:
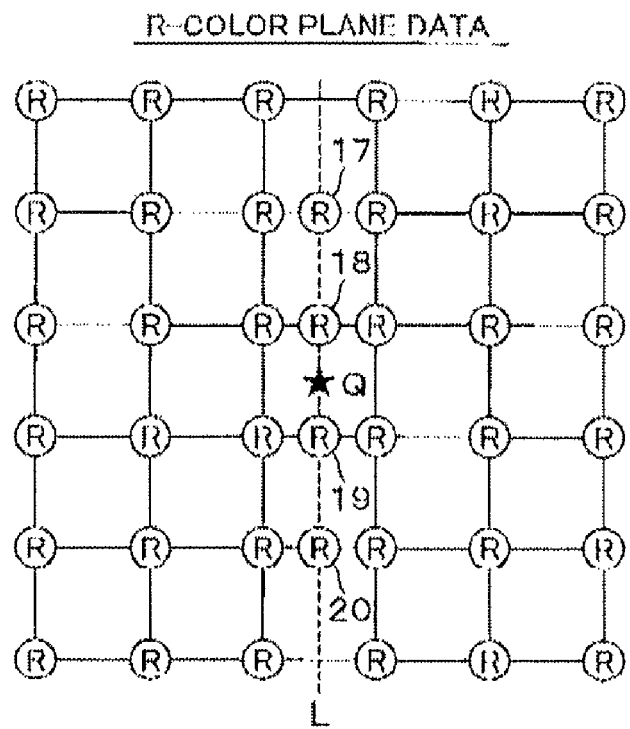
FIG. 10 is a plan view of a latter half of a process for performing the high-order interpolation process for the interpolation point Q.

When certain pixel values have thus been obtained by interpolation for the four intermediate interpolation points Q(−1), Q(0), Q(1), and Q(2), as shown in FIG. 10, new pixels 17, 18, 19, and 20, with the certain pixel values (R-color pixel values), can be defined respectively at the positions of the four intermediate interpolation points Q(−1), Q(0), Q(1), and Q(2). The relationship between the pixels 17, 18, 19, and 20 that are newly defined on the interpolation line L and the interpolation point Q is exactly the same as the relationship between the pixels P(−1), P(0), P(1), and P(2) and the interpolation point Q shown in FIG. 7. The pixel value of the interpolation point Q can thus be determined by the computation equation given above by using the method described with FIG. 7 and the respective pixel values of the four pixels 17, 18, 19, and 20.

If for any interpolation point Q on the pixel array surface of the plane data of each color, a certain pixel value can be determined by applying a high-order interpolation process as described above, a scaling process of performing magnification or reduction by an arbitrary factor can be performed. An example of a scaling process of magnifying a one-dimensional image by 3 times was described with FIG. 7, and a scaling process on a two-dimensional image can be performed in the same manner by defining interpolation points at the necessary locations and determining the pixel values for the respective interpolation points by interpolation. For example, if an original two-dimensional image is to be magnified by 3 times vertically and horizontally, a square that constitutes a single lattice frame is divided into nine parts by dividing it equally into three vertically and horizontally, an interpolation point is defined at each vertex (excluding the four vertices of the square before the division) of each square resulting from the division, a pixel value is determined for each interpolation point by the above-described interpolation process, and new pixels having these pixel values are defined.

Thus conventionally, when magnification, reduction, or other scaling process is to be applied to color image data obtained from an image pickup apparatus having light receiving elements that form a Bayer pattern array, first in step S2 in FIG. 6, a demosaicing process of performing a linear interpolation for each color to prepare the respective color plane data is performed, and then in step S3, scaling is performed by performing a high-order interpolation on each color plane. However, as mentioned above, with this conventional method, because a simple, linear interpolation calculation is performed in the demosaicing process of step S2, even if a cubic interpolation calculation or other high-order interpolation calculation is performed in the scaling process of step S3, the essential effects of the high-order interpolation calculation cannot be obtained and a scaling image of high grade cannot be obtained.

<<<Section 2. Basic Method of an Interpolation Calculation Process According to the Present Invention>>>

Figure 11:
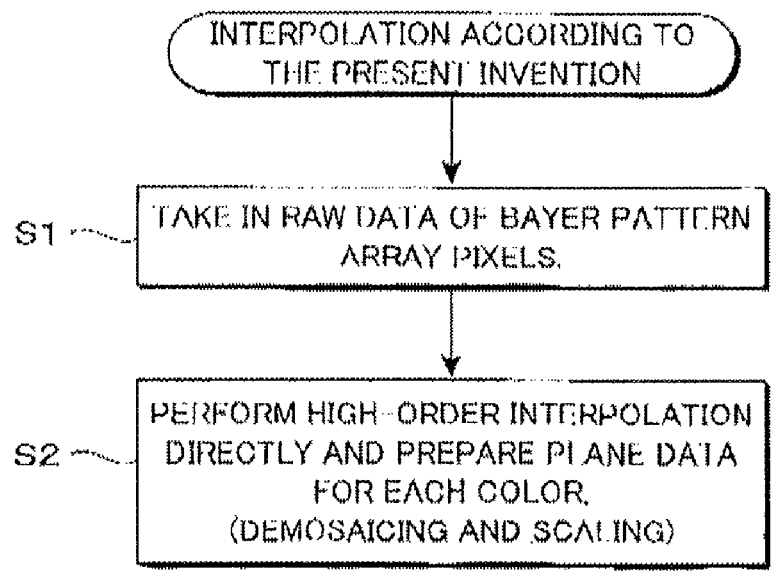
FIG. 11 is a flowchart of a procedure of an interpolation calculation process according to the present invention.

The present invention has been made to resolve the problem of the conventional method described in Section 1, and an object thereof is to enable an interpolation process for scaling to be performed directly on data before performing a demosaicing process. By using an interpolation device according to the present invention, an interpolation calculation can be performed according to a procedure shown in the flowchart of FIG. 11 in place of the conventional procedure shown in FIG. 6. In this procedure, first in step S1, raw data of Bayer pattern array pixels are taken in, and then in step S2 that follows, a high-order interpolation is performed directly on the raw data so that magnified or reduced plane data of the respective colors can be prepared. By using the interpolation device according to the present invention, an interpolation process that combines the conventional demosaicing process and scaling process can be performed.

Figure 12:
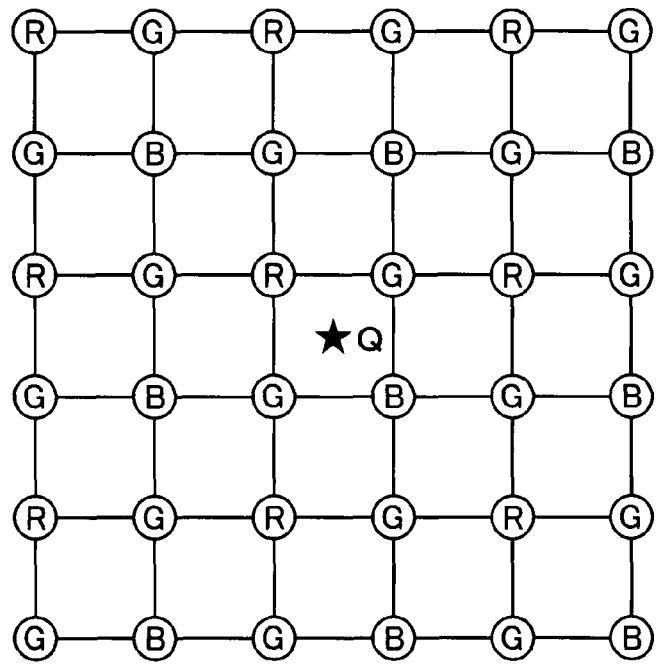
FIG. 12 is a plan view of a state in which an interpolation point Q is defined at an arbitrary position of a pixel array plane based on the Bayer pattern shown in FIG. 1.

A basic method of the interpolation calculation process performed by the interpolation device according to the present invention shall now be described. FIG. 12 is a plan view of a state in which an interpolation point Q is defined at an arbitrary position of a pixel array plane that is based on the Bayer pattern shown in FIG. 1. With the present invention, the respective pixel values of the R, G, and B colors can be determined directly for any interpolation point Q based on the raw data, which as illustrated, are in the state before demosaicing is performed.

Figure 13:
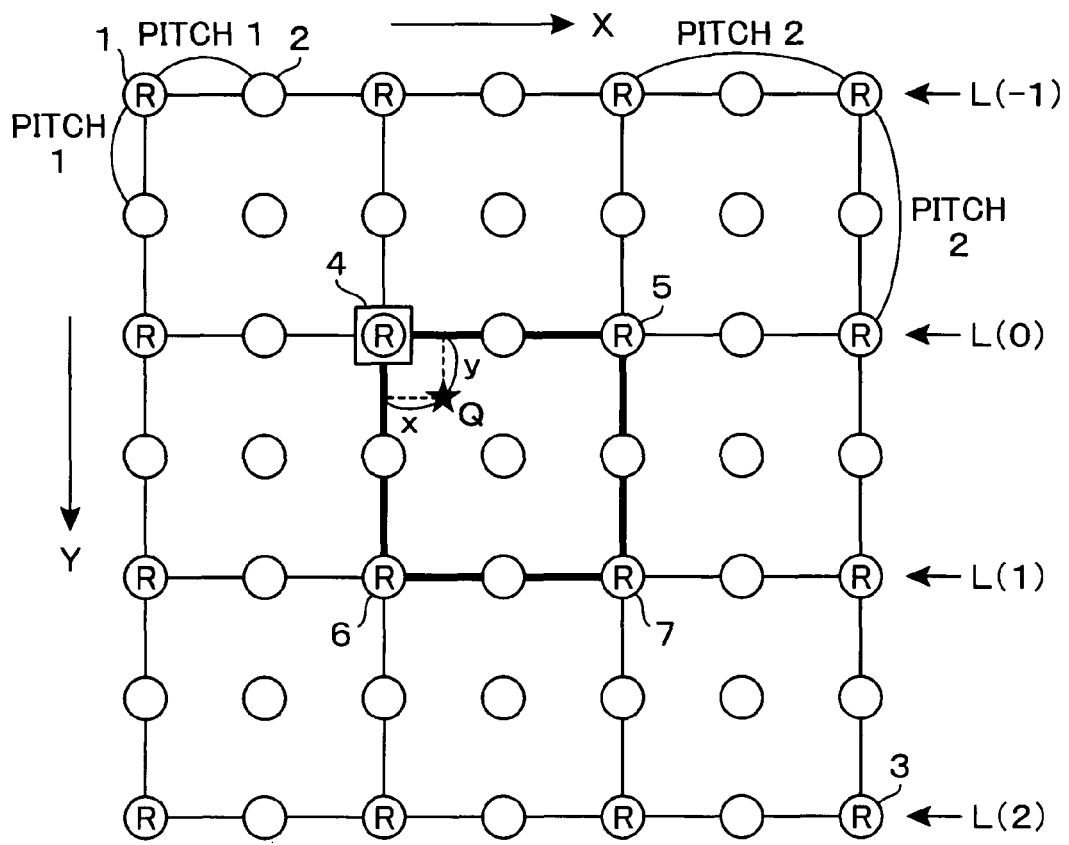
FIG. 13 is a plan view for describing a method according to the present invention for determining a pixel value of the R-color for the interpolation point Q shown in FIG. 12.

Here, a method for determining an R-color pixel value shall be described first. FIG. 13 is a plan view, with which just the R-color pixels have been extracted from the pixel array based on the Bayer pattern shown in FIG. 12. For the sake of description, a case of seven rows and seven columns, formed by adding one column to the right side of the pixel array shown in FIG. 12 and adding one row to the lower side, is shown in FIG. 13. In FIG. 13, each pixel indicated by R is an R-color pixel on the original Bayer pattern array and a white circle pixel is a pixel of a color other than the R-color on the original Bayer pattern array. The interpolation point Q, shown in FIG. 13, is a point at exactly the same position as the interpolation point Q, shown in FIG. 12.

With the pixel array of FIG. 13, a lattice line is intentionally drawn only at every other vertical row or horizontal column. That is, if the lattice line pitch of the original image shown in FIG. 12 is 1, the pitch of the lattice lines indicated clearly in FIG. 13 is 2. It can be understood from the square lattice of pitch 2 (referred to hereinafter as the "double-pitch square lattice") in FIG. 13 that all R-color pixels are positioned at lattice points of the double-pitch square lattice. The R-color pixels on the Bayer pattern array are thus positioned at respective lattice points of the double-pitch square lattice. If as illustrated, the respective lattice lines in the horizontal direction of the double-pitch square lattice are referred to as L(−1), L(0), L(1), and L(2), the R-color pixel value of the interpolation point Q shown in FIG. 13 can be determined, as in the case of determining the R-color pixel value of the interpolation point Q shown in FIG. 9, by performing the "four-point referencing bi-cubic spline interpolation" based on the pixel values of a total of 16 pixels positioned along the respective lattice lines L(−1), L(0), L(1), and L(2).

However, in order to perform such an interpolation calculation, the precise position of the interpolation point Q is necessary. With the present invention, an XY coordinate system is defined with an X-axis being set in a horizontal direction and a Y-axis being set in a vertical direction as shown in FIG. 13, and the position of each individual pixel is expressed by coordinates (X, Y). Here, X and Y take on integer values (0, 1, 2, . . . ). For example, a pixel 1 at the upper left corner in FIG. 13 is indicated by the coordinates, (0, 0), a pixel 2 adjacent to the right is indicated by the coordinates, (1, 0), and a pixel 3 at the lower right corner is indicated by the coordinates, (6, 6). Also here, among respective lattice frames (each being a square frame, with which the four sides are constituted of lattice lines) that constitute the double-pitch square lattice, the lattice frame that contains the interpolation point Q is referred to as the "interpolation reference frame," and the upper left corner point of this interpolation reference frame is referred to as the "interpolation origin." The precise position of the interpolation point Q can be indicated as (x, y), where x is the distance in the X-axis direction from a specific lattice point and y is the distance in the Y-axis direction from the specific lattice point. In the case of FIG. 13, the square frame having the positions of pixels 4, 5, 6, and 7 as the four vertices becomes the interpolation reference frame, and this is indicated by thick lines here. Also, the interpolation origin is at the position of the pixel 4. In the drawings of the present application, a pixel positioned at an interpolation origin shall be indicated by surrounding it with a small rectangle.

Thus with the example shown in FIG. 13, in order to perform a high-order interpolation process on the interpolation point Q to determine the R-color pixel value, the position of the interpolation Q is designated by an upper address (X, Y) and a lower address (x, y). With the example shown in FIG. 13, the upper address (X, Y) serves a role of indicating the position of the pixel 4 and specifically takes on the value, (2, 2) (as shall be described later, the upper address (X, Y) of the interpolation point Q does not necessarily match that of the interpolation origin). Meanwhile, the coordinate values of the lower address (x, y) indicate the precise position of the interpolation point Q when the pixel 4 is used as a reference point, and the actual interpolation calculation is performed using interpolation proportions that are determined based on the coordinate values x and y.

A method for determining a B-color pixel value for the interpolation point Q shall now be described. Actually, the method for determining the B-color pixel value is exactly the same as the above-described method for determining the R-color pixel value. As can be understood from a comparison of the R-color raw data shown in FIG. 3A and the B-color raw data shown in FIG. 4A, although the two are shifted by just one pitch in the left/right and up/down directions, the basic arrangement is exactly the same, and the B-color pixel value can be determined for the interpolation point Q by the same method as that described with FIG. 13.

Figure 14:
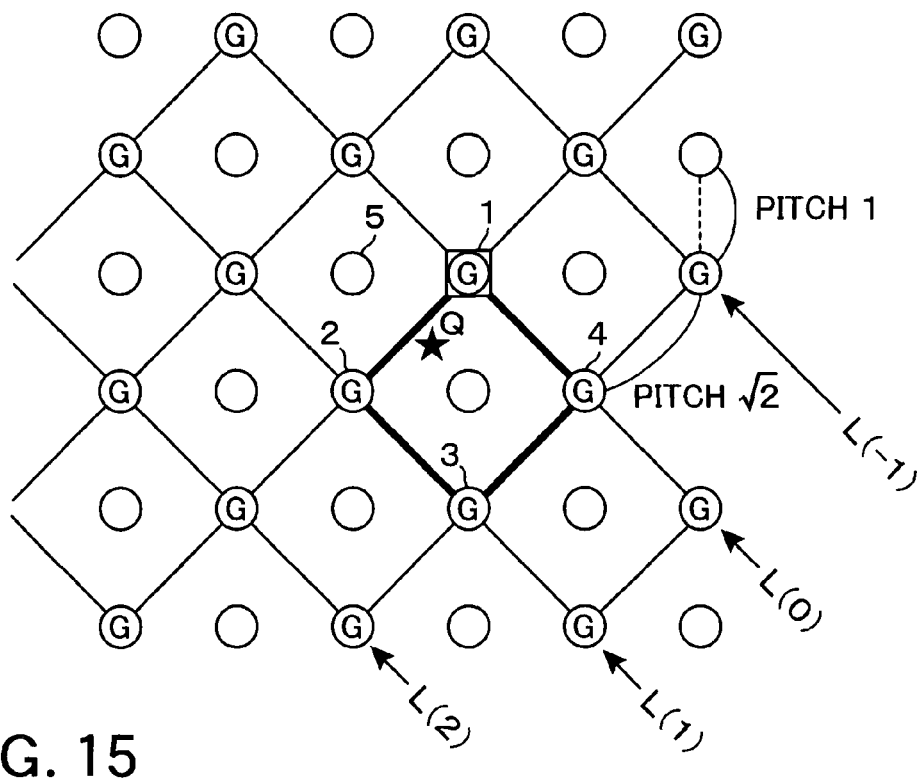
FIG. 14 is a plan view for describing a method according to the present invention for determining a pixel value of the G-color for the interpolation point Q shown in FIG. 12.

On the other hand, a somewhat different scheme is needed to determine a G-color pixel value for the interpolation point Q. FIG. 14 is a plan view in which just the G-color pixels have been extracted from the pixel array based on the Bayer-pattern shown in FIG. 12. That is, in FIG. 14, each pixel indicated by G is a G-color pixel on the original Bayer pattern array and a white circle pixel is a pixel of a color other than the G-color on the original Bayer pattern array.

With the pixel array of FIG. 14, diagonal lattice lines joining the positions of the G-color pixels are drawn intentionally. Here, if the lattice line pitch of the original image shown in FIG. 12 is 1, the pitch of the lattice lines clearly shown in FIG. 14 is $\sqrt{2}$, and each individual lattice line is oriented to a diagonal direction of 45°. It can be understood from a square lattice of a pitch of $\sqrt{2}$ and oriented to the 45° diagonal direction (referred to hereinafter as the "$\sqrt{2}$-pitch square lattice") in FIG. 14 that each G-color pixel is positioned at a lattice point of the $\sqrt{2}$-pitch square lattice. The G-color pixels on the Bayer pattern array are thus positioned at respective lattice points of the $\sqrt{2}$-pitch square lattice. If as illustrated, the respective lattice lines of the $\sqrt{2}$-pitch square lattice are referred to as L(−1), L(0), L(1), and L(2), the G-color pixel value of the interpolation point Q shown in FIG. 14 can be determined, as in the case of determining the R-color pixel value for the interpolation point Q in FIG. 9, by performing the "four-point referencing bi-cubic spline interpolation" based on pixel values of a total of 16 pixels (not of all of which are shown in FIG. 14) positioned along the respective lattice lines L(−1), L(0), L(1), and L(2).

Among the respective lattice frames that constitute the $\sqrt{2}$-pitch square lattice, the lattice frame that contains the interpolation point Q is referred to as the "interpolation reference frame" here as well. In the case of FIG. 14, the square frame having the positions of pixels 1, 2, 3, and 4 as the four vertices becomes the interpolation reference frame, and this is indicated by thick lines here. In this case where the interpolation reference frame is constituted of a square that is inclined diagonally at 45°, the upper corner point of the interpolation reference frame is referred to as the "interpolation origin." Because with the illustrated example, the position of the pixel 1 becomes the interpolation origin, the pixel 1 is surrounded by a small rectangle. The interpolation proportions used in the interpolation calculation are determined based on the distances of the interpolation point Q from the interpolation origin.

Figure 15:
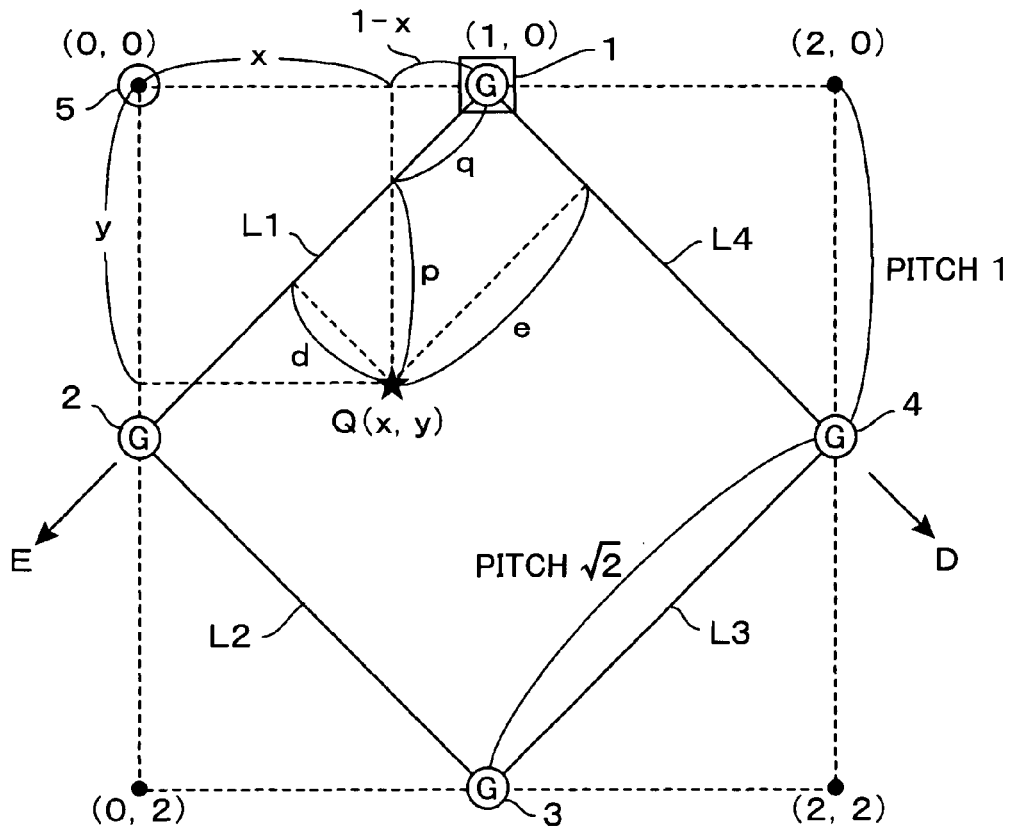
FIG. 15 is an enlarged view of a surrounding portion of an interpolation reference frame, indicated by thick lines in FIG. 14.

However, in order to determine such interpolation proportions, a correction for rotating the coordinate system by 45° is necessary. This shall now be described with reference to FIG. 15. FIG. 15 is an enlarged view of a surrounding portion of the interpolation reference frame, indicated by thick lines in FIG. 14. As mentioned above, with the present invention, the position of the interpolation point Q is designated by the upper address (X, Y) and the lower address (x, y). What should be noted here is that these addresses are addresses in the XY coordinate system (that is, addresses on a regular coordinate system that is not rotated by 45°). That is, when the position of the interpolation point Q is designated by the upper address (X, Y) and the lower address (x, y), the position of the pixel indicated by the upper address (X, Y) is that of the pixel 5 at the upper left corner of FIG. 15, the lower address x indicates the distance in the X-axis direction (right direction in the figure) with respect to the pixel 5 as a reference point, and the lower address y indicates the distance in the Y-axis direction (downward direction in the figure) with respect to the pixel 5 as the reference point. Put in another way, the interpolation point Q(x, y) is a point indicated by the coordinate values (x, y) with the position of the pixel 5 at the upper left corner of the figure as the origin of an xy coordinate system (with the right direction being the positive direction for an x-axis, and the downward direction being the positive direction for a y-axis).

Figure 7:
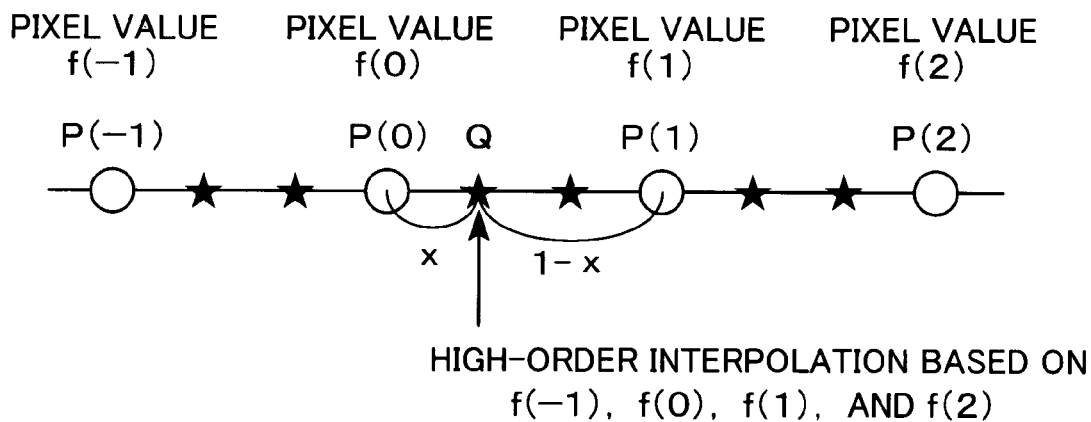
FIG. 7 is a diagram of principles of application of a high-order interpolation process, based on four pixels, to a one-dimensional image model.

However, because the lattice on which the interpolation calculation is to be performed is rotated by 45°, values on a coordinate system that is rotated by 45° are necessary as the interpolation proportions (values corresponding to x in the one-dimensional image example of FIG. 7) used in the interpolation calculation. Specifically, when a first direction D and a second direction E are defined as shown in FIG. 15, an interpolation proportion in regard to the first direction D is a value corresponding to a distance d between the interpolation point Q(x, y) and the lattice line L1 (which may instead be a distance between the interpolation point Q(x, y) and the lattice line L3), and an interpolation proportion in regard to the second direction E is a value corresponding to a distance e between the interpolation point Q(x, y) and the lattice line L4 (which may instead be a distance between the interpolation point Q(x, y) and the lattice line L2).

The relationship between the values d and e and the values x and y in FIG. 15 shall now be considered. Here, the description shall continue under the premise that the pitch of the original Bayer pattern pixel array is the unit length 1 and that 0<x<1 and 0<y<1. First in FIG. 15, $$\text{because } p = y \cdot (1 \cdot x),$$
$$d = p / \sqrt{2}$$
$$= (y \cdot (1 \cdot x)) / \sqrt{2}$$
$$= (y + x \cdot 1) / \sqrt{2}.$$
$$\text{Also, because } q = (1 \cdot x) \cdot \sqrt{2},$$
$$e = q + d$$
$$= (1 \cdot x) \cdot \sqrt{2} + (y + x \cdot 1) / \sqrt{2}$$
$$= (y - x + 1) / \sqrt{2}$$

Consequently, even if the position of the interpolation point Q(x, y) is designated by the address (x, y) on the xy coordinate system, the distances of the interpolation point Q(x, y) with respect to the interpolation origin (the pixel 1 in FIG. 15) on the coordinate system that is rotated by 45°, that is, the distance d in regard to the first direction D and distance e in regard to the second direction E can be determined using the above equations. Therefore, the G-color pixel value of the interpolation point Q(x, y) can be determined using the same interpolation method as the method used for the R-color and the B-color.

<<<Section 3. A Specific Method of the Interpolation Calculation Process According to the Present Invention>>>

Figure 16:
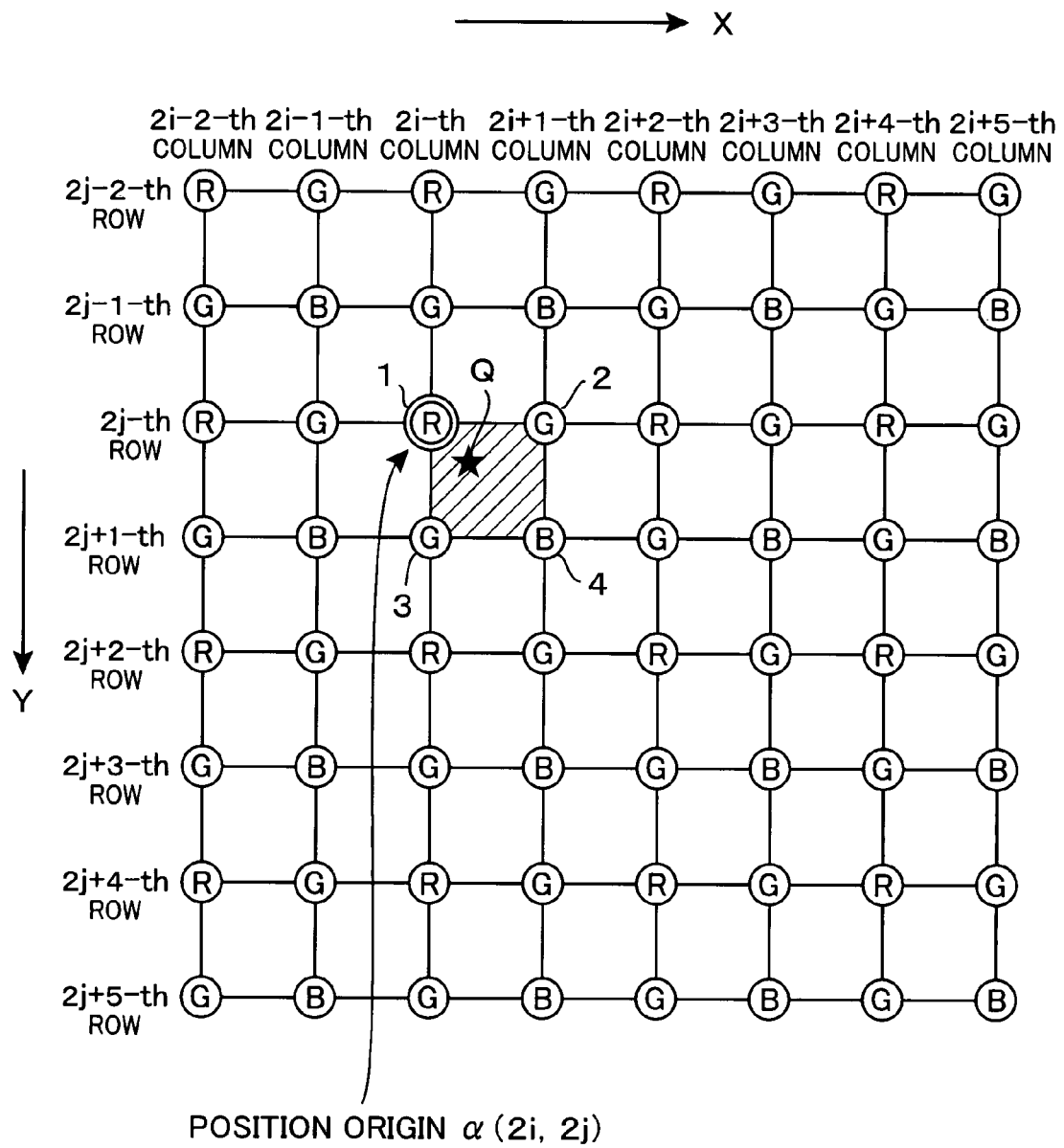
FIG. 16 is a plan view of an example of a position reference frame defined on a pixel array plane based on the Bayer pattern shown in FIG. 1.

Basic concepts of the interpolation calculation process according to the present invention were described in Section 2 above. Here, a more specific method shall be described in detail. A case shall be considered where color image data, indicating pixel values of individual pixels arrayed according to a Bayer pattern as shown in FIG. 16 from an image pickup apparatus, are provided and the method according to the present invention is used to perform interpolation for an interpolation point Q at an arbitrary position on the pixel array plane. As mentioned above, in a Bayer pattern array, the individual pixels are positioned at specific lattice point positions on a square lattice. Thus here, a two-dimensional XY coordinate system is defined, with an X-axis being set in the horizontal direction (with the right direction being the positive X-axis direction) and a Y-axis being set in the vertical direction (with the downward direction being the positive Y-axis direction) when the upper left corner of a square lattice is referred to as an origin. If the units of the coordinate axes of this XY coordinate system are defined so that a lattice interval of a square lattice (that is, an array pitch of the pixels) is 1, the position of each individual pixel can be indicated by coordinate values (X, Y) using integer values X and Y. For example, a pixel at an origin position at the upper left corner can be indicated by (0, 0), and a pixel adjacent to the right can be indicated by the coordinate values (1, 0).

FIG. 16 shows a pixel array of an arbitrary, partial region cut out from an entire pixel array that constitutes the color image data obtained from the image pickup apparatus. That is, when i and j are arbitrary integers, a section from the (2i−2)-th column to the (2i+5)-th column is extracted in the lateral direction, and a section from the (2j−2)-th row to the (2j+5)-th row is extracted in the vertical direction (the reason for the expression of "2i" and "2j," which are obtained multiplying i and j by a factor of 2, shall be described below). Thus a pixel 1, indicated by a double circle, is indicated by the coordinate values (2i, 2j), a pixel 2 is indicated by the coordinate values (2i+1, 2j), a pixel 3 is indicated by the coordinate values (2i, 2j+1), and a pixel 4 is indicated by the coordinate values (2i+1, 2j+1).

The interpolation calculation process for the illustrated interpolation point Q is a process of determining the respective pixel values for the R, G, and B colors at the position of the interpolation point Q, and to perform this process, first the precise position of the interpolation point Q must be ascertained. In the present invention, the position of the interpolation point Q is handled by dividing it into an upper address (X, Y) and a lower address (x, y). The upper address (X, Y) is information that specifies the position of a lattice frame in which the interpolation point Q belongs. As shown in FIG. 16, in the present pixel array, a plurality of square-shaped lattice frames, each having pixels positioned at the positions of the four vertices, are present, and first, the lattice frame in which the interpolation point Q is located is ascertained. With the illustrated example, it can be understood that the interpolation point Q is a point inside the lattice frame provided with the hatching, that is, a point within the square having the pixels 1, 2, 3, and 4 as the four vertices.

In the present application, this lattice frame shall be referred to as a "position reference frame" for the interpolation point Q. Put in another way, the "position reference frame for a specific interpolation point Q" is the "smallest square, which contains the interpolation point Q, and whose four vertices are constituted by the lattice points (pixel positions)." The region provided with the hatching in the figure is an internal region of the position reference frame for the interpolation point Q. In a case where the interpolation point Q is positioned on a boundary line (that is, a side of a square), it is processed as being included in one of either region in accordance to predetermined rules. Here, when the interpolation point Q is positioned on a vertical direction boundary line (lattice line), it is handled as a point inside the lattice frame positioned at the right side of the boundary line, and when the interpolation point Q is positioned on a horizontal direction boundary line (lattice line), it is handled as a point inside the lattice frame positioned at the lower side of the boundary line.

The position reference frame can be specified by designating the lattice points (pixels) that constitute its four vertices. With the illustrated example, the position reference frame for the interpolation point Q can be specified by designating the pixels 1, 2, 3, and 4. However, for practical use, by setting a rule, such as "use the upper left point among the four vertices as a representative vertex," the position reference frame can be specified by designating just the upper left vertex. With the illustrated example, the position reference frame for the interpolation point Q can be specified by designating just the pixel 1 (the square having the pixel 1 as the upper left vertex is specified uniquely). In the present application, the representative vertex used for specifying a position reference frame shall be referred to as a "position origin α." With the illustrated example, the position origin of the interpolation point Q is the position of the pixel 1. Because the position origin α thus matches the position of a pixel, it can be indicated by the coordinate values (X, Y) using integer values X and Y. With the illustrated example, the position origin α of the interpolation point Q can be indicated as α(2i, 2j), using the coordinate values 2i and 2j. Hereinafter, the pixel positioned at the position origin α shall be indicated by a double circle.

The position origin α (2i, 2j) in the illustrated example only indicates the rough positional information of the position reference frame in which the interpolation point Q is present. That is, with just the upper address (X, Y) that is expressed using the integer values X and Y, only a rough position of the interpolation point Q can be indicated. To indicate the precise position of the interpolation point Q, positional information within the position reference frame is necessary. The lower address (x, y) is for indicating this positional information within the position reference frame.

Figure 17:
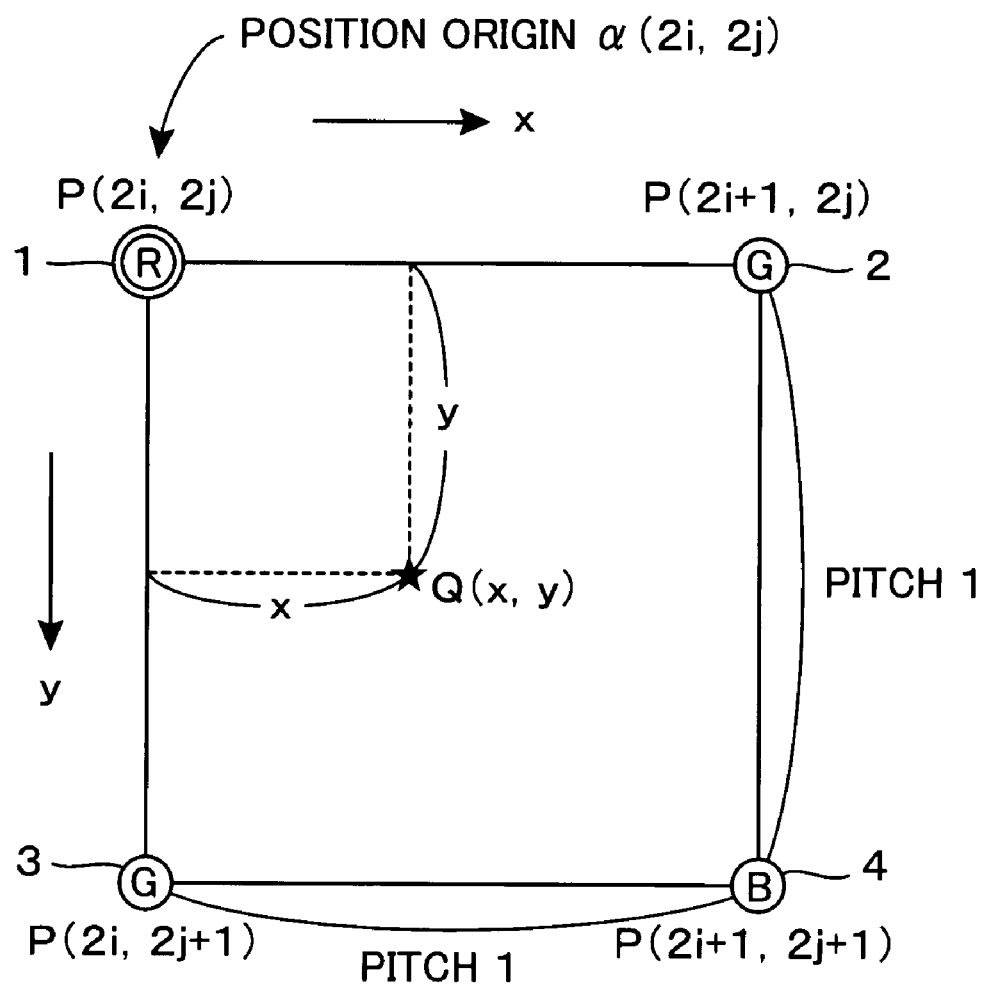
FIG. 17 is a magnified plan view of the interior of the position reference frame indicated by hatching in FIG. 16.

FIG. 17 is a magnified plan view of the interior of the position reference frame indicated by hatching in FIG. 16. As illustrated, the pixels 1, 2, 3, and 4 are positioned at the four vertices of this position reference frame, and using i and j as parameters, these pixels are indicated respectively as P(2i, 2j), P(2i+1, 2j), P(2i, 2j+1), and P(2i+1, 2j+1). The upper left pixel P(2i, 2j), indicated by a double circle, is the pixel positioned at the position origin α(2i, 2j). The lower address (x, y) is the coordinate values that indicate the position of the interpolation point Q(x, y) in an xy coordinate system that is defined as a local coordinate system inside the position reference frame. The origin of the xy coordinate system is the upper left corner of the position reference frame (the position origin α(2i, 2j) in the illustrated example), the x-axis is set along the horizontal direction (with the right direction being the positive x-axis direction), and the y-axis is set along the vertical direction (with the downward direction being the positive y-axis direction). As with the XY coordinate system, the units of the coordinate axes of the xy coordinate system are defined so that the pixel array pitch is 1. Because the xy coordinate system is a local coordinate system that is defined for each individual position reference frame, the coordinate values x and y take on values within the ranges 0≦x<1 and 0≦y<1 (the position of the equal sign differs according to which position reference frame an interpolation point Q(x, y) that is positioned on a boundary line is deemed to belong in).

The interpolation point Q can thus be expressed by the combination of the upper address (X, Y) and the lower address (x, y). Here, the upper address (X, Y) is an address constituted of integer values that specify the position origin α for the interpolation point Q. With the example shown in FIG. 17, the position origin α(2i, 2j) is specified by the upper address (2i, 2j) (can be specified as the position of the pixel of the 2i-th column and the 2j-th row of the pixel array). The lower address (x, y) takes on coordinate values in the local coordinate system having the position origin α(2i, 2j) as the origin of the coordinates.

Figure 18:
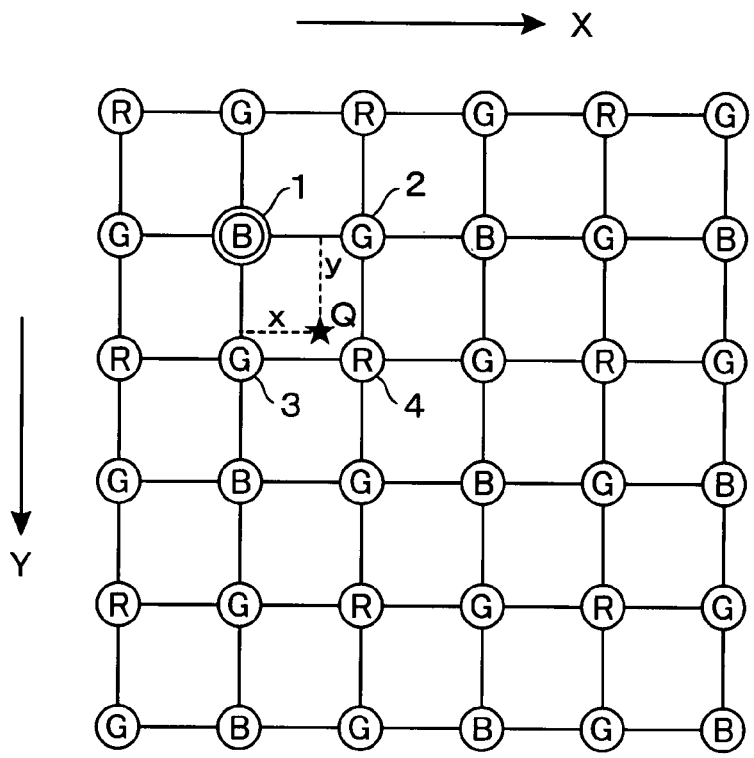
FIG. 18 is a diagram of an address expression of an interpolation point Q defined at an arbitrary position on a pixel array plane based on the Bayer pattern shown in FIG. 1.

How the interpolation process is executed based on the upper address (X, Y) and the lower address (x, y) that indicate the interpolation point Q shall now be described specifically according to each color. Here, a case where an arbitrary interpolation point Q has been designated on the plane of a Bayer pattern pixel array as shown in FIG. 18 shall be considered (although only a pixel array of six rows and six columns is shown in FIG. 18 for the sake of description, it shall be deemed that in actuality, a pixel array of the same Bayer pattern spreads in the upper, lower, left, and right directions). As mentioned above, the interpolation point Q is expressed by the combination of the upper address (X, Y) and the lower address (x, y). Here, the upper address (X, Y) specifies a position origin α that is defined at the position of a pixel 1, indicated by a double circle in the figure. That is, the upper address (X, Y) indicates that the pixel 1 is a pixel of the X-th column and the Y-th row of the entire pixel array. The lower address (x, y) values are coordinate values of the interpolation point Q in an xy local coordinate system that is defined with the coordinates of the position origin α (position of the pixel 1) as the origin of the coordinate.

In Section 1, an example, in which the pixel value of the interpolation point Q in the one-dimensional image shown in FIG. 7 is determined by the "four-point referencing bi-cubic spline interpolation" method, was described. The values necessary for this interpolation calculation process are the respective pixel values f(−1), f(0), f(1), and f(2) of the four reference pixels P(−1), P(0), P(1), and P(2) and the interpolation proportion x. Once these values are obtained, the pixel value f(x) of the interpolation point Q is determined by the computation equation:

$$f(x) = 1/5 \cdot \{(-3f(-1) + 7f(0) - 7f(1) + 3f(2)) \cdot x^3 +$$
$$(7f(-1) - 13f(0) + 8f(1) - 2f(2)) \cdot x^2 +$$
$$(-4f(-1) + f(0) + 4f(1) \cdot f(2)) \cdot x\} + f(0).$$

Thus the information necessary for the interpolation calculation process are the information indicating "the pixels that are to be the reference pixels" and the information indicating "the value of the interpolation proportion."

Meanwhile, in Section 2, the basic concepts of performing the interpolation calculation process for the R-color of a two-dimensional image by the method according to the present invention was described with reference to FIG. 13. With the example shown in FIG. 13, in order to obtain the R-color pixel value for the interpolation point Q, the lattice frame that contains the interpolation point Q was set as the interpolation reference frame (indicated by thick lines in FIG. 13) in the double-pitch square lattice having just the R-color pixels as the lattice points, the upper left corner point of the interpolation reference frame was set as the interpolation origin (the position of the pixel 4 surrounded by a small square), and the information indicating "the pixels that are to be the reference pixels" and the information indicating "the values of the interpolation proportions" are specified using the interpolation reference frame and the interpolation origin. Specifically, the information indicating "the pixels that are to be the reference pixels" can be specified using the interpolation reference frame. That is, in the case of the "four-point referencing bi-cubic spline interpolation," all sixteen R-color pixels, contained inside a square (in FIG. 13, the square having the pixel 1 and the pixel 3 as opposite corners) that is of a larger size than the interpolation reference frame in the double-pitch square lattice, are the reference pixels. Also, with the example shown in FIG. 13, the information indicating "the values of the interpolation proportions" can be specified using the coordinate values (x, y) in the local coordinate system that indicate the distance of the interpolation point Q with respect to the interpolation origin (pixel 4).

Consequently, in performing an interpolation calculation on an arbitrary interpolation point Q by the method according to the present invention, first, the position reference frame and the position origin α(X, Y) at the upper left vertex of the position reference frame, in other words, the upper address is determined, and the coordinate values (x, y) in the local coordinate system of the interpolation point Q that is based on the position origin α(X, Y), in other words, the lower address is determined to ascertain the position of the interpolation point Q. Then based on these addresses, an interpolation reference frame and an interpolation origin β at the upper left vertex of the interpolation reference frame are determined, reference pixels are specified using the interpolation reference frame, and interpolation proportions are specified using the interpolation origin β for each individual color.

The interpolation calculation process to be executed for each individual color in accordance to the basic policy described above shall now be described. First, the process for the R-color shall be described. In performing the interpolation for the interpolation point Q in FIG. 18, first, the position reference frame for the interpolation point Q is determined and the position origin is determined as the upper left vertex of the position reference frame. Because the "position reference frame" is defined as the "smallest square, which contains the interpolation point Q, and whose four vertices are constituted by the lattice points," in the case of the example of FIG. 18, the square having pixels 1, 2, 3, and 4 as the four vertices becomes the position reference frame and the pixel 1 positioned at the upper left becomes the position origin α (the position origin is indicated by a double circle). The precise position of the interpolation point Q is given by the coordinate values (x, y) of the local coordinate system having the position origin α as the coordinate origin.

Figure 19:
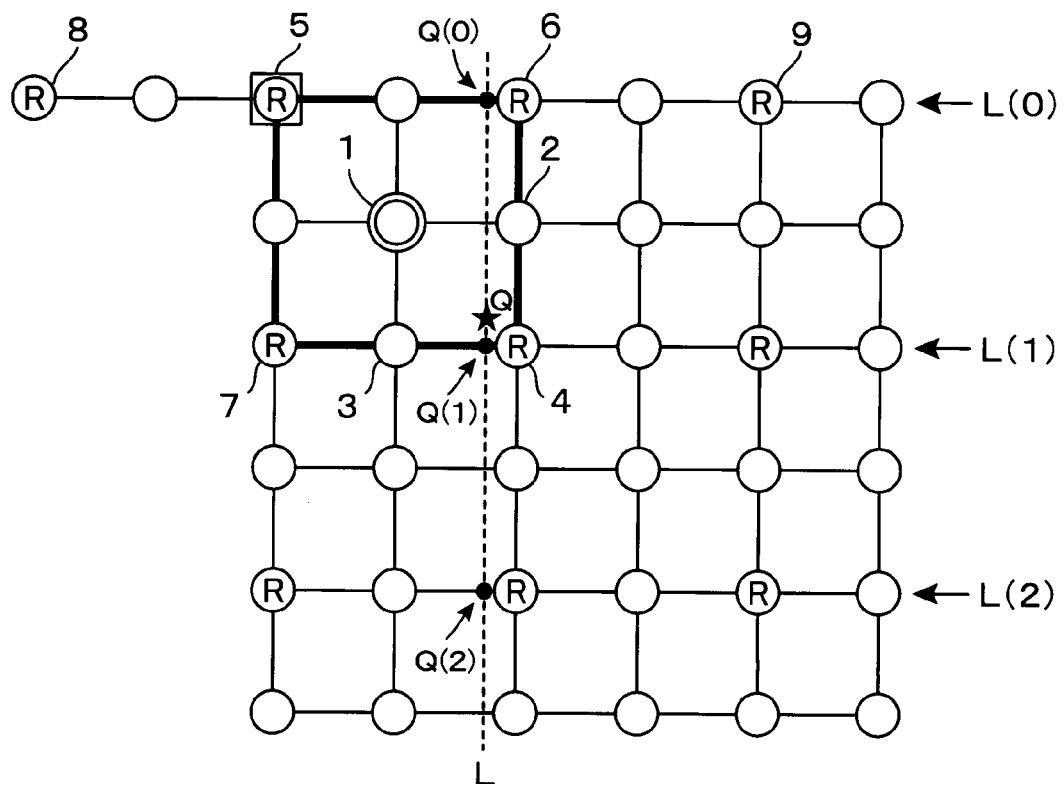
FIG. 19 is a plan view of a square lattice used for performing a high-order interpolation process concerning the R-color of the interpolation point Q shown in FIG. 18 by employing an interpolation device according to the present invention.

Meanwhile, to perform the interpolation calculation process, a pixel array shown in FIG. 19 shall be considered. With this pixel array, "R" is indicated only for R-color pixels among pixels of the respective colors shown in FIG. 18, and pixels of the remaining two colors are expressed by white circles. The "interpolation reference frame" for an interpolation point Q is defined as the "smallest square, which contains the interpolation point Q, and whose four vertices are constituted by lattice points at which light receiving elements having the function of detecting the color subject to computation are positioned." Therefore, a square having R-color pixels 5, 6, 7, and 4 as the four vertices is the interpolation reference frame (indicated by thick lines in the figure), and the pixel 5 positioned at the upper left is the interpolation origin β (the interpolation origin is indicated by surrounding it with a small square) in the example shown in FIG. 19.

Thus in performing the R-color interpolation for the interpolation point Q, the interpolation origin β is defined at the position of the pixel 5 as shown in FIG. 19, and the interpolation reference frame, indicated by thick lines in the figure, is defined as the square having the interpolation origin β as the upper left vertex and the R-color pixels 5, 6, 7, and 4 as the four vertices. When the interpolation reference frame has thus been defined, the reference pixels used in the interpolation calculation process can be determined. That is, if the "four-point referencing bi-cubic spline interpolation" is to be performed, a total of sixteen R-color pixels, contained in a square that is of a larger size than the interpolation reference frame indicated by the thick lines and having R-color pixels as the four vertices, are selected as the reference pixels in the case of the illustrated example, and an interpolation calculation using the respective pixel values of these reference pixels is executed.

Specifically, lattice lines L(0), L(1), and L(2) shown in FIG. 19 correspond to the lattice lines indicated by the same symbols in FIG. 13 (although the lattice line L(−1) is not shown in FIG. 19, this is positioned at two rows above the figure). Thus by drawing an interpolation line L that passes through the interpolation point Q and is parallel to the vertical direction lattice lines and by setting intermediate interpolation points Q(−1), Q(0), Q(1), and Q(2) at the respective intersections of the interpolation line L and the respective lattice lines L(−1), L(0), L(1), and L(2) (Q(−1) is not shown in FIG. 19), the pixel values of the respective intermediate interpolation points Q(−1), Q(0), Q(1), and Q(2) can be determined by a lateral direction interpolation calculation using the pixel values of the four reference pixels on the respective lattice lines L(−1), L(0), L(1), and L(2). For example, the pixel value of the intermediate interpolation point Q(0) is determined by a computation using the pixel values of pixels 8, 5, 6, and 9. When the pixel values of the four intermediate interpolation points Q(−1), Q(0), Q(1), and Q(2) have been obtained, the pixel value of the interpolation point Q can be determined by a vertical direction interpolation calculation process using these pixel values.

Figure 20:
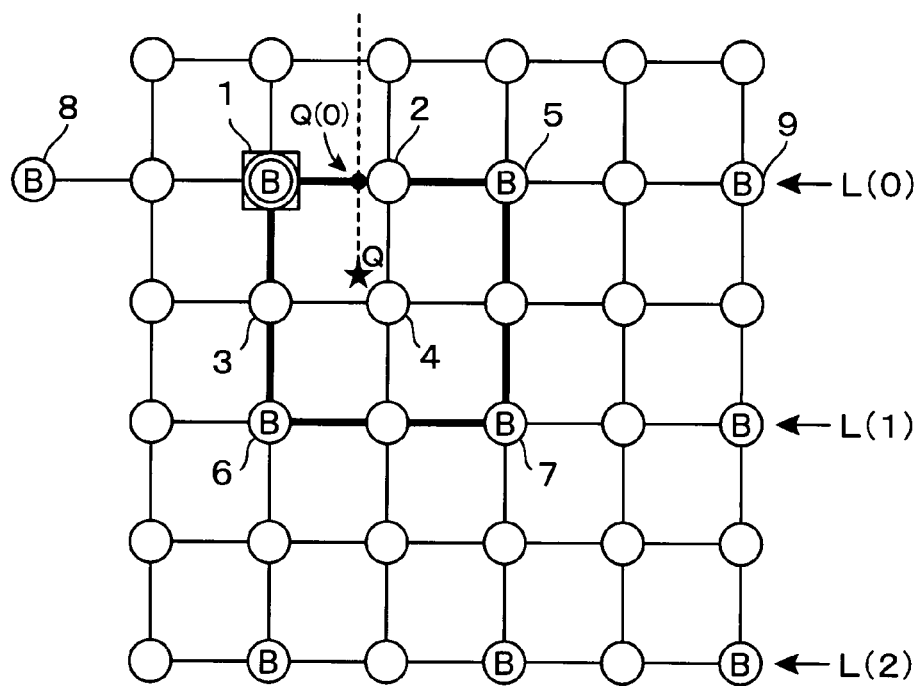
FIG. 20 is a plan view of a square lattice used for performing a high-order interpolation process concerning the B-color of the interpolation point Q shown in FIG. 18 by employing the interpolation device according to the present invention.

Next, to describe the process for the B-color, a pixel array shown in FIG. 20 shall be considered. With this pixel array, "B" is indicated only for B-color pixels among pixels of the respective colors shown in FIG. 18, and pixels of the remaining two colors are expressed by white circles. In this case, the interpolation reference frame for the interpolation point Q is a square (indicated by thick lines in the figure) having B-color pixels 1, 5, 6, and 7 as the four vertices, and a pixel 1 positioned at the upper left is the interpolation origin β (the interpolation origin is indicated by surrounding it with a small square).

In performing the B-color interpolation for the interpolation point Q, the interpolation origin β is defined at the position of the pixel 1 as shown in FIG. 20, and the interpolation reference frame, indicated by thick lines in the figure, is defined as the square having the interpolation origin β as the upper left vertex and the B-color pixels 1, 5, 6, and 7 as the four vertices. When the interpolation reference frame has thus been defined, the reference pixels used in the interpolation calculation process can be determined. That is, if the "four-point referencing bi-cubic spline interpolation" is to be performed, a total of sixteen B-color pixels, contained in a square that is of a larger size than the interpolation reference frame indicated by the thick lines and having B-color pixels as the four vertices, are selected as the reference pixels in the case of the illustrated example, and an interpolation calculation using the respective pixel values of these reference pixels is executed.

Specifically, lattice lines L(0), L(1), and L(2) shown in FIG. 20 correspond to the lattice lines indicated by the same symbols in FIG. 13 (although the lattice line L(−1) is not shown in FIG. 20, this is positioned one row above the figure). Thus as in the above-described case of the R-color, the pixel values of intermediate interpolation points Q(−1), Q(0), Q(1), and Q(2) can be determined (for example, the pixel value of the intermediate interpolation point Q(0) is determined by a computation using the pixel values of pixels 8, 1, 5, and 9), and the pixel value of the interpolation point Q can be determined by a vertical direction interpolation calculation process using the four pixel values.

A first point to be noted here is that the "position origin α," which is indicated by a double circle in each figure, and the "interpolation origin β," which is indicated by surrounding with a small rectangle in each figure, are not necessarily matched. For example, with the process concerning the R-color shown in FIG. 19, the interpolation origin β (pixel 5) is set diagonally at the upper left of the position origin α (pixel 1), and the two do not match. Meanwhile, with the process concerning the B-color shown in FIG. 20, the position origin α (pixel 1) and the interpolation origin β (pixel 1) are set at the same position and the two match. The problem of matching/mismatching is not determined uniquely for each color in such a manner that the two do not match in the process concerning the R-color while the two match in the process concerning the B color, but is based on the relative relationship between the position of the interpolation point Q and the pixel positions of the respective colors and is a problem that is determined based on some form of regularity as shall be described in Section 4 below.

A second point to be noted, which is an issue that arises in relation to the first point to be noted, is that the position values of the interpolation point Q indicated by the lower address (x, y) cannot necessarily be used as they are as values that indicate the interpolation proportions. The lower address (x, y) that indicate the position of the interpolation point Q are coordinates on the xy local coordinate system having the position origin α as the coordinate origin and are strictly values that are based on the position origin α. Meanwhile, because the interpolation calculation process is a process that is based on the interpolation origin β, the values of the interpolation proportions must also be based on the interpolation origin β. With the example shown in FIG. 20, because the position origin α and the interpolation origin β are matched, the values of the lower address (x, y) of the interpolation point Q are numerical values on the coordinate system having the interpolation origin β as the origin. However, with the example shown in FIG. 19, because the position origin α (pixel 1) and the interpolation origin β (pixel 5) are not matched, the values of the lower address (x, y) of the interpolation point Q are not numerical values on the coordinate system having the interpolation origin β (pixel 5) as the origin. Thus in performing the interpolation calculation based on the interpolation origin β, a correction of adding certain offset amounts to the values of the lower address (x, y) is necessary. The specific contents of such a correction shall be described in detail in Section 4 below.

A third point to be noted is the issue of normalization of the value of the interpolation proportion. As can be understood by referencing the interpolation calculation process for the one-dimensional image shown in FIG. 7, in a normal interpolation calculation process, a computation equation for the case where the interval of the reference pixels used in the interpolation is set to 1 is used. Thus with a two-dimensional image, a problem does not arise in cases of performing interpolation calculation using pixels on lattice points that are arrayed at a pitch of 1 as the reference pixels. However, when the pitch of the reference pixels is an arbitrary numerical value n, a normalization process of multiplying the coordinate values by 1/n becomes necessary to compute the correct value of the interpolation proportion. That is, because the lower address (x, y) indicates coordinate values of the interpolation point Q(x, y) inside the position reference frame having the four lattice points arrayed at a pitch of 1 as the four vertices as shown in FIG. 17, even when the position origin α and the interpolation origin β are matched and there is no need for a correction of adding offset amounts as in the example shown in FIG. 20, a normalization correction is necessary. Specifically, with the example shown in FIG. 20, because whereas the pitch of the reference pixels is 2, the calculation equation used in the interpolation is premised on a reference pixel pitch of 1, a correction such that values obtained by multiplying the coordinate values (x, y) by ½ are used as the interpolation proportions is necessary. The specific contents of such a correction shall be described in detail in Section 4 below.

Figure 21:
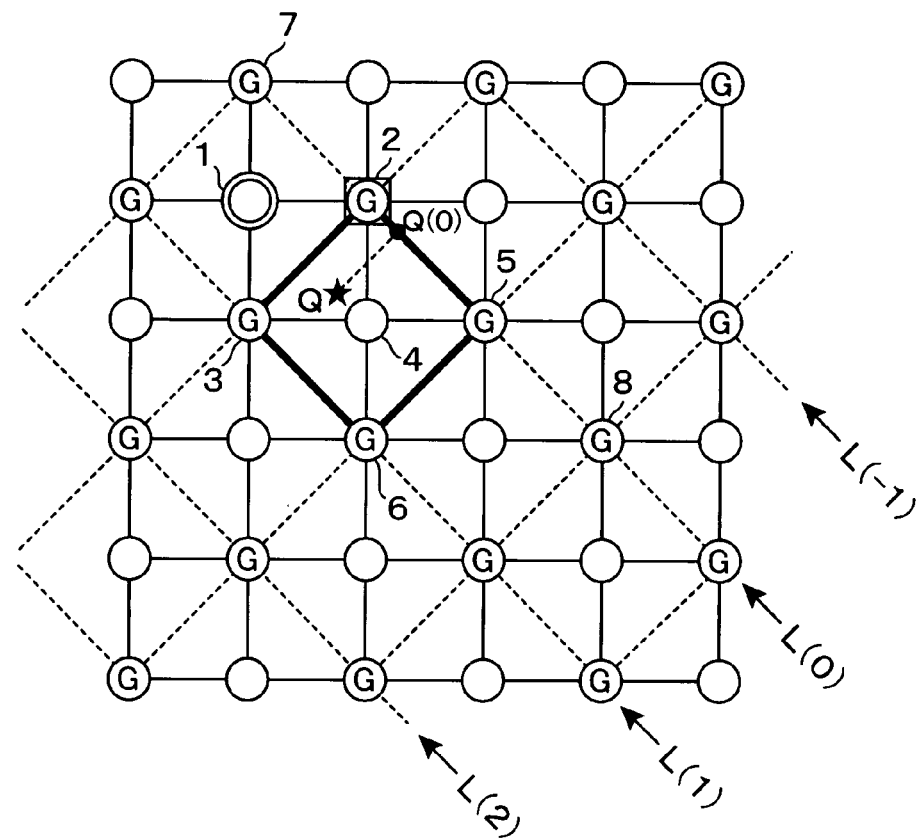
FIG. 21 is a plan view of a square lattice used for performing a high-order interpolation process concerning the G-color of the interpolation point Q shown in FIG. 18 by employing the interpolation device according to the present invention.

Lastly, to describe the process for the G-color, a pixel array shown in FIG. 21 shall be considered. With this pixel array, "G" is indicated only for G-color pixels among pixels of the respective colors shown in FIG. 18, and pixels of the remaining two colors are expressed by white circles. As mentioned in Section 2, the G-color pixels are positioned at respective lattice point positions on a √2-pitch square lattice that is rotated diagonally by 45° as indicated by the broken lines in the figure. And as was mentioned in Section 2, to perform the interpolation calculation for the G-color, the interpolation reference frame (indicated by thick lines) is defined as a square having G-color pixels 2, 3, 5, and 6 in FIG. 21 as the four vertices and the interpolation origin β is defined as the pixel 2 positioned at the top (the interpolation origin is indicated by surrounding it with a small square).

When the interpolation reference frame has thus been defined, the reference pixels used in the interpolation calculation process can be determined. That is, if the "four-point referencing bi-cubic spline interpolation" is to be performed, a total of sixteen G-color pixels, contained in a square (a diagonally positioned square indicated by broken lines in the figure) that is of a larger size than the interpolation reference frame indicated by the thick lines on the √2-pitch square lattice and having G-color pixels as the four vertices, are selected as the reference pixels in the case of the illustrated example, and an interpolation calculation using the respective pixel values of these reference pixels is executed.

Specifically, lattice lines L(−1), L(0), L(1), and L(2) shown in FIG. 21 correspond to the lattice lines indicated by the same symbols in FIG. 13. Thus as in the above-described cases of the R and B colors, the pixel values of intermediate interpolation points Q(−1), Q(0), Q(1), and Q(2) can be determined (for example, the pixel value of the intermediate interpolation point Q(0) is determined by a computation using the pixel values of pixels 7, 2, 5, and 8), and the pixel value of the interpolation point Q can be determined by an interpolation calculation process using the pixel values of these four intermediate interpolation points.

Needless to say, the above-described three points to be noted must be taken into consideration in performing the interpolation process for the G-color as well. That is, the first noted point that the relationship between the position origin α and the interpolation origin β is determined based on predetermined rules based on a relative relationship between the position of the interpolation point Q and the pixel positions of the respective colors, the second noted point that, in determining the interpolation proportion, a correction of applying predetermined offset amounts to the lower address (x, y) of the interpolation point Q is needed, and the third noted point that, in determining the interpolation proportion, a normalization process of multiplying the coordinate values (x, y) by 1/√2 must be performed in consideration that the pitch of the √2-pitch square lattice is √2 must be taken into consideration.

Moreover, in the case of the interpolation process concerning the G-color, there is another issue that needs to be considered additionally in regard to the first noted point. That is, even when the position origin α is the same, a different interpolation origin β may have to be defined according to the position of the interpolation point Q. This is a unique issue that arises only with the G-color for which the pixel array is in a state of being rotated by 45°, and such an issue does not arise with the R and B-colors. Put in another way, whereas in the case of the R-color or the B-color, a single interpolation origin β is uniquely associated with a single position origin α, in the case of the G color, two candidate lattice points that can become an interpolation origin β exist for a single position origin α and thus the need to select one of either according to the position of the interpolation point Q arises.

This issue shall now be described by way of a specific example. As mentioned above with the example shown in FIG. 21, because the pixel 1, indicated by the double circle, is set as the position origin α for the interpolation point Q, if the pixel 2, indicated by being surrounded by a small square in the figure, is set as the interpolation origin β associated with the position origin α, the interpolation calculation using the square, having the pixels 2, 3, 5, and 6 as the four vertices, as the interpolation reference frame can be performed. However, what happens when the interpolation point Q is at the position shown in FIG. 22? A pixel 1, indicated by the double circle, is set as the position origin α for the interpolation point Q in this case as well. However, with the example shown in FIG. 22, a pixel 7 must be set as the interpolation origin β and a square having the pixels 7, 9, 2, and 3 as the four vertices must be set as the interpolation reference frame. Thus in the process concerning the G color, the interpolation origin β cannot be determined uniquely based on just the position origin α.

Figure 22:
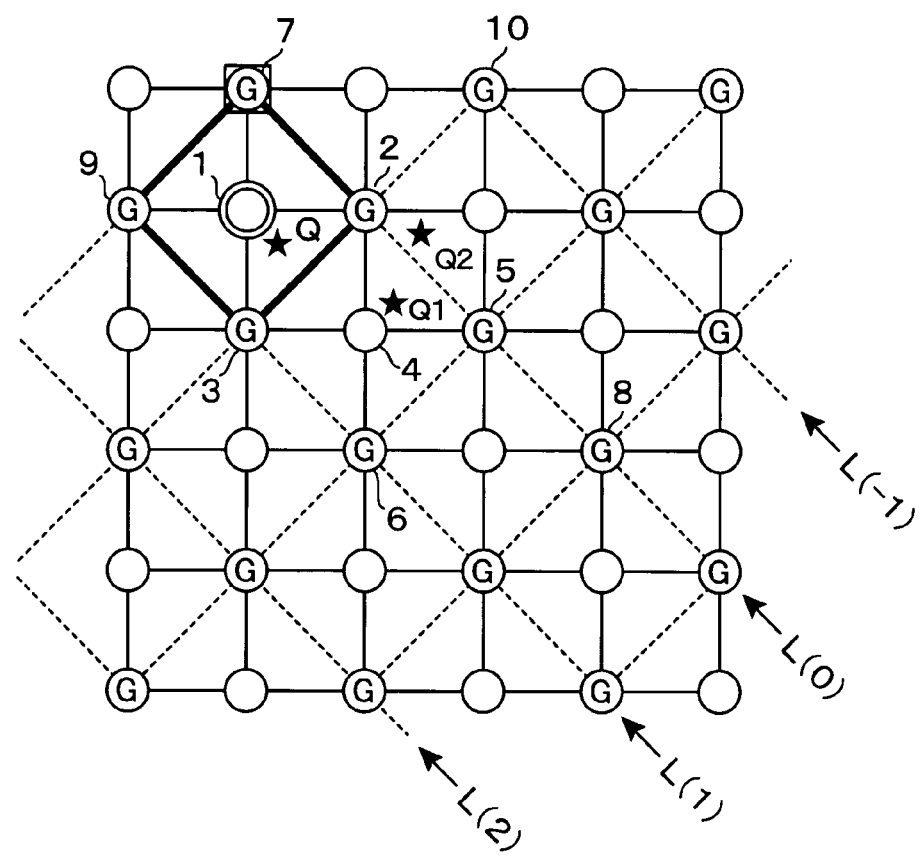
FIG. 22 is another plan view of a square lattice used for performing a high-order interpolation process concerning the G-color of the interpolation point Q shown in FIG. 18 by employing the interpolation device according to the present invention.

As another example, when interpolation points Q1 and Q2 shown in FIG. 22 are noted, the pixel 2 is set as the position origin α for both. However, whereas the interpolation origin β for the interpolation point Q1 must be set to the same pixel 2 as the position origin α, the interpolation origin β for the interpolation point Q2 must be set to a pixel 10. This is because the interpolation reference frame must be defined as the smallest square which contains the interpolation point Q and the four vertices of said smallest square are constituted by lattice points at which the color G is positioned.

Figure 23:
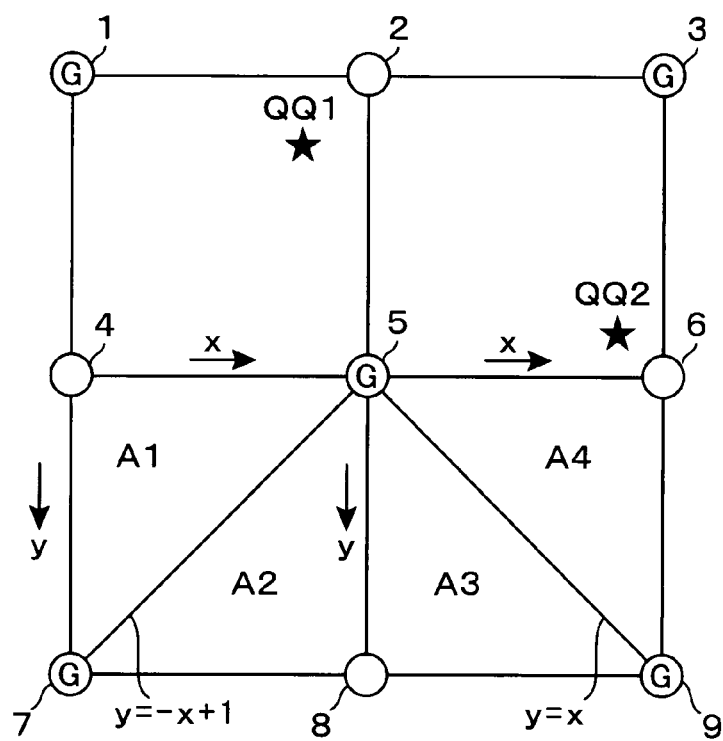
FIG. 23 is a plan view of a judgment process for determining an interpolation origin for the G-color of the interpolation point Q using the interpolation device according to the present invention.

Consequently, for the color G, the interpolation origin β cannot be determined uniquely based on just the position origin α and a selection between two alternatives must be made according to the region in which the interpolation point Q belongs. FIG. 23 is a plan view of this judgment process. As illustrated, an array constituted of nine pixels 1 to 9 shall be considered. Here, pixels 1, 3, 5, 7, and 9 are G-color pixels and the remaining pixels are pixels of other colors. As relative positional relationships between an interpolation point Q and the G-color pixel 5, the following four variations are considered. That is, with the four variations, the interpolation point Q belongs to an illustrated isosceles triangular region A1, A2, A3, or A4. If the interpolation point Q is positioned on a boundary line of regions, it is handled as belonging to one of the regions that has been determined in advance. The relative relationship between an interpolation point Q and a G-color pixel can be summarized as being one of these four variations. For example, an illustrated interpolation point QQ1 belongs to the region A4 if the pixel 1 is brought to the position of the pixel 5, and an illustrated interpolation point QQ2 belongs to the region A2 if the pixel 3 is brought to the position of the pixel 5.

When cases are considered according to such four variations, a specific interpolation origin β can be determined uniquely for each individual variation. That is, when the interpolation point Q belongs to the region A1, the pixel 1 is set as the interpolation origin β, when the interpolation point Q belongs to the region A2, the pixel 5 is set as the interpolation origin β, when the interpolation point Q belongs to the region A3, the pixel 5 is set as the interpolation origin β, and when the interpolation point Q belongs to the region A4, the pixel 3 is set as the interpolation origin β.

Which of the four regions A1 to A4 an arbitrary interpolation point Q belongs to can be judged as follows on the basis of the upper address (X, Y) and the lower address (x, y) of the interpolation point Q. First, a judgment between a group constituted of regions A1 and A2 and a group constituted of regions A3 and A4 can be made based on the upper address (X, Y). Because as shown in FIG. 1, with a general Bayer pattern array, the array, RGRGRGRGR . . . , is formed in an odd row, and the array, GBGBGBGBGB . . . is formed in an even row, if when the interpolation point Q belongs to the region A1 or A2, the position origin of the interpolation point Q is α(X, Y), then "X+Y" will always be even, and if when the interpolation point Q belongs to the region A3 or A4, the position origin of the interpolation point Q is α(X, Y), then "X+Y" will always be odd.

Meanwhile, when as shown in FIG. 23, an xy coordinate system (with the right direction being the positive x-axis direction and the downward direction being the positive y-axis direction) having the position of the pixel 4 as the coordinate origin is defined inside a square having the positions of the pixels 4, 5, 7, and 8 as the four vertices, the boundary line between the regions A1 and A2 can be expressed by the formula: y=−x+1. Thus if when "X+Y" of the upper address (X, Y) of the interpolation point Q is even, x and y of the lower address (x, y) satisfy the condition, y≦−x+1, it can be judged that the interpolation point Q belongs to the region A1, and if the condition, y>−x+1, is satisfied, it can be judged that the interpolation point Q belongs to the region A2 (the position of the equal sign differs according to which region a point on a boundary line between regions is determined to belong in).

Also as shown in FIG. 23, when an xy coordinate system (with the right direction being the positive x-axis direction and the downward direction being the positive y-axis direction) having the position of the pixel 5 as the coordinate origin is defined inside a square having the positions of the pixels 5, 6, 8, and 9 as the four vertices, the boundary line between the regions A3 and A4 can be expressed by the formula: y=x. Thus if when "X+Y" of the upper address (X, Y) of the interpolation point Q is odd, x and y of the lower address (x, y) satisfy the condition, y>x, it can be judged that the interpolation point Q belongs to the region A3, and if the condition, y≦−x, is satisfied, it can be judged that the interpolation point Q belongs to the region A4 (the position of the equal sign differs according to which region a point on a boundary line between regions is determined to belong in).

Thus in the case of a general Bayer pattern array, whereas the interpolation origin β can be determined based on the upper address (X, Y) of the interpolation point Q in the cases of the R and B-colors, for the G-color, not only the upper address (X, Y) of the interpolation point Q but the lower address (x, y) must also be taken into consideration to determine the interpolation origin β.

<<<Section 4. Specific Methods for Determining the Interpolation Origin and the Interpolation Proportion>>>

In Section 3, the basic procedure for defining the upper address (X, Y) that specifies the position origin α(X, Y) and the lower address (x, y) that specifies the distances of the interpolation point Q with respect to the position origin α(X, Y) to express the position of the interpolation point Q, determining the interpolation origin β and the interpolation proportions for each of the respective colors based on these addresses, and executing the interpolation calculation process was described. Here specific methods for determining the interpolation origin β and the interpolation proportions for the case of a general Bayer pattern array, with which an odd row takes on the array form, RGRGRGRGR . . . , and an even row takes on the array form, GBGBGBGBGB . . . , shall be described.

Here, the partial pixel array, shown in FIG. 16 and constituted of a Bayer pattern, shall be considered. As already mentioned, with this pixel array, a section from the (2i−2)-th column to the (2i+5)-th column is extracted in the lateral direction, and a section from the (2j−2)-th row to the (2j+5)-th row is extracted in the vertical direction, with i and j being arbitrary integers. Here, the reason for the expression of "2i" and "2j," with which i and j are multiplied by a factor of 2, is that in the case of a Bayer pattern array, each individual pixel must be handled differently according to whether the pixel is positioned in an odd column or an even column and whether the pixel is positioned in an odd row or an even row. That is, because here, both parameters i and j are integers (such as 0, 1, 2 . . . ), 2i and 2j indicate even numbers and 2i+1 and 2j+1 indicate odd numbers. The handling of each individual case shall now be described according to each color.

Here, because the initial values of i and j are set to 0, the odd/even relationship of the value of X is inverse the odd/even relationship of the order of the columns of the pixels, and the odd/even relationship of the value of Y is inverse the odd/even relationship of the order of the rows of the pixels. For example, in the pixel array shown in FIG. 16, with the "2i-th column," for which X=2i, although the value of X is an even number, the column is actually an odd-number-th column, and with the "2j-th row," for which Y=2j, although the value of Y is an even number, the row is actually an odd-number-th row. Thus in the description that follows, odd and even shall refer strictly to the evenness/oddness of the value of X and the value of Y and do not signify the evenness/oddness of the order (which is an ordinal number starting from 1) of a column or row of the actual pixel array.

Figure 24:
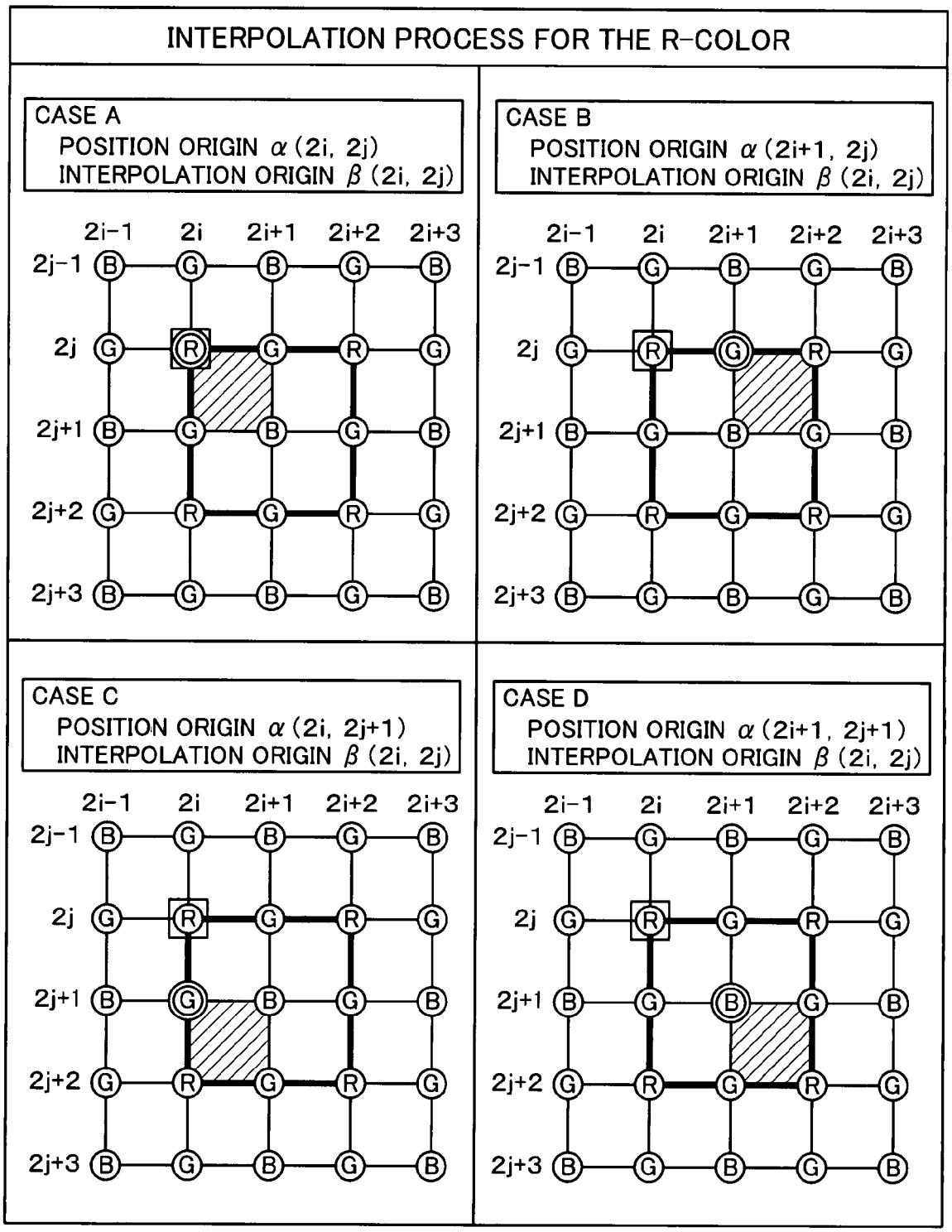
FIG. 24 is a plan view of a variation of the interpolation calculation process performed for the R-color using the interpolation device according to the present invention.

First, how cases of executing an interpolation calculation process for the R-color are handled shall be described with reference to FIG. 24. In regard to the R-color, the following four ways of handling are implemented according to the coordinate values of the position origin α(X, Y). In FIG. 24, a pixel surrounded by a double circle indicates the position origin, and a pixel surrounded by a small rectangle indicates the interpolation origin.

First, in a case where the position origin is expressed as α(2i, 2j), that is, when X is even and Y is even, the interpolation origin is set to β(2i, 2j) as shown in Case A of FIG. 24. When the position origin is α(2i, 2j), because the interpolation point Q is positioned inside the region provided with the hatching in the figure (inside the position reference frame), the interpolation reference frame indicated by the thick lines in the figure is set for performing the interpolation for the R-color. Consequently, the interpolation origin is β(2i, 2j) and matches the position origin α(2i, 2j).

Next, in a case where the position origin is expressed as α(2i+1, 2j), that is, when X is odd and Y is even, the interpolation origin is set to β(2i, 2j) as shown in Case B of FIG. 24. When the position origin is α(2i+1, 2j), because the interpolation point Q is positioned inside the region provided with the hatching in the figure (inside the position reference frame), the interpolation reference frame indicated by the thick lines in the figure is set for performing the interpolation for the R color. Consequently, the interpolation origin is β(2i, 2j) and is a lattice point adjacent to the left side of the position origin α(2i+1, 2j).

In a case where the position origin is expressed as α(2i, 2j+1), that is, when X is even and Y is odd, the interpolation origin is set to β(2i, 2j) as shown in Case C of FIG. 24. When the position origin is α(2i, 2j+1), because the interpolation point Q is positioned inside the region provided with the hatching in the figure (inside the position reference frame), the interpolation reference frame indicated by the thick lines in the figure is set for performing the interpolation for the R color. Consequently, the interpolation origin is β(2i, 2j) and is a lattice point adjacent to the upper side of the position origin α(2i, 2j+1).

Furthermore, in a case where the position origin is expressed as a (2i+1, 2j+1), that is, when X is odd and Y is odd, the interpolation origin is set to β(2i, 2j) as shown in Case D of FIG. 24. When the position origin is α(2i+1, 2j+1), because the interpolation point Q is positioned inside the region provided with the hatching in the figure (inside the position reference frame), the interpolation reference frame indicated by the thick lines in the figure is set for performing the interpolation for the R color. Consequently, the interpolation origin is β(2i, 2j) and is a lattice point adjacent diagonally to the upper left of the position origin α(2i+1, 2j+1).

Figure 25:
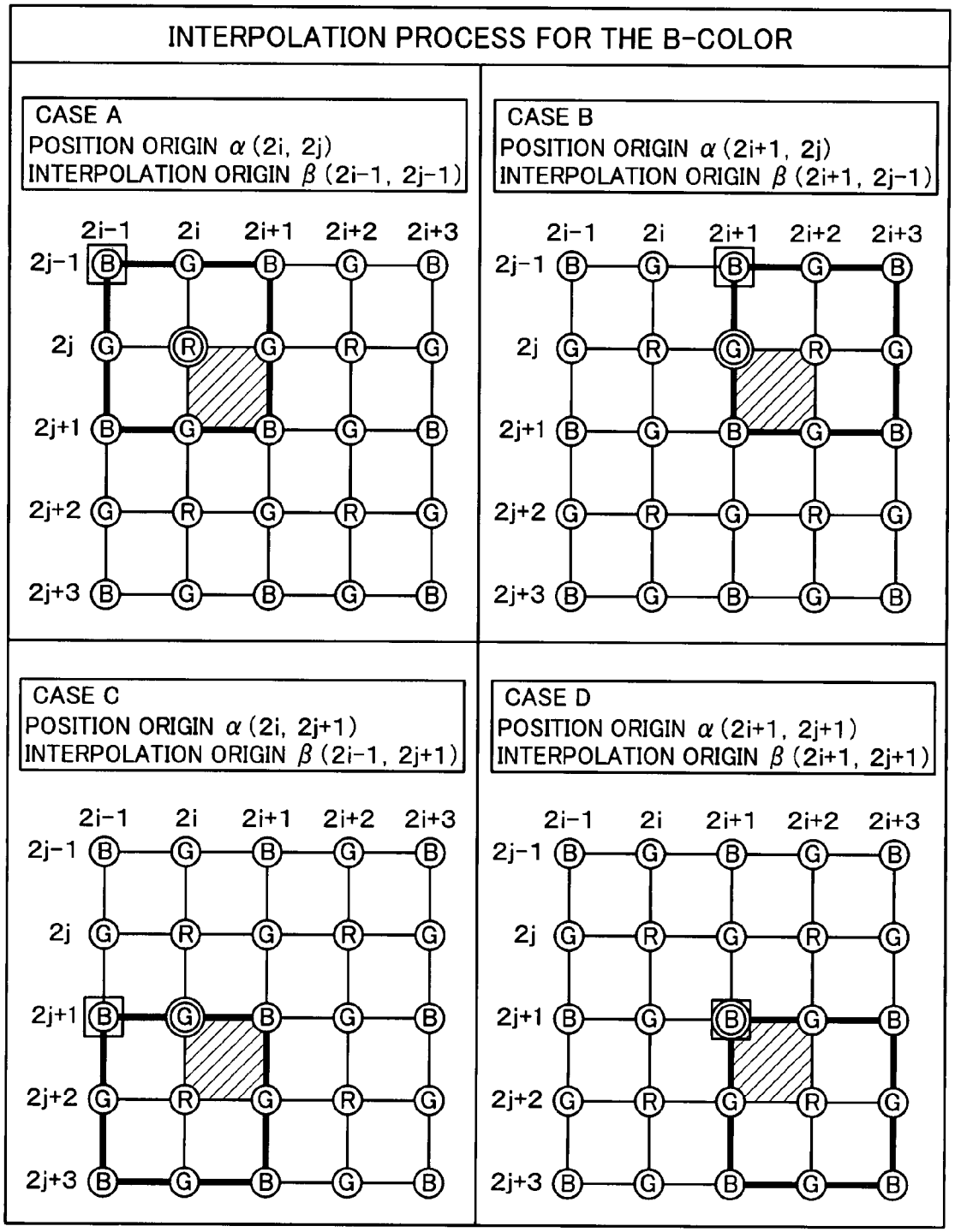
FIG. 25 is a plan view of a variation of the interpolation calculation process performed for the B-color using the interpolation device according to the present invention.

Next, the handling of cases of executing an interpolation calculation process for the B-color shall be described with reference to FIG. 25. In regard to the B-color, the following four ways of handling are implemented according to the coordinate values of the position origin α(X, Y). In FIG. 25, a pixel surrounded by a double circle indicates the position origin, and a pixel surrounded by a small rectangle indicates the interpolation origin in these cases as well.

First, in a case where the position origin is expressed as α(2i, 2j), that is, when X is even and Y is even, the interpolation origin is set to β (2i−1, 2j−1) as shown in Case A of FIG. 25. When the position origin is α(2i, 2j), because the interpolation point Q is positioned inside the region provided with the hatching in the figure (inside the position reference frame), the interpolation reference frame indicated by the thick lines in the figure is set for performing the interpolation for the B-color. Consequently, the interpolation origin is β(2i−1, 2j−1) and is a lattice point that is adjacent diagonally to the upper left of the position origin α(2i, 2j).

Next, in a case where the position origin is expressed as α(2i+1, 2j), that is, when X is odd and Y is even, the interpolation origin is set to β (2i+1, 2j−1) as shown in Case B of FIG. 25. When the position origin is α (2i+1, 2j), because the interpolation point Q is positioned inside the region provided with the hatching in the figure (inside the position reference frame), the interpolation reference frame indicated by the thick lines in the figure is set for performing the interpolation for the B-color. Consequently, the interpolation origin is β(2i+1, 2j−1) and is a lattice point adjacent to the upper side of the position origin α(2i+1, 2j).

In a case where the position origin is expressed as α(2i, 2j+1), that is, when X is even and Y is odd, the interpolation origin is set to β(2i−1, 2j+1) as shown in Case C of FIG. 25. When the position origin is α(2i, 2j+1), because the interpolation point Q is positioned inside the region provided with the hatching in the figure (inside the position reference frame), the interpolation reference frame indicated by the thick lines in the figure is set for performing the interpolation for the B-color. Consequently, the interpolation origin is β(2i−1, 2j+1) and is a lattice point adjacent to the left side of the position origin α(2i, 2j+1).

Furthermore, in a case where the position origin is expressed as α (2i+1, 2j+1), that is, when X is odd and Y is odd, the interpolation origin is set to β(2i+1, 2j+1) as shown in Case D of FIG. 25. When the position origin is α(2i+1, 2j+1), because the interpolation point Q is positioned inside the region provided with the hatching in the figure (inside the position reference frame), the interpolation reference frame indicated by the thick lines in the figure is set for performing the interpolation for the B-color. Consequently, the interpolation origin is β(2i+1, 2j+1) and matches the position origin α(2i+1, 2j+1).

Figure 26:
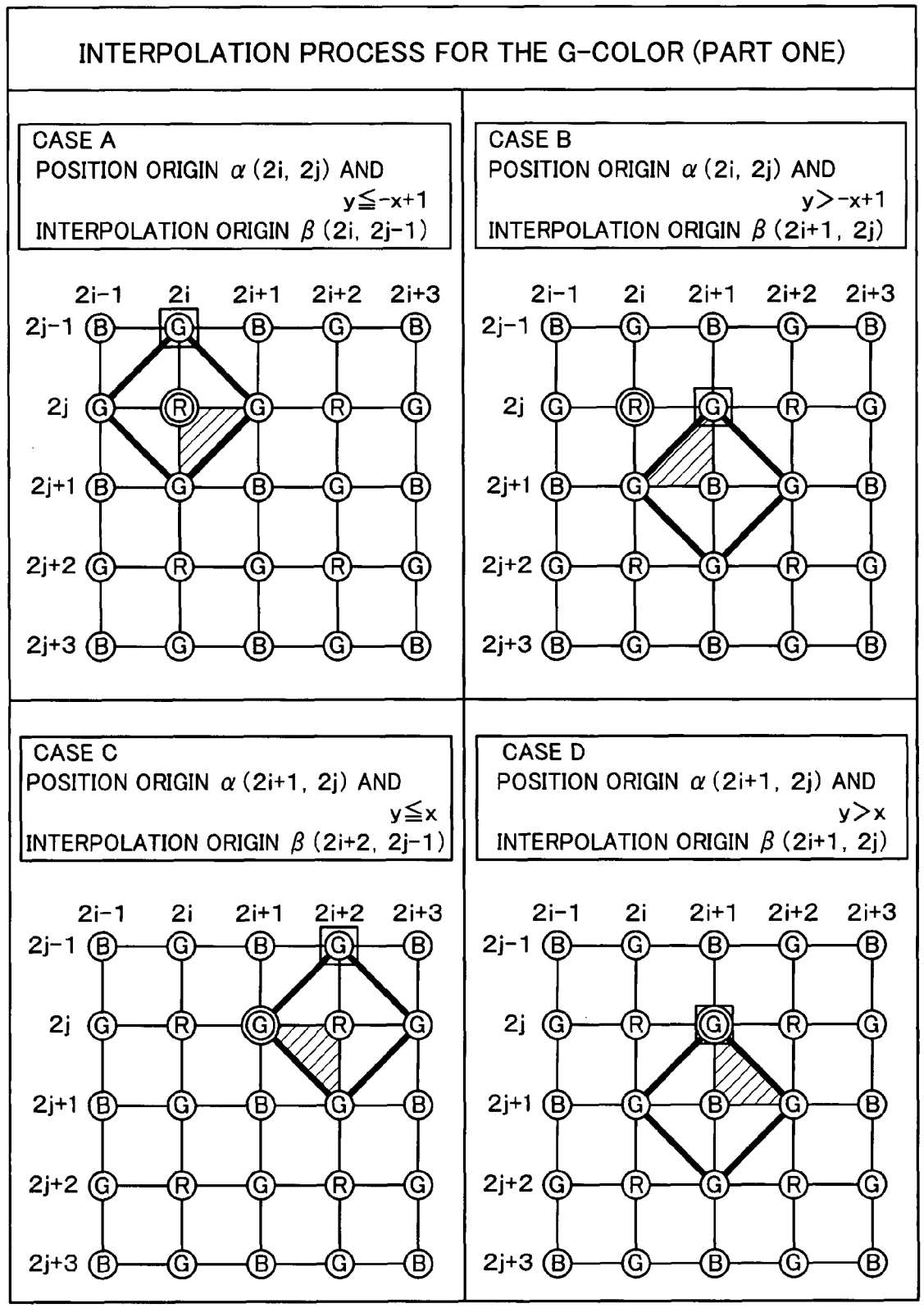
FIG. 26 is a plan view of a first variation of the interpolation calculation process performed for the G-color using the interpolation device according to the present invention.
Figure 27:
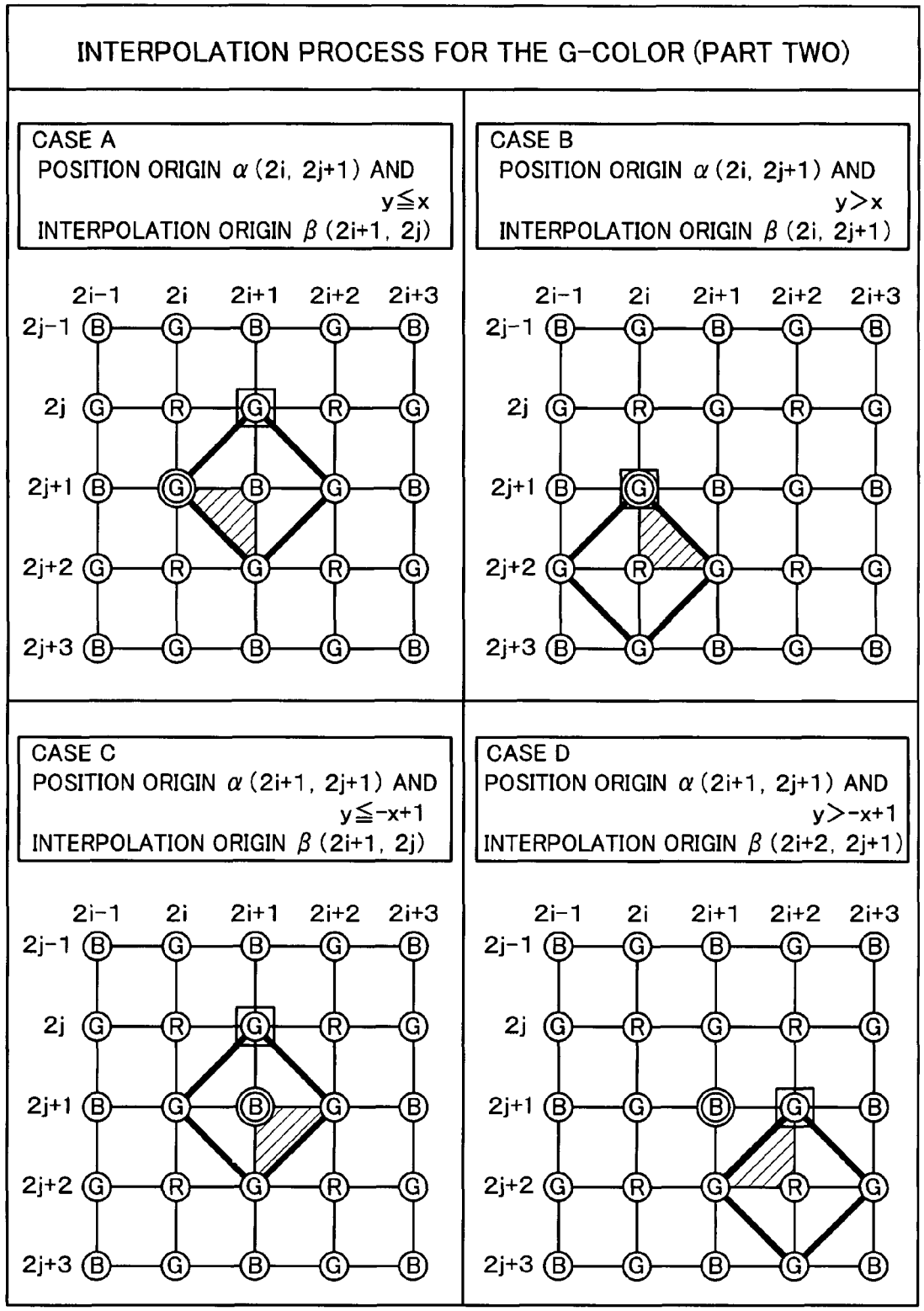
FIG. 27 is a plan view of a second variation of the interpolation calculation process performed for the G-color using the interpolation device according to the present invention.

Next, the handling of cases of executing an interpolation calculation process for the G-color shall be described with reference to FIGS. 26 and 27. In regard to the G-color, although four ways of handling are implemented according to the coordinate values of the position origin α(X, Y), one of either of two ways of handling is implemented according to the lower address (x, y) of interpolation point Q in each of these four cases. This is due to the reasons described using FIG. 23. In the figures that follow, a pixel surrounded by a double circle indicates the position origin, and a pixel surrounded by a small rectangle indicates the interpolation origin as in the other drawings described up to now.

First, in a case where the position origin is expressed as α(2i, 2j), that is, when X is even and Y is even, it is judged, based on the lower address (x, y) of the interpolation point Q, whether the condition, y≦−x+1, is satisfied (the case where the interpolation point Q is positioned in region A1 of FIG. 23) or the condition, y>−x+1, is satisfied (the case where the interpolation point Q is positioned in region A2 of FIG. 23). In the former case, the interpolation origin is set to β(2i, 2j−1) as shown in Case A of FIG. 26. When the position origin is α(2i, 2j) and the former condition is met, because the interpolation point Q is positioned inside the region provided with the hatching in the figure, the interpolation reference frame indicated by the thick lines in the figure is set for performing the interpolation for the G-color. Consequently, the interpolation origin is β(2i, 2j−1) and is a lattice point that is adjacent to the upper side of the position origin α(2i, 2j). Meanwhile when the latter condition is met, the interpolation origin is set to β(2i+1, 2j) as shown in Case B of FIG. 26. When the position origin is α (2i, 2j) and the latter condition is met, because the interpolation point Q is positioned inside the region provided with the hatching in the figure, the interpolation reference frame indicated by the thick lines in the figure is set for performing the interpolation for the G-color. Consequently, the interpolation origin is β(2i+1, 2j) and is a lattice point that is adjacent to the right side of the position origin α(2i, 2j).

Next, in a case where the position origin is expressed as α(2i+1, 2j), that is, when X is odd and Y is even, it is judged, based on the lower address (x, y) of the interpolation point Q, whether the condition, y≦x, is satisfied (the case where the interpolation point Q is positioned in region A4 of FIG. 23) or the condition, y>x, is satisfied (the case where the interpolation point Q is positioned in region A3 of FIG. 23). In the former case, the interpolation origin is set to β(2i+2, 2j−1) as shown in Case C of FIG. 26. When the position origin is a α(2i+1, 2j) and the former condition is met, because the interpolation point Q is positioned inside the region provided with the hatching in the figure, the interpolation reference frame indicated by the thick lines in the figure is set for performing the interpolation for the G-color. Consequently, the interpolation origin is β(2i+2, 2j−1) and is a lattice point that is adjacent diagonally to the upper right of the position origin α(2i+1, 2j). Meanwhile when the latter condition is met, the interpolation origin is set to β(2i+1, 2j) as shown in Case D of FIG. 26. When the position origin is α(2i+1, 2j) and the latter condition is met, because the interpolation point Q is positioned inside the region provided with the hatching, the interpolation reference frame indicated by the thick lines in the figure is set for performing the interpolation for the G-color. Consequently, the interpolation origin is β(2i+1, 2j) and matches the position origin α(2i+1, 2j).

In a case where the position origin is expressed as α(2i, 2j+1), that is, when X is even and Y is odd, it is judged, based on the lower address (x, y) of the interpolation point Q, whether the condition, y≦x, is satisfied (the case where the interpolation point Q is positioned in region A4 of FIG. 23) or the condition, y>x, is satisfied (the case where the interpolation point Q is positioned in region A3 of FIG. 23). In the former case, the interpolation origin is set to β(2i+1, 2j) as shown in Case A of FIG. 27. When the position origin is α(2i, 2j+1) and the former condition is met, because the interpolation point Q is positioned inside the region provided with the hatching in the figure, the interpolation reference frame indicated by the thick lines in the figure is set for performing the interpolation for the G-color. Consequently, the interpolation origin is β(2i+1, 2j) and is a lattice point that is adjacent diagonally to the upper right of the position origin α(2i, 2j+1). Meanwhile when the latter condition is met, the interpolation origin is set to β(2i, 2j+1) as shown in Case B of FIG. 27. When the position origin is α(2i, 2j+1) and the latter condition is met, because the interpolation point Q is positioned inside the region provided with the hatching in the figure, the interpolation reference frame indicated by the thick lines in the figure is set for performing the interpolation for the G-color. Consequently, the interpolation origin is β(2i, 2j+1) and matches the position origin α(2i, 2j+1).

Furthermore, in a case where the position origin is expressed as a (2i+1, 2j+1), that is, when X is odd and Y is odd, it is judged, based on the lower address (x, y) of the interpolation point Q, whether the condition, y≦−x+1, is satisfied (the case where the interpolation point Q is positioned in region A1 of FIG. 23) or the condition, y>−x+1, is satisfied (the case where the interpolation point Q is positioned in region A2 of FIG. 23). In the former case, the interpolation origin is set to β(2i+1, 2j) as shown in Case C of FIG. 27. When the position origin is α(2i+1, 2j+1) and the former condition is met, because the interpolation point Q is positioned inside the region provided with the hatching in the figure, the interpolation reference frame indicated by the thick lines in the figure is set for performing the interpolation for the G-color. Consequently, the interpolation origin is β (2i+1, 2j) and is a lattice point that is adjacent to the upper side of the position origin α(2i+1, 2j+1). Meanwhile when the latter condition is met, the interpolation origin is set to β(2i+2, 2j+1) as shown in Case D of FIG. 27. When the position origin is α(2i+1, 2j+1) and the latter condition is met, because the interpolation point Q is positioned inside the region provided with the hatching in the figure, the interpolation reference frame indicated by the thick lines in the figure is set for performing the interpolation for the G-color. Consequently, the interpolation origin is β (2i+2, 2j+1) and is a lattice point that is adjacent to the right side of the position origin α(2i+1, 2j+1).

That a specific interpolation origin β is associated according to each color and each individual variation based on the upper address (X, Y) that indicates the position origin α(X, Y) for an interpolation point Q and the lower address (x, y) that indicates the distances of the interpolation point Q with respect to the position origin α(X, Y) was described above. Methods for determining the interpolation proportions according to the respective variations shall now be described. As described in Section 3, the points to be noted in determining the interpolation proportions are correction for the offset amount and the correction for normalization. These corrections shall now be described according to each color. Here, for the sake of description, the distances in two directions of the interpolation point Q with respect to the interpolation origin β(that is, the distances after the offset amount correction) shall be indicated by d and e, and the values after performing the correction for normalization on these values d and e shall be indicated by d* and e*. In the interpolation calculation, the values d* and e* are used as the interpolation proportions.

First, a method for determining the interpolation proportions for the R-color shall be described with reference to FIG. 28. First, an interpolation point Q1(x, y), shown in FIG. 28, shall be considered. In regard to this interpolation point Q1(x, y), a pixel 1 is the position origin α, and because the pixel 1 is an R-color pixel, the present case corresponds to being the α (2i, 2j) case. Here, the lower address (x, y) values that indicate the position of the interpolation point Q1 are values that indicate distances with respect to the pixel 1. In this case, because as is illustrated, the interpolation origin β is also set to the pixel 1, the offset amounts are 0, the value d, indicating the distance in the lateral direction from the interpolation origin β, is such that: d=x; and the value e, indicating the distance in the vertical direction, is such that: e=y. However, because whereas the lower address (x, y) values indicate the distances under the premise that the pixel array pitch is 1, the pitch of the reference pixels for performing the R-color interpolation calculation is 2 as illustrated, the interpolation proportions d* and e* used in the interpolation calculation must be corrected for normalization and set so that: d*=d/2 and e*=e/2. Consequently in the present case, the interpolation proportions are: d*=x/2 and e*=y/2.

Figure 28:
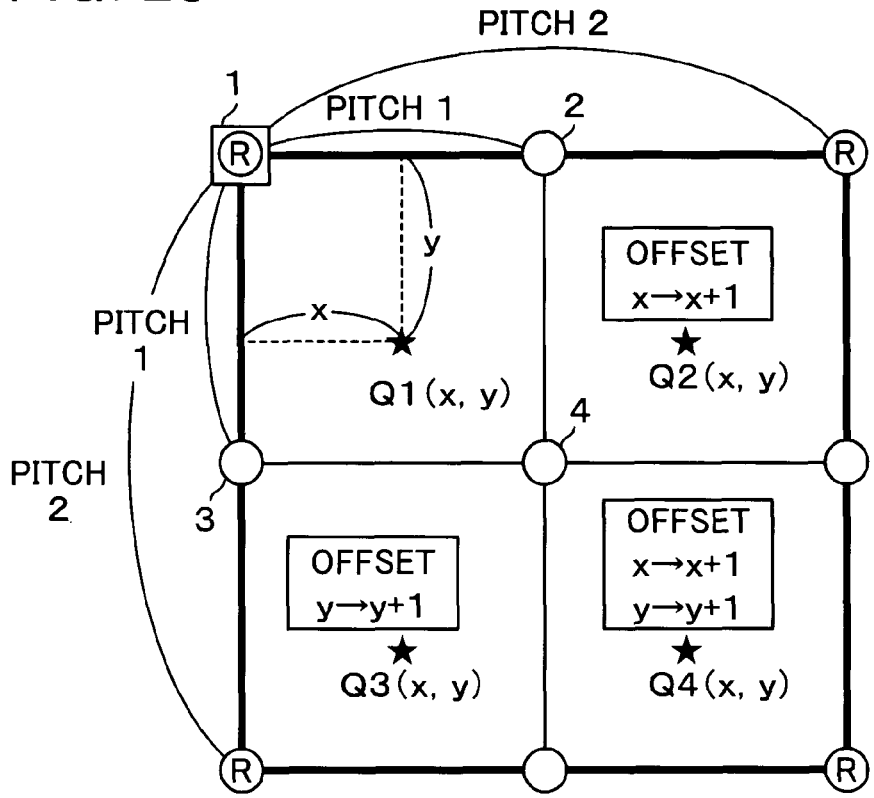
FIG. 28 is a plan view of a method for setting offset amounts concerning interpolation proportions in performing the interpolation calculation process concerning the R-color using the interpolation device according to the present invention.

Next, an interpolation point Q2(x, y), shown in FIG. 28, shall be considered. In regard to this interpolation point Q2(x, y), a pixel 2 is the position origin α, and because the pixel 2 is a pixel that is adjacent to the right side of the R-color pixel 1, the present case corresponds to being the α (2i+1, 2j) case. Here, the lower address (x, y) values that indicate the position of the interpolation point Q2 are values that indicate distances with respect to the pixel 2. In this case, because as is illustrated, the interpolation origin β is set to the pixel 1, an offset amount of 1 must be added in regard to the distance in the lateral direction. That is, the value d, indicating the distance in the lateral direction from the interpolation origin β, is such that: d=x+1; and the value e, indicating the distance in the vertical direction, is such that: e=y. Consequently in the present case, when the correction for normalization is applied, the normalization proportions are: d*=(x+1)/2 and e*=y/2.

Next, an interpolation point Q3(x, y), shown in FIG. 28, shall be considered. In regard to this interpolation point Q3(x, y), a pixel 3 is the position origin α, and because the pixel 3 is a pixel that is adjacent to the lower side of the R-color pixel 1, the present case corresponds to being the α(2i, 2j+1) case. Here, the lower address (x, y) values that indicate the position of the interpolation point Q3 are values that indicate distances with respect to the pixel 3. In this case, because as is illustrated, the interpolation origin β is set to the pixel 1, an offset amount of 1 must be added in regard to the distance in the vertical direction. That is, whereas the value d, indicating the distance in the lateral direction from the interpolation origin β, is such that: d=x; the value e, indicating the distance in the vertical direction, is such that: e=y+1. Consequently in the present case, when the correction for normalization is applied, the interpolation proportions are: d*=x/2 and e*=(y+1)/2.

Furthermore, an interpolation point Q4(x, y), shown in FIG. 28, shall be considered. In regard to this interpolation point Q4(x, y), a pixel 4 is the position origin α, and because the pixel 4 is a pixel that is adjacent diagonally to the lower right of the R-color pixel 1, the present case corresponds to being the α(2i+1, 2j+1) case. Here, the lower address (x, y) values that indicate the position of the interpolation point Q4 are values that indicate distances with respect to the pixel 4. In this case, because as is illustrated, the interpolation origin β is set to the pixel 1, an offset amount of 1 must be added in regard to the distance in the lateral direction and an offset amount of 1 must also be added in regard to the distance in the vertical direction. That is, the value d, indicating the distance in the lateral direction from the interpolation origin β, is such that: d=x+1; and the value e, indicating the distance in the vertical direction, is such that: e=y+1. Consequently in the present case, when the correction for normalization is applied, the normalization proportions are: d*=(x+1)/2 and e*=(y+1)/2.

The method for determining the interpolation proportions for the R-color was described above, and the interpolation proportions for the B-color can be determined by substantially the same method. That is, as can be understood from viewing the Bayer pattern array, shown in FIG. 1, the R and B colors differ only in the even/odd relationships of the rows and columns, it suffices to apply the cases of (2i, 2j), (2i+1, 2j), (2i, 2j+1), and (2i+1, 2j+1) for the R-color to the cases of (2i+1, 2j+1), (2i, 2j+1), (2i+1, 2j), and (2i, 2j), respectively, for the B color.

Figure 29:
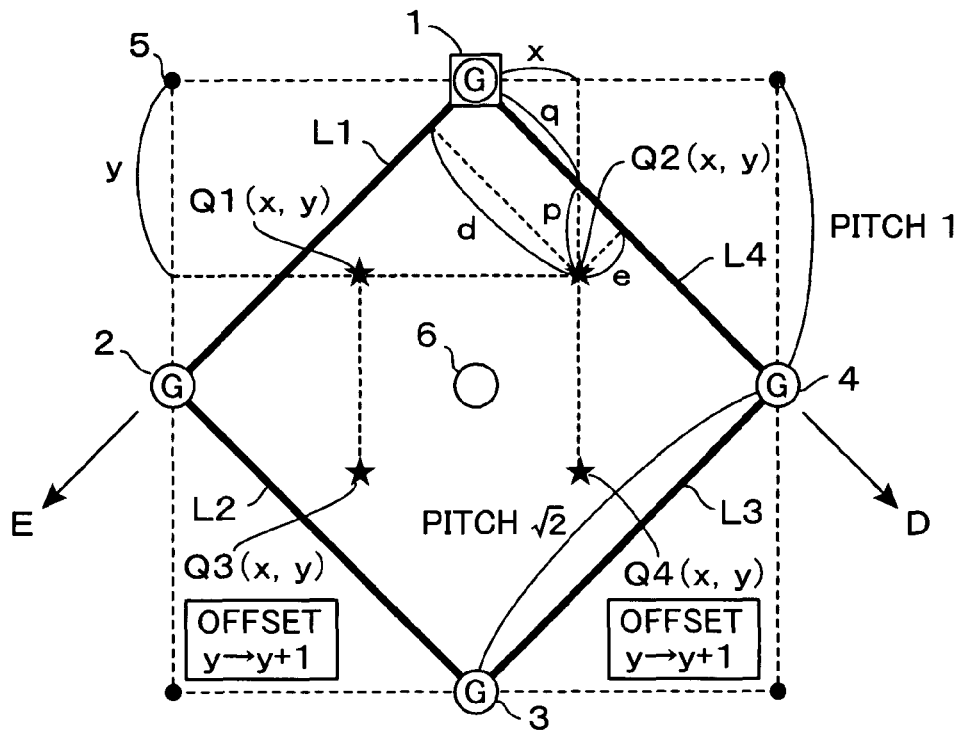
FIG. 29 is a plan view of a method for setting offset amounts concerning interpolation proportions in performing the interpolation calculation process concerning the G-color using the interpolation device according to the present invention.

A method for determining interpolation proportions for the G-color shall now be described with reference to FIG. 29. In FIG. 29, four interpolation points Q1(x, y), Q2(x, y), Q3(x, y), and Q4(x, y) are shown. Because an interpolation reference frame in common (the square indicated by the thick lines) is determined for these four interpolation points, the interpolation origin is set to the position of the pixel 1 for all four points. However, because these four interpolation points all differ in the position origin and because the lower address (x, y) values are values that indicate distances from the respective position origins, a procedure that takes offset amounts into consideration is necessary.

First, with the interpolation point Q1(x, y), the position origin is set at the position of the pixel 5, and in performing the interpolation calculation for the G-color, the lower address (x, y) values of the interpolation point Q(x, y) must be converted into the distance d in the first direction D and the distance e in the second direction E as shown in FIG. 15. As mentioned in Section 2, the conversion equations are:

$$d=(y+x-1)/\sqrt{2}; \text{ and}$$

$$e=(y-x+1)/\sqrt{2}.$$

As long as the values of x and y are converted to the values of d and e using these conversion equations, offset amounts do not need to be considered.

The interpolation point Q2(x, y) shall now be considered. In FIG. 29, $$\text{because } p = y \cdot x,$$
$$e = p/\sqrt{2} = (y \cdot x)/\sqrt{2}.$$
$$\text{Also, because } q = x \cdot \sqrt{2},$$
$$d = q + e$$
$$= x \cdot \sqrt{2} + (y \cdot x)/\sqrt{2}$$
$$= (y + x)/\sqrt{2}. \text{ Consequently,}$$
$$d = (y + x)/\sqrt{2}; \text{ and}$$
$$e = (y \cdot x)/\sqrt{2}.$$

Because in deriving these conversion equations, the lateral direction distance from the pixel 1 (position origin of the interpolation point Q2(x, y)) is used as the value of x as shown in FIG. 29, as long as the values of x and y are converted to the values of d and e using these conversion equations, offset amounts do not need to be considered.

Meanwhile, with the interpolation point Q3(x, y), because the position origin is set at the position of the pixel 2, although the same conversion equations as those of the interpolation point Q1(x, y) can be used to convert the values of x and y to the values of d and e, because an offset amount of 1 must be added in regard to the y direction, the y in the conversion equations for the interpolation point Q1(x, y) is substituted by y+1 to obtain the conversion equations:

$$d=(y+x)/\sqrt{2}; \text{ and}$$

$$e=(y-x+2)/\sqrt{2}.$$

Also, with the interpolation point Q4(x, y), because the position origin is set at the position of the pixel 6, although the same conversion equations as those of the interpolation point Q2(x, y) can be used to convert the values of x and y to the values of d and e, because an offset amount of 1 must be added in regard to the y direction, the y in the conversion equations for the interpolation point Q2(x, y) is substituted by y+1 to obtain the conversion equations:

$$d=(y+x+1)/\sqrt{2}; \text{ and}$$

$$e=(y-x+1)/\sqrt{2}.$$

The interpolation proportions d* and e* for the respective cases shall now be examined with the above points in consideration. First, the interpolation point Q1(x, y), shown in FIG. 29, shall be considered. With the interpolation point Q1(x, y), the pixel 5 is the position origin α and because the pixel 5 is not a G-color pixel, the present case corresponds to the case of α(2i, 2j) and y>−x+1. Here, the lower address (x, y) values that indicate the position of the interpolation point Q1 are values that indicate distances with respect to the pixel 5, and the distance d in the first direction D and the distance e in the second direction E can be determined as follows by the above-mentioned conversion equations for the interpolation point Q1(x, y):

$$d=(y+x-1)/\sqrt{2}$$

$$e=(y-x+1)/\sqrt{2}.$$

Because the pitch of reference pixels in the interpolation calculation for the G-color is $\sqrt{2}$ as shown in the figure, d* and e* are determined by the following computations, in which a correction of multiplying by $1/\sqrt{2}$ is performed for normalization:

$$d^*=(y+x-1)/2$$

$$e^*=(y-x+1)/2.$$

The case of α(2i, 2j) and y≦−x+1 (the case where, in FIG. 29, the interpolation point Q1(x, y) is moved to the upper side of the lattice line L1) is equivalent to the case of the interpolation point Q4(x, y) to be described below.

Next, the interpolation point Q2(x, y), shown in FIG. 29, shall be considered. With the interpolation point Q2(x, y), the pixel 1 is the position origin α and because the pixel 1 is a G-color pixel, the present case corresponds to the case of α(2i+1, 2j) and y>x. Here, the lower address (x, y) values that indicate the position of the interpolation point Q2 are values that indicate distances with respect to the pixel 1, and the distance d in the first direction D and the distance e in the second direction E can be determined as follows by the above-mentioned conversion equations for the interpolation point Q2(x, y):

$$d=(y+x)/\sqrt{2}$$

$$e=(y-x)/\sqrt{2}.$$

Because the pitch of reference pixels in the interpolation calculation for the G-color is $\sqrt{2}$ as shown in the figure, d* and e* are determined by the following computations, in which a correction of multiplying by $1/\sqrt{2}$ is performed for normalization:

$$d^*=(y+x)/2$$

$$e^*=(y-x)/2.$$

The case of α(2i+1, 2j) and y≦x (the case where, in FIG. 29, the interpolation point Q2(x, y) is moved to the upper side of the lattice line L4) is equivalent to the case of the interpolation point Q3(x, y) to be described below.

Next, the interpolation point Q3(x, y), shown in FIG. 29, shall be considered. With the interpolation point Q3(x, y), the pixel 2 is the position origin α and because the pixel 2 is a G-color pixel, the present case corresponds to the case of α(2i, 2j+1) and y≦x. Here, the lower address (x, y) values that indicate the position of the interpolation point Q3 are values that indicate distances with respect to the pixel 2, and the distance d in the first direction D and the distance e in the second direction E can be determined as follows by the above-mentioned conversion equations for the interpolation point Q3(x, y):

$$d=(y+x)/\sqrt{2}$$

$$e=(y-x+2)/\sqrt{2}.$$

Because the pitch of reference pixels in the interpolation calculation for the G-color is $\sqrt{2}$ as shown in the figure, the interpolation proportion d* and e* used for the interpolation calculation are determined by the following computations, in which a correction of multiplying by $1/\sqrt{2}$ is performed for normalization:

$$d^*=(y+x)/2$$

$$e^*=(y-x+2)/2.$$

The case of α(2i, 2j+1) and y>x (the case where, in FIG. 29, the interpolation point Q3(x, y) is moved to the lower side of the lattice line L2) is equivalent to the above-described case of the interpolation point Q2(x, y).

Next, the interpolation point Q4(x, y), shown in FIG. 29, shall be considered. With the interpolation point Q4(x, y), the pixel 6 is the position origin α and because the pixel 6 is not a G-color pixel, the present case corresponds to the case of α(2i+1, 2j+1) and y≦−x+1. Here, the lower address (x, y) values that indicate the position of the interpolation point Q4 are values that indicate distances with respect to the pixel 6, and the distance d in the first direction D and the distance e in the second direction E can be determined as follows by the abovementioned conversion equations for the interpolation point Q4(x, y):

$$d=(y+x+1)/\sqrt{2}$$

$$e=(y-x+1)/2.$$

Because the pitch of reference pixels in the interpolation calculation for the G-color is $\sqrt{2}$ as shown in the figure, the interpolation proportion d* and e* used for the interpolation calculation are determined by the following computations, in which a correction of multiplying by $1/\sqrt{2}$ is performed for normalization:

$$d^*=(y+x+1)/2$$

$$e^*=(y-x+1)/2.$$

The case of α(2i+1, 2j+1) and y>−x+1 (the case where, in FIG. 29, the interpolation point Q4(x, y) is moved to the lower side of the lattice line L3) is equivalent to the above-described case of the interpolation point Q1(x, y).

The interpolation proportions d* and e* can thus be determined according to each color and each individual variation based on the upper address (X, Y) that indicates the position origin α(X, Y) for an interpolation point Q and the lower address (x, y) that indicates the distances of the interpolation point Q with respect to the position origin α(X, Y).

FIG. 30 is a table that summarizes the contents described in this Section 4, and by referencing this table, the interpolation origin β and the interpolation proportions d* and e* corresponding to each color and each individual variation can be determined based on the upper address (X, Y) that indicates the position origin α(X, Y) for an interpolation point Q and the lower address (x, y) that indicates the distances (detailed position) of the interpolation point Q with respect to the position origin α(X, Y). The leftmost column indicates the color types of R, B, and G, the column (position origin) to the right thereof indicates the odd/even combinations of the integer values X and Y of the position origin α(X, Y), and the column (detailed position) further to the right indicates the types of conditional judgment results concerning the values of x and y that indicate the lower address. The interpolation origin β and the interpolation proportions d* and e* corresponding to the total of 16 variations resulting from the combinations of color and addresses are shown in the respective columns further to the right.

Thus in the case of a pixel array based on a Bayer pattern, by preparing a table such as that shown in FIG. 30, when any interpolation point Q is given, the interpolation origin β and the interpolation proportions d* and e* can be determined uniquely based on the upper address (X, Y) and the lower address (x, y) of the interpolation point Q, and based on the interpolation origin β, the interpolation reference frame can be determined and the reference pixels used in the interpolation calculation can be determined, and based on the respective pixel values of the reference pixels and the interpolation proportions d* and e*, a predetermined interpolation calculation process can be executed to determine the respective R-color, G-color, and B-color pixel values to be provided to the interpolation point Q.

For example, when an interpolation point Q, such as shown in FIG. 16 is given, the pixel 1 becomes the position origin α and a certain upper address (X, Y) and lower address (x, y) are determined. With this example, because the upper address (X, Y)=(2i, 2j) and the condition, y≦−x+1, is satisfied by the lower address (x, y), the interpolation calculation process can be executed for each color by referencing the table shown in FIG. 30.

That is, for the R color, because by referencing the row for α(2i, 2j) in FIG. 30, the interpolation origin β(2i, 2j) and the interpolation proportions d*=x/2 and e*=y/2 are obtained, the square having the positions indicated by (2i, 2j), (2i+2, 2j), (2i, 2j+2), and (2i+2, 2j+2) in the pixel array shown in FIG. 16 as the four vertices (the lattice frame of the double-pitch square lattice having just R-color pixels as elements) is determined as the interpolation reference frame. If the "four-point referencing bi-cubic spline interpolation" is to be performed, all 16 R-color pixels, contained in a lattice frame of the R-color, double-pitch square lattice that is of a larger size than the interpolation reference frame (the square, which in FIG. 16, has the position indicated by (2i−2, 2j−2) and the position indicated by (2i+4, 2j+4) as opposing corners), are used as reference pixels, and interpolation calculation using the interpolation proportions d*=x/2 and e*=y/2 is performed to obtain the R-color pixel value to be assigned to the interpolation point Q.

Meanwhile, for the B-color, because by referencing the row for α(2i, 2j) in FIG. 30, the interpolation origin β(2i−1, 2j−1) and the interpolation proportions d*=(x+1)/2 and e*=(y+1)/2 are obtained, the square having the positions indicated by (2i−1, 2j−1), (2i+1, 2j−1), (2i−1, 2j+1), and (2i+1, 2j+1) in the pixel array shown in FIG. 16 as the four vertices (the lattice frame of the double-pitch square lattice having just B-color pixels as elements) is determined as the interpolation reference frame. If the "four-point referencing bi-cubic spline interpolation" is to be performed, all 16 B-color pixels, contained in a lattice frame of the B-color, double-pitch square lattice that is of a larger size than the interpolation reference frame (the square, which, though jutting out slightly to the upper left from the pixel array shown in FIG. 16, has the position indicated by (2i−3, 2j−3) and the position indicated by (2i+3, 2j+3) as opposing corners), are used as reference pixels, and interpolation calculation using the interpolation proportions d*=(x+1)/2 and e*=(y+1)/2 is performed to obtain the B-color pixel value to be assigned to the interpolation point Q.

Furthermore, for the G-color, because by referencing the row for a (2i, 2j) and y≦−x+1 in FIG. 30, the interpolation origin β(2i, 2j−1) and the interpolation proportions d*=(y+x+1)/2 and e*=(y−x+1)/2 are obtained, the square, inclined diagonally by 45° and having the positions indicated by (2i, 2j−1), (2i−1, 2j), (2i+1, 2j), and (2i, 2j+1) in the pixel array shown in FIG. 16 as the four vertices (the lattice frame of the √2-pitch square lattice having just G-color pixels as elements) is determined as the interpolation reference frame. If the "four-point referencing bi-cubic spline interpolation" is to be performed, all 16 G-color pixels, contained in a lattice frame of the G-color, √2-pitch square lattice that is of a larger size than the interpolation reference frame (the square, which, though jutting out slightly from the pixel array shown in FIG. 16, is inclined diagonally by 45° and has the positions indicated by (2i, 2j−3), (2i−3, 2j), (2i+3, 2j), and (2i, 2j+3) as the four vertices), are used as reference pixels, and interpolation calculation using the interpolation proportions d*=(y+x+1)/2 and e*=(y−x+1)/2 is performed to obtain the G-color pixel value to be assigned to the interpolation point Q.

<<<Section 5. Arrangement of an Interpolation device According to the Present Invention>>>

A basic arrangement of an interpolation device according to the present invention shall now be described with reference to the block diagram of FIG. 31. This interpolation device has a function of determining pixel values of m types of colors of an interpolation point Q at any position on an XY coordinate system by interpolation calculation based on individual pixel values obtained by an image pickup apparatus, in which a total of m types of light receiving elements (optical elements), each having functions of detecting, in regard to a received light, a light amount of a specific color and outputting the light amount as a pixel value, are respectively positioned periodically according to predetermined regular patterns at positions of specific lattice points on a square lattice defined on the XY coordinate system. Because the embodiment described in Section 2 to Section 4 is an embodiment for the case of m=3, that is, an embodiment that handles a color image constituted of respective pixels of the three primary colors R, G, and B, m shall be set equal to 3 and an embodiment for the three primary colors R, G, and B shall be described here as well. In particular, an example with a Bayer pattern array, where, for the three primary colors R, G, and B, the pixels are arrayed in the order, RGRGRGRGR . . . , in odd rows and in the order, GBGBGBGBGB . . . , in even rows, shall be described.

As illustrated, this interpolation device is constituted of the respective components of a pixel value input unit 110, a pixel value storage unit 120, an interpolation calculation unit 130, an interpolation proportion determining unit 140, an interpolation reference frame determining unit 150, a calculation target color designating unit 160, and an interpolation point designating unit 170. For practical use, these components are all realized by incorporating predetermined programs in a computer or a peripheral device. In particular, the main functions of the interpolation calculation unit 130, the interpolation proportion determining unit 140, the interpolation reference frame determining unit 150, the calculation target color designating unit 160, and the interpolation point designating unit 170 are functions that are realized by computer software. The functions of the respective components shall now be described in order.

(1) Pixel Value Input Unit 110 and Pixel Value Storage Unit 120

The pixel value input unit 110 is a component for inputting the pixel values output from the individual light receiving elements that constitute the image pickup apparatus, and the pixel value storage unit 120 is a component that stores the input pixel values in the form of a pixel value array, with which the pixel values are associated with the positions of the respective lattice points on the square lattice defined on the XY coordinate system. The pixel value storage unit 120 is, for example, constituted of a memory chip or other storage device, and each individual pixel value is stored, for example, as 8-bit digital data in the pixel value storage unit 120. The pixel value input unit 110 serves a role of intermediating between the image pickup apparatus and the pixel value storage unit 120, and in a case where the signal output from the image pickup apparatus is an analog signal, the pixel value input unit 110 must be provided with a function of converting this signal into a digital signal.

(2) Interpolation Point Designating Unit 170

The interpolation point designating unit 170 is a component with a function of designating the interpolation point Q for which pixel values are to be determined by interpolation calculation. As mentioned above, with the present invention, the position of the interpolation point Q is designated by an upper address (X, Y) and a lower address (x, y). The smallest square, which contains the interpolation point Q to be subject to interpolation with which lattice points on the square lattice constitute the four vertices, is set as the position reference frame, a vertex, among the four vertices constituting the position reference frame, that occupies a relative position that has been determined in advance is set as the position origin α, and the upper address (X, Y) is defined as the address that indicates the position origin α. Although with the embodiment described in Section 2 to Section 4, the position origin α is set as the upper left vertex of the position reference frame, as long as it is a vertex, which, among the four vertices constituting the position reference frame, occupies a relative position that has been determined in advance, the position origin α does not necessarily have to be set to the upper left vertex. For example, the position origin α may be set to the upper right vertex, the lower left vertex, or the lower right vertex of the position reference frame. That is, it suffices that a relationship, such that one and only one position reference frame is determined for a single position origin α and conversely one and only one position origin α is determined for a single position reference frame, holds. Put in another way, the determination of the position reference frame and the determination of the position origin α are essentially the same. An embodiment, with which, as in the embodiment described in Section 2 to Section 4, the position origin α is set as the upper left vertex of the position reference frame, shall be described below.

The upper address (X, Y) that indicates the position of the interpolation point Q is the address that indicates the position of the position origin α. Here, by setting the lattice point pitch of the square lattice defined on the XY coordinate system to 1, the position of an arbitrary lattice point is made to be indicated using X and Y with integer values. Specifically, each of X and Y takes on a value, such as 0, 1, 2, . . . , and the upper address (X, Y) indicates the lattice point (pixel) at the X-th column and Y-th row.

Meanwhile, the lower address (x, y) that indicates the position of the interpolation point Q is an address that indicates the position of the interpolation point Q in an xy coordinate system that is defined as a local coordinate system inside the position reference frame. As shown in FIG. 17, with the embodiment described here, for each individual position reference frame, an xy local coordinate system is defined with which the position origin α, defined as the upper left vertex of the position reference frame, is set as the origin, the right direction is set as the positive x-axis direction, and the downward direction is set as the positive y-axis direction. Because the length of a single side of the position reference frame is the same as the lattice point pitch of 1, the variables x and y take on values within the ranges of $0 \leq x < 1$ and $0 \leq y < 1$.

Thus with the embodiment described here, the interpolation point designating unit 170 has a function of designating the integer portion of the coordinate values on the XY coordinate system of the interpolation point Q by the upper address (X, Y) and the decimal portion by the lower address (x, y) when the vertical and lateral lattice intervals of the square lattice defined on the XY coordinate system are set to 1. For example, when the vertical and lateral lattice intervals of the square lattice are set to 1, the position of an interpolation point Q, at a position separated from the origin of the coordinate system by just 12.7 in the X-axis direction and by just 28.4 in the Y-axis direction, can be designated by the upper address (12, 28), which is constituted of the integer portions of the respective coordinate values, and the lower address (0.7, 0.4), which is constituted of the decimal portions of the respective coordinate values.

The interpolation device according to the present invention is mainly used for performing interpolation for magnification, reduction, or other form of scaling of an image. In the case of use in such an application, the interpolation point designating unit 170 is preferably provided with a function of automatically designating, on the basis of vertical direction and lateral direction magnification factors provided from the exterior, a plurality of interpolation points Q, for which interpolation calculation is required, at pitches that are the inverse of the magnification factors. For example, when an original image is to be magnified by 3 times vertically and laterally, because new pixels must be generated at pitches that are ⅓ the respective pitches in the vertical and lateral directions of the original pixel array, by providing the interpolation point designating unit 170 with a function of successively and automatically generating points, at which new pixels need to be generated, as the interpolation points Q, the image magnification process can be performed automatically.

(3) Calculation Target Color Designating Unit 160

The calculation target color designating unit 160 has a function of designating to the interpolation calculation unit 130, the interpolation proportion determining unit 140, and the interpolation reference frame determining unit 150, m types of colors successively as calculation target colors, for each of which a pixel value is to be computed, each time the interpolation point designating unit 170 designates a single interpolation point Q. Because with the embodiment described here, m=3 and a color image, constituted of pixels of the three primary colors R, G, and B, is handled, when the interpolation point designating unit 170 designates a single interpolation point Q, the calculation target designating unit 160 first designates the R-color as the calculation target color for the interpolation point Q, then designates the G-color when the R-color pixel value has been determined, and then designates the B-color when the G-color pixel value has been determined.

(4) Interpolation Reference Frame Determining Unit 150

The interpolation reference frame determining unit 150 has a function of determining, for the interpolation point Q designated by the interpolation point designating unit 170, an interpolation reference frame in regard to the color designated by the calculation target color designating unit 160. Here, the interpolation reference frame is defined as the smallest square that contains the interpolation point Q, designated by the interpolation point designating unit 170, and has, as the four vertices, lattice points, at which are positioned pixels corresponding to light receiving elements having the function of detecting the calculation target color designated by the calculation target color designating unit 160. As mentioned above, in the present application, the interpolation reference frame is indicated in the figures as a square with thick lines.

The interpolation reference frame determining unit 150 also has a function of determining, from among the four vertices constituting the interpolation reference frame, a vertex, occupying a relative position that has been determined in advance, as the interpolation origin β. Because as with the position origin α, the interpolation origin β is also a lattice point on the square lattice, it can be defined by an address (X*, Y*) using integer values X* and Y*. With the embodiment described in Section 2 to Section 4, for each of the R and B-colors, the upper left vertex of the square that constitutes interpolation reference frame is set as the interpolation origin β, and for the G-color, because the interpolation reference frame is a square that is rotated by 45°, the uppermost vertex is set as the interpolation origin β.

The interpolation origin β does not have to be set to the upper left vertex or the uppermost vertex as long as it is set to a vertex, which, among the four vertices constituting the interpolation reference frame, occupies a relative position that has been determined in advance. For example, for each of the R and B colors, the interpolation origin β may be set to the upper right vertex, the lower left vertex, or the lower right vertex of the interpolation reference frame, and for the G color, the interpolation origin β may be set to the lowermost vertex, the leftmost vertex, or the rightmost vertex of the interpolation reference frame. That is, it suffices that a relationship, such that one and only one interpolation reference frame is determined for a single interpolation origin β and conversely one and only one interpolation origin β is determined for a single interpolation reference frame, holds. Put in another way, the determination of the interpolation reference frame and the determination of the interpolation origin β are essentially the same.

Here, an embodiment shall be described with which the interpolation reference frame determining unit 150 determines the interpolation origin β based on an algorithm that selects, from among the vertices of the smallest Y coordinate value among the four vertices constituting the interpolation reference frame, the vertex of the smallest X coordinate value and determines the selected vertex as the interpolation origin β. According to this algorithm, for each of the R and B-colors, the upper left vertex of the interpolation reference frame becomes the interpolation origin β, and for the G-color, the uppermost vertex of the interpolation reference frame becomes the interpolation origin β. This method of handling is the same as that of the embodiment described in Section 2 to Section 4.

The interpolation reference frame determining unit 150 thus performs a process of determining, based on the upper address (X, Y) and the lower address (x, y) of the interpolation point Q provided from the interpolation point designating unit 170, the interpolation reference frame and the interpolation origin β for each individual color designated by the calculation target color designating unit 160. Because as mentioned above, the interpolation reference frame is the "smallest square, containing the interpolation point Q and having the four vertices constituted of lattice points at which pixels of the designated color are positioned," in determining the interpolation reference frame, the regular patterns (periodic positioning patterns) of the positioning of the pixels of the respective colors of the input color image data must be referenced.

With the embodiment described here, because, as mentioned above, the pixel array of the respective colors of the input color image data is formed in accordance to predetermined regular patterns based on the Bayer pattern array, the interpolation reference frame determining unit 150 performs a process of determining the interpolation reference frame for each color with the regular pattern based on the Bayer pattern array as a premise. Because if the pixel array of each color is a periodic regular pattern, a program, for determining the interpolation reference frame for any interpolation point Q based on a predetermined algorithm, can be prepared, the interpolation reference frame determining unit 150 can be constituted by a function of a computer in which such a program is installed. However, for practical use, it is sufficient that a table be prepared in consideration of the predetermined regular patterns and the interpolation reference frame be determined (the interpolation origin β set determined) by referencing this table.

Specifically, a portion of the table shown in FIG. 30 serves the role of the abovementioned table. That is, by preparing the respective data of the "position origin," "detailed position," and "interpolation origin" columns in the table shown in FIG. 30 as a table in the interpolation reference frame determining unit 150, the interpolation reference frame (the interpolation origin β(X*, Y*)) can be determined for each color by referencing this table. The data of the "position origin" column in the table of FIG. 30 correspond to the upper address (X, Y) of the interpolation point Q provided from the interpolation point designating unit 170, that is, correspond to the position origin α(X, Y) and are data that indicate the odd/even variations of the integer values X and Y. The interpolation reference frame determining unit 150 can thus determine the interpolation origin β by using four types of mutually different interpolation origin determining algorithms according to whether the X in the upper address (X, Y), provided from the interpolation point designating unit 170, is even or odd and whether the Y is even or odd.

For example, if the upper address (12, 28) is provided, because both X and Y are even, this corresponds to being the case of α(2i, 2j) (here, i=6 and j=14). Because for the color R, the interpolation origin β (2i, 2j) is thus determined by referencing the table, by substituting i=6 and j=14; the interpolation origin β(12, 28) is obtained. Also, for the color B, because the interpolation origin β (2i−1, 2j−1) is determined by referencing the table, by substituting i=6 and j=14, the interpolation origin β(11, 27) is obtained. In such a case where a color, which, as with the R-color and the B-color in the Bayer pattern array, has a pixel array such that an interpolation reference frame with sides that are parallel to the lattice lines of the square lattice is formed, is designated as the calculation target color, the interpolation reference frame can be determined using just the upper address (X, Y).

On the other hand, if a color, which, as with the G-color in the Bayer pattern array, has a pixel array such that an interpolation reference frame with sides that are not parallel to the lattice lines of the square lattice is formed, is designated as the calculation target color, the interpolation reference frame must be determined using both the upper address (X, Y) and the lower address (x, y). With the above example, to determine the interpolation reference frame for the G-color, the upper address (12, 28) and the lower address (x, y) are needed. For example, if the lower address is (0.7, 0.4), because x=0.7 and y=0.4, this corresponds to being the case of a (2i, 2j) and "y>−x+1" for the G-color in the table of FIG. 30 (in this case, i=6 and j=14). Thus for the color G, because the interpolation origin β(2i+1, 2j) is determined by referencing the table, by substituting i=6 and j=14, the interpolation origin β(13, 28) is obtained.

To summarize the process by which the interpolation reference frame determining unit 150 determines the interpolation origin β by referencing the table of FIG. 30, with i and j being integers, when the designated calculation target color is the R-color and the designated upper address (X, Y) is expressed in the form of (2i, 2j), the position of the lattice point indicated by the address (2i, 2j) is determined as the interpolation origin β, when the designated calculation target color is the R-color and the designated upper address (X, Y) is expressed in the form of (2i+1, 2j), the position of the lattice point indicated by the address (2i, 2j) is determined as the interpolation origin β, when the designated calculation target color is the R-color and the designated upper address (X, Y) is expressed in the form of (2i, 2j+1), the position of the lattice point indicated by the address (2i, 2j) is determined as the interpolation origin β, when the designated calculation target color is the R-color and the designated upper address (X, Y) is expressed in the form of (2i+1, 2j+1), the position of the lattice point indicated by the address (2i, 2j) is determined as the interpolation origin β, when the designated calculation target color is the B-color and the designated upper address (X, Y) is expressed in the form of (2i, 2j), the position of the lattice point indicated by the address (2i−1, 2j−1) is determined as the interpolation origin β, when the designated calculation target color is the B-color and the designated upper address (X, Y) is expressed in the form of (2i+1, 2j), the position of the lattice point indicated by the address (2i+1, 2j−1) is determined as the interpolation origin β, when the designated calculation target color is the B-color and the designated upper address (X, Y) is expressed in the form of (2i, 2j+1), the position of the lattice point indicated by the address (2i−1, 2j+1) is determined as the interpolation origin β, when the designated calculation target color is the B-color and the designated upper address (X, Y) is expressed in the form of (2i+1, 2j+1), the position of the lattice point indicated by the address (2i+1, 2j+1) is determined as the interpolation origin β, when the designated calculation target color is the G-color, the designated upper address (X, Y) is expressed in the form of (2i, 2j), and the designated lower address (x, y) meets the condition, y≦−x+1, the position of the lattice point indicated by the address (2i, 2j−1) is determined as the interpolation origin β, when the designated calculation target color is the G-color, the designated upper address (X, Y) is expressed in the form of (2i, 2j), and the designated lower address (x, y) meets the condition, y>−x+1, the position of the lattice point indicated by the address (2i+1, 2j) is determined as the interpolation origin β, when the designated calculation target color is the G-color, the designated upper address (X, Y) is expressed in the form of (2i+1, 2j), and the designated lower address (x, y) meets the condition, y≦x, the position of the lattice point indicated by the address (2i+2, 2j−1) is determined as the interpolation origin β, when the designated calculation target color is the G-color, the designated upper address (X, Y) is expressed in the form of (2i+1, 2j), and the designated lower address (x, y) meets the condition, y>x, the position of the lattice point indicated by the address (2i+1, 2j) is determined as the interpolation origin β, when the designated calculation target color is the G-color, the designated upper address (X, Y) is expressed in the form of (2i, 2j+1), and the designated lower address (x, y) meets the condition, y≦x, the position of the lattice point indicated by the address (2i+1, 2j) is determined as the interpolation origin β, when the designated calculation target color is the G-color, the designated upper address (X, Y) is expressed in the form of (2i, 2j+1), and the designated lower address (x, y) meets the condition, y>x, the position of the lattice point indicated by the address (2i, 2j+1) is determined as the interpolation origin β, when the designated calculation target color is the G-color, the designated upper address (X, Y) is expressed in the form of (2i+1, 2j+1), and the designated lower address (x, y) meets the condition, y≦−x+1, the position of the lattice point indicated by the address (2i+1, 2j) is determined as the interpolation origin β, and when the designated calculation target color is the G-color, the designated upper address (X, Y) is expressed in the form of (2i+1, 2j+1), and the designated lower address (x, y) meets the condition, y>−x+1, the position of the lattice point indicated by the address (2i+2, 2j+1) is determined as the interpolation origin β.

The interpolation reference frame that has thus been determined by the interpolation reference frame determining unit 150 is transmitted to the interpolation calculation unit 130. Actually, because the interpolation reference frame can be specified by the interpolation origin β(X*, Y*), it suffices to transmit just the address (X*, Y*) that indicates the interpolation origin β(X*, Y*) to the interpolation calculation unit 130. The address values X and Y of the position origin α(X, Y) and the address values X* and Y* of the interpolation origin β(X*, Y*) may be matched or may differ according to each individual variation as shown in FIG. 30.

(5) Interpolation Proportion Determining Unit 140

The interpolation proportion determining unit 140 has a function of determining the interpolation proportions that are necessary for performing the interpolation calculation process of the color designated by the calculation target color determining unit 160. Here, as was mentioned above, the interpolation proportion is the value corresponding to the x shown in FIG. 7 in the case of a one-dimensional image. That is, when the distance between a pair of reference pixels P(0) and P(1) that sandwich an interpolation point Q is 1, the interpolation proportion corresponds to being the distance between one reference pixel P(0) and the interpolation point Q. The interpolation proportion thus basically takes on a numerical value between 0 and 1. In the case of a two-dimensional image, an interpolation proportion is necessary for each of two orthogonal directions. FIG. 9 shows an example of a high-order interpolation process using a total of 16 pixels 1 to 16 for an interpolation point Q, and here, the distance in the horizontal direction of the interpolation point Q from the pixel 6 (interpolation origin β) becomes an interpolation proportion d* and the distance in the vertical direction becomes an interpolation proportion e*.

In order to determine the interpolation proportions d* and e*, the interpolation proportion determining unit 140 first determines the distances d and e in the two directions of the interpolation point Q with respect to the interpolation origin β. That is, when the direction parallel to a first "pair of opposing sides" that constitute the interpolation reference frame determined by the interpolation reference frame determining unit 150 is set as a first direction, and the direction parallel to a second "pair of opposing sides" is set as a second direction, the distance d between the interpolation origin β and the interpolation point Q in regard to the first direction and the distance e in regard to the second direction are determined based on the upper address (X, Y) and the lower address (x, y) of the interpolation point Q.

With the Bayer pattern array embodiment described here, for each of the R and B colors, because one pair of opposing sides among the four sides of the interpolation reference frame are parallel to the X-axis and the remaining pair of opposing sides are parallel to the Y-axis, the first direction is the X-axis direction and the second direction is the Y-axis direction. Also because the upper left vertex of this interpolation reference frame is the interpolation origin β and the lower address (x, y) is the address on the local xy coordinate system having the interpolation origin β as the coordinate origin, in the case of each of the R and B colors, the distances d and e can be determined by performing a correction of adding the offset amount 1 as necessary to the value of x or y as shown in FIG. 28. As was described with reference to FIG. 28, how the correction of adding the offset amount is to be performed can be determined by judging the evenness/oddness of each of the values X and Y of the upper address (X, Y).

Meanwhile, for the G color, because the first direction D and the second direction E are inclined diagonally at 45° with respect to the XY coordinate system, in order to determine the distance d in the first direction D of the interpolation point Q with respect to the interpolation origin β and the distance e in the second direction E, conversions by the conversion equations described with reference to FIGS. 15 and 29 and corrections of adding an offset amount as necessary upon judging the evenness/oddness of each of the values X and Y of the upper address (X, Y) are needed.

When the distances d and e concerning the two directions of the interpolation point Q with respect to the interpolation origin β have thus been determined, normalization based on the length of one side of the interpolation reference frame (the pitch of the reference pixels used in the interpolation) must then be performed according to each color. That is, as mentioned above, in the case of each of the R and B colors, because the pitch of the reference pixels is 2 as shown in FIG. 28, a normalization of multiplying by ½ is performed to determine the interpolation proportions d* and e* such that $d^*=d/2$ and $e^*=e/2$, and in the case of each of the G-color, because the pitch of the reference pixels is $\sqrt{2}$ as shown in FIG. 29, a normalization of multiplying by $1/\sqrt{2}$ is performed to determine the interpolation proportions d* and e* such that $d^*=d/\sqrt{2}$ and $e^*=e/\sqrt{2}$. The determined interpolation proportions d* and e* are transmitted to the interpolation calculation unit 130.

Preferably for practical purposes, a dedicated table for determining the interpolation proportions is prepared inside the interpolation proportion determining unit 140 and this table is referenced to calculate the interpolation proportions for each individual case.

Specifically, a portion of the table shown in FIG. 30 serves the role of this table. That is, by preparing the respective data of the "position origin," "detailed position," and "interpolation proportions" columns in the table shown in FIG. 30 as a table in the interpolation proportion determining unit 140, the interpolation proportions (d* and e*) can be determined for each color by referencing this table. As mentioned above, the data of the "position origin" column in the table of FIG. 30 correspond to the upper address (X, Y) of the interpolation point Q provided from the interpolation point designating unit 170, that is, correspond to the position origin α(X, Y) and are data that indicate the odd/even variations of the integer values X and Y. The interpolation proportion determining unit 140 can thus be made to determine the interpolation proportions d* and e* by using the four mutually different types of interpolation proportion determining equations according to whether the X in the upper address (X, Y), provided from the interpolation point designating unit 170, is even or odd and whether the Y is even or odd.

An example where the upper address (12, 28) and the lower address (0.7, 0.4) are provided shall now be considered. Because both X and Y, which constitute the upper address, are even, the present example corresponds to being the case of α(2i, 2j) in the table of FIG. 30 (here, i=6 and j=14). Because for the color R, $d^*=x/2$ and $e^*=y/2$ are determined as the interpolation proportion determining equations by referencing the table, by substituting x=0.7 and y=0.4, the interpolation proportions $d^*=0.35$ and $e^*=0.2$ are obtained. Also, for the color B, because $d^*=(x+1)/2$ and $e^*=(y+1)/2$ are determined as the interpolation proportion determining equations by referencing the table, by substituting x=0.7 and y=0.4, the interpolation proportions $d^*=0.85$ and $e^*=0.7$ are obtained. Meanwhile for the G-color, because the present case corresponds to the case of α(2i, 2j) and "y>−x+1" for the G-color in the table of FIG. 30 and $d^*=(y+x-1)/2$ and $e^*=(y-x+1)/2$ are determined as the interpolation proportion determining equations by referencing the table, by substituting x=0.7 and y=0.4, the interpolation proportions $d^*=0.05$ and $e^*=0.35$ are obtained.

To summarize the process by which the interpolation proportion determining unit 140 determines the interpolation proportions by referencing the table of FIG. 30, with i and j being integers, when the designated calculation target color is the R-color and the designated upper address (X, Y) is expressed in the form of (2i, 2j), the designated lower address (x, y) is used to perform the calculations, $d^*=x/2$ and $e^*=y/2$, to determine the respective interpolation proportions d* and e*, when the designated calculation target color is the R-color and the designated upper address (X, Y) is expressed in the form of (2i+1, 2j), the designated lower address (x, y) is used to perform the calculations, $d^*=(x+1)/2$ and $e^*=y/2$, to determine the respective interpolation proportions d* and e*, when the designated calculation target color is the R-color and the designated upper address (X, Y) is expressed in the form of (2i, 2j+1), the designated lower address (x, y) is used to perform the calculations, $d^*=x/2$ and $e^*=(y+1)/2$, to determine the respective interpolation proportions d* and e*, when the designated calculation target color is the R-color and the designated upper address (X, Y) is expressed in the form of (2i+1, 2j+1), the designated lower address (x, y) is used to perform the calculations, $d^*=(x+1)/2$ and $e^*=(y+1)/2$, to determine the respective interpolation proportions d* and e*, when the designated calculation target color is the B-color and the designated upper address (X, Y) is expressed in the form of (2i, 2j), the designated lower address (x, y) is used to perform the calculations, $d^*=(x+1)/2$ and $e^*=(y+1)/2$, to determine the respective interpolation proportions $d^*$ and $e^*$, when the designated calculation target color is the B-color and the designated upper address (X, Y) is expressed in the form of $(2i+1, 2j)$, the designated lower address (x, y) is used to perform the calculations, $d^*=x/2$ and $e^*=(y+1)/2$, to determine the respective interpolation proportions $d^*$ and $e^*$, when the designated calculation target color is the B-color and the designated upper address (X, Y) is expressed in the form of $(2i, 2j+1)$, the designated lower address (x, y) is used to perform the calculations, $d^*=(x+1)/2$ and $e^*=y/2$, to determine the respective interpolation proportions $d^*$ and $e^*$, when the designated calculation target color is the B-color and the designated upper address (X, Y) is expressed in the form of $(2i+1, 2j+1)$, the designated lower address (x, y) is used to perform the calculations, $d^*=x/2$ and $e^*=y/2$, to determine the respective interpolation proportions $d^*$ and $e^*$, when the designated calculation target color is the G-color, the designated upper address (X, Y) is expressed in the form of $(2i, 2j)$, and the designated lower address (x, y) meets the condition, $y \leq -x+1$, the designated lower address (x, y) is used to perform the calculations, $d^*=(y+x+1)/2$ and $e^*=(y-x+1)/2$, to determine the respective interpolation proportions $d^*$ and $e^*$, when the designated calculation target color is the G-color, the designated upper address (X, Y) is expressed in the form of $(2i, 2j)$, and the designated lower address (x, y) meets the condition, $y>-x+1$, the designated lower address (x, y) is used to perform the calculations, $d^*=(y+x-1)/2$ and $e^*=(y-x+1)/2$, to determine the respective interpolation proportions $d^*$ and $e^*$, when the designated calculation target color is the G-color, the designated upper address (X, Y) is expressed in the form of $(2i+1, 2j)$, and the designated lower address (x, y) meets the condition, $y \leq x$, the designated lower address (x, y) is used to perform the calculations, $d^*=(y+x)/2$ and $e^*=(y-x+2)/2$, to determine the respective interpolation proportions $d^*$ and $e^*$, when the designated calculation target color is the G-color, the designated upper address (X, Y) is expressed in the form of $(2i+1, 2j)$, the designated lower address (x, y) meets the condition, $y>x$, the designated lower address (x, y) is used to perform the calculations, $d^*=(y+x)/2$ and $e^*=(y-x)/2$, to determine the respective interpolation proportions $d^*$ and $e^*$, when the designated calculation target color is the G-color, the designated upper address (X, Y) is expressed in the form of $(2i, 2j+1)$, and the designated lower address (x, y) meets the condition, $y \leq x$, the designated lower address (x, y) is used to perform the calculations, $d^*=(y+x)/2$ and $e^*=(y-x+2)/2$, to determine the respective interpolation proportions $d^*$ and $e^*$, when the designated calculation target color is the G-color, the designated upper address (X, Y) is expressed in the form of $(2i, 2j+1)$, and the designated lower address (x, y) meets the condition, $y>x$, the designated lower address (x, y) is used to perform the calculations, $d^*=(y+x)/2$ and $e^*=(y-x)/2$, to determine the respective interpolation proportions $d^*$ and $e^*$, when the designated calculation target color is the G-color, the designated upper address (X, Y) is expressed in the form of $(2i+1, 2j+1)$, and the designated lower address (x, y) meets the condition, $y \leq -x+1$, the designated lower address (x, y) is used to perform the calculations, $d^*=(y+x+1)/2$ and $e^*=(y-x+1)/2$, to determine the respective interpolation proportions $d^*$ and $e^*$, and when the designated calculation target color is the G-color, the designated upper address (X, Y) is expressed in the form of $(2i+1, 2j+1)$, and the designated lower address (x, y) meets the condition, $y>-x+1$, the designated lower address (x, y) is used to perform the calculations, $d^*=(y+x-1)/2$ and $e^*=(y-x+1)/2$, to determine the respective interpolation proportions $d^*$ and $e^*$.

As described above, the interpolation proportion determining unit 140 and the interpolation reference frame determining unit 150 can serve the respective functions by respectively referencing predetermined tables, and for practical use, separate tables do not have to be prepared respectively in the interpolation proportion determining unit 140 and the interpolation reference frame determining unit 150 and it suffices that the table shown in FIG. 30 be stored in some location inside a computer and the same table be used in common by the interpolation proportion determining unit 140 and the interpolation reference frame determining unit 150. Because the equal signs in the judgment formulae for making the conditional judgments concerning the lower address (x, y) in the table of FIG. 30 are for determining how an interpolation point Q on a boundary line is to be handled, an equal sign may be used in either of judgment formulae that form a pair. Thus "<" may be used in place of the "≦" in each judgment formula, and "≧" may be used in place of the ">" in each judgment formula.

(6) Interpolation Calculation Unit 130

Lastly, the function of the interpolation calculation unit 130 shall be described. As described above, with respect to the interpolation calculation unit 130, the calculation target color designating unit 160 performs the designation of the calculation target color, the interpolation reference frame determining unit 150 provides information indicating the determined interpolation origin $\beta(X^*, Y^*)$ (that is, the information indicating the interpolation reference frame), and the interpolation proportion determining unit 140 provides the determined interpolation proportions $d^*$ and $e^*$. Based on these pieces of information, the interpolation calculation unit 130 executes the interpolation calculation process of determining the pixel value of the interpolation point Q in regard to the designated color.

Such an interpolation calculation process can be performed by reading, from among the pixel values of the individual pixels stored in the pixel storage unit 120, the pixel values of some reference pixels as interpolation reference values and performing a predetermined interpolation calculation using the read interpolation reference values and the interpolation proportions $d^*$ and $e^*$. Here, the reference pixels are always selected from among pixels of the designated interpolation target color. The interpolation calculation unit 130 thus determines the interpolation reference values that are to be read in consideration of the regular pattern of the pixel array of each color in the color image data to be subject to interpolation. With the embodiment described here, the interpolation calculation unit 130 determines the interpolation reference values that are to be read in consideration of the predetermined regular pattern based on the Bayer pattern array.

As to how many reference pixels are to be used to perform the interpolation calculation process for a single interpolation point Q can be selected as suited in accordance to the precision of the interpolation calculation. However, in the case of an interpolation process for a two-dimensional image, a minimum of four reference pixels are necessary. Also, as to which pixels are to be the reference pixels can be determined based on the interpolation reference frame (interpolation origin β), and as the abovementioned minimum of four reference pixels, the pixels positioned at the four vertices of the interpolation reference frame are selected. The interpolation calculation process executed by the interpolation calculation unit 130 can thus be said to be a process of reading at least the pixel values of the pixels positioned at the four vertices of the interpolation reference frame as the interpolation reference values from the pixel value storage unit 120 and performing the interpolation calculation based on these interpolation reference values and the interpolation proportions d* and e* to determine the pixel value of the interpolation point Q for each calculation target color.

The simplest example of interpolation using the minimum of four reference pixels is linear interpolation. In this case, the interpolation calculation unit 130 reads the pixel values of the pixels positioned at the four vertices of the interpolation reference frame as the interpolation reference values from the pixel value storage unit 120 and performs a linear interpolation calculation using the four pixel values and the interpolation proportions d* and e*. For example, in the case of the R-color, because the interpolation reference frame having the pixels 4, 5, 6, and 7 as the four vertices is determined for the interpolation point Q as shown in FIG. 13, these four pixels are handled as the reference pixels and the pixel values thereof are read. For example, if the respective pixel values that are read are f(4), f(5), f(6), and f(7), the pixel value f(Q) of the interpolation point Q can be determined by the following equation:

$$f(Q)=(f(4)\times(1-d^*)+f(5)\times d^*)\times(1-e^*)+(f(6)\times(1-d^*)+f(7)\times d^*)\times e^*.$$

To obtain an image of higher quality, a high-order interpolation is performed instead of a linear interpolation such as that described above. In Section 1, the high-order interpolation method called "four-point referencing bi-cubic spline interpolation" was described and it was mentioned there that a total of 16 reference pixels are required to apply this method to a two-dimensional image. If a high-order interpolation process using this method is to be performed at the interpolation calculation unit 130, the pixel values of pixels positioned at a total of 16 vertices, that is, the four vertices of the interpolation reference frame and twelve vertices in the surroundings of the interpolation reference frame, are read as the interpolation reference values from the pixel value storage unit 120 and the high-order interpolation calculation described in Section 1 is performed based on these 16 pixel values and the interpolation proportions d* and e*. For example, for the interpolation point Q shown in FIG. 13, the total of 16 R-color pixels, contained in the lattice having the pixels 1 and 3 as opposite corners, are used as reference pixels and the pixels values thereof are read in the case of the R color. If interpolation of a higher order is to be performed, an interpolation process, which uses a total of 36 R-color pixels, contained within a lattice that is of a larger size, as the reference pixels, can be performed.

Once the interpolation method to be employed is determined, the positions of the reference pixels are determined by a simple calculation based on the position of the interpolation origin β. For example, in the case of a Bayer pattern array, because the R-color pixels are arrayed in the manner shown in FIG. 13, if a simple linear interpolation method using four reference pixels is to be employed, the pixel (the illustrated pixel 5) at the position of (X*+2, Y*), the pixel (the illustrated pixel 6) at the position of (X*, Y*+2) and the pixel (the illustrated pixel 7) at the position of (X*+2, Y*+2) are determined along with the interpolation origin β(X*, Y*) (the illustrated pixel 4) as the reference pixels and the respective pixel values of these pixels are read.

<<<Section 6. Modification Examples of the Present Invention>>>

Lastly, modification examples of the interpolation device according to the present invention shall be described.

Figure 31:
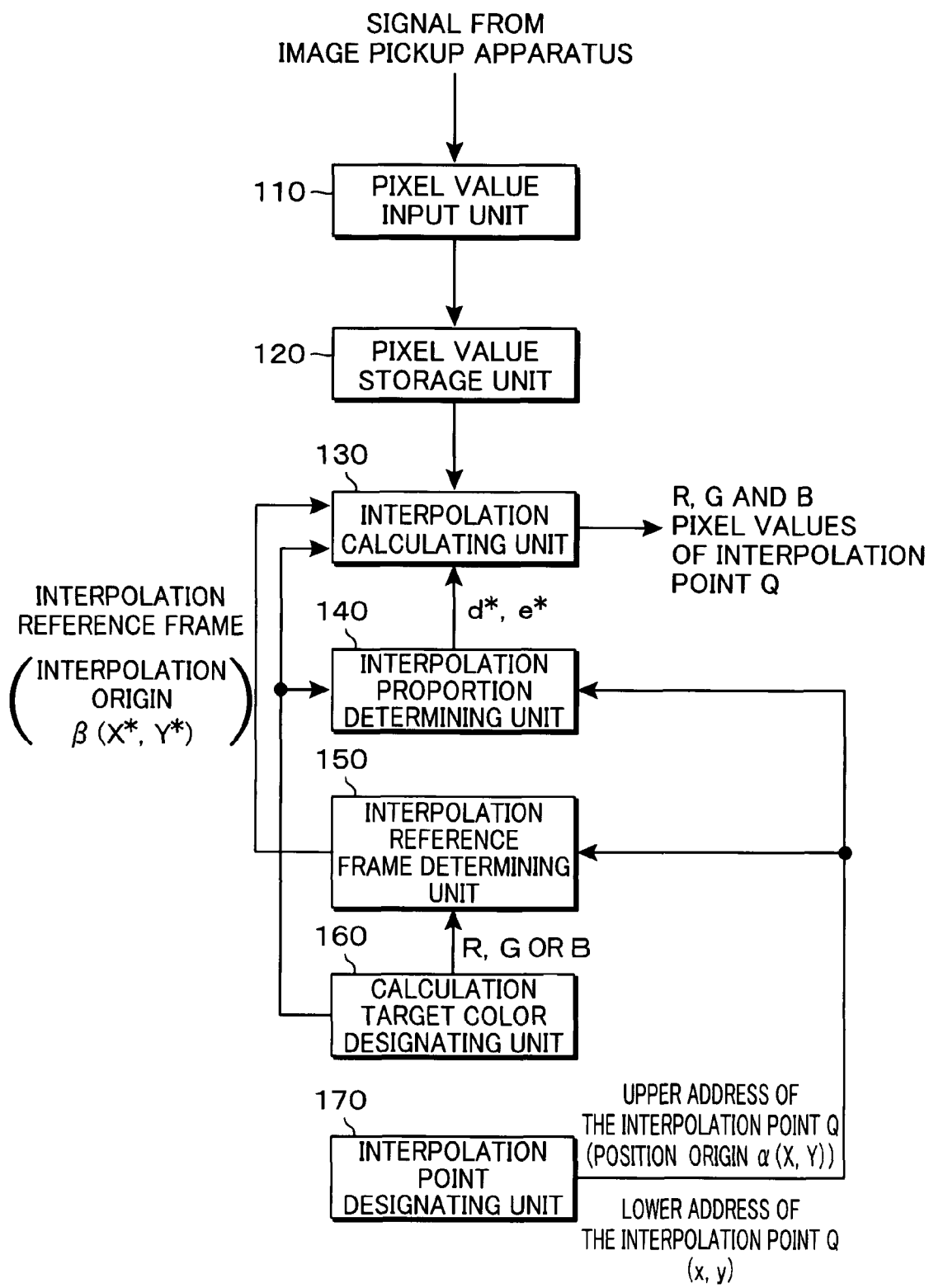
FIG. 31 is a block diagram of a basic arrangement of the interpolation device according to the present invention.

(1) Method of Performing Interpolation Upon Dividing the Pixel Array According to Each Color With the interpolation device shown in FIG. 31, the pixel array, taken in from the pixel value input unit 110, is stored as it is in the pixel value storage unit 120. Thus in the case of a Bayer pattern array for the three primary colors, R, G, and B, a pixel array such as that shown in FIG. 16 is stored in the pixel value storage unit 120, and the interpolation calculation unit 130 performs an interpolation calculation upon reading the pixel values of the necessary reference pixels from such a pixel array.

However, in an actual interpolation calculation, only the pixels of the specific color designated by the calculation target color designating unit 160 are used as the reference pixels, and pixels of the other colors are not used at all. Thus even if arrangements are made so that when in storing the color image data in the pixel value storage unit 120, data are stored separately according to each individual color, the interpolation calculation is enabled in principle. The modification example described here is an embodiment that employs a method of performing interpolation upon dividing the pixel array according to each color.

Figure 32A:
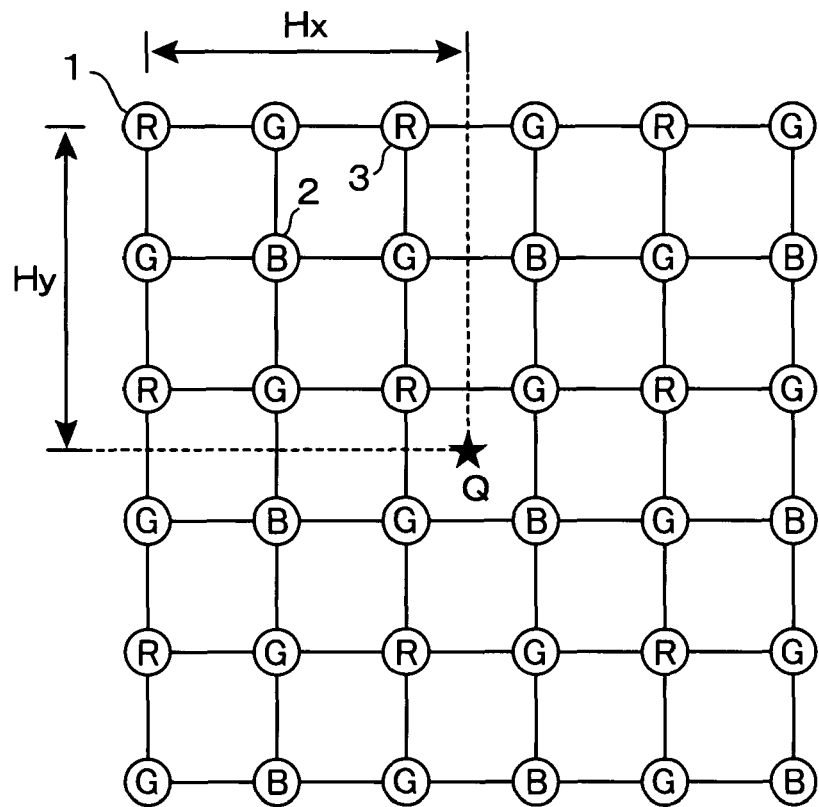
FIGS. 32A-32C are plan views showing how the R-color and the B-color are handled in another embodiment according to the present invention.
Figure 32B:
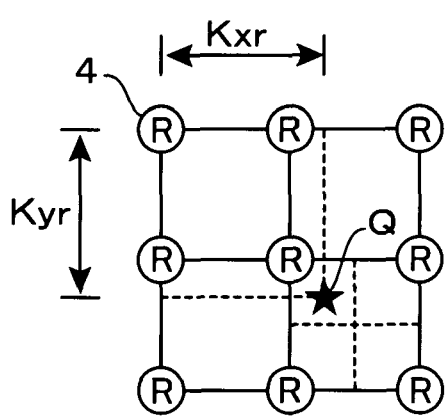
Figure 32C:
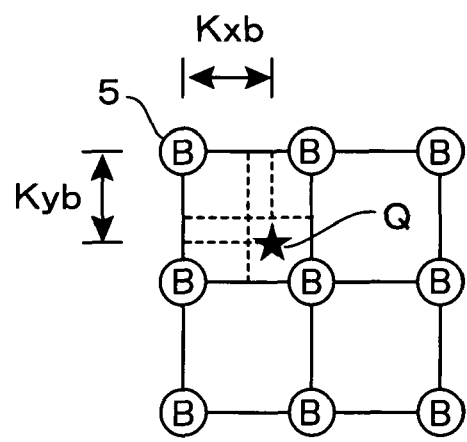
Figure 33:
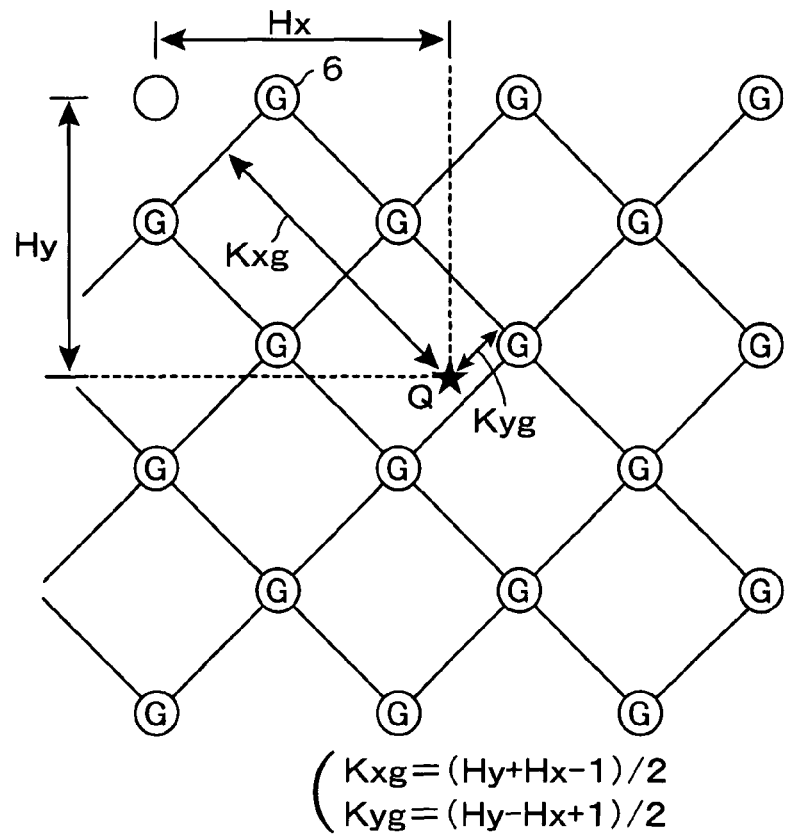
FIG. 33 is a plan view showing how the G-color is handled in the other embodiment according to the present invention.

In this case, first, the image input unit 110 is arranged to execute, in inputting the individual pixel values, a process of extracting only the pixel values of a specific color and repositioning these pixel values at the positions of the respective lattice points of a new square lattice. Here, for the sake of description, a simple model, in which pixels of a Bayer pattern array of six rows and six columns, such as shown in FIG. 32A, are input as color image data, shall be described as an example. Although as shown in FIG. 32A, the original pixel array that the image input unit 110 inputs from the image pickup apparatus is one in which the three primary colors R, G, and B are mixed, in the process of storing this into the pixel value storage unit 120, a process of dividing the array according to each color and generating new pixel arrays respectively is performed. Specifically, for the R-color, only the R-color pixels are extracted from the pixel array shown in FIG. 32A and by repositioning these at positions of the respective lattice points of a new square lattice, a pixel array of three rows and three columns is formed as shown in FIG. 32B. Likewise, for the B color, only the B-color pixels are extracted from the pixel array shown in FIG. 32A and by repositioning these at positions of the respective lattice points of a new square lattice, a pixel array of three rows and three columns is formed as shown in FIG. 32C. Meanwhile, for the G-color, only the G-color pixels are extracted from the pixel array shown in FIG. 32A and by repositioning these at positions of the respective lattice points of a new square lattice, a pixel array of three rows and three columns is formed as shown in FIG. 33. As a result, the pixel values of the respective individual colors are respectively stored as pixel value arrays according to each individual color in the pixel value storage unit 120.

In performing the interpolation calculation process for the R-color, the interpolation calculation unit 130 executes a process of selecting reference pixels from the pixel array for the R-color inside the pixel value storage unit 120 that is shown in FIG. 32B and reading the pixel values, and in performing the interpolation calculation process for the B-color, the interpolation calculation unit 130 executes a process of selecting reference pixels from the pixel array for the B-color inside the pixel value storage unit 120 that is shown in FIG. 32C and reading the pixel values, and in performing the interpolation calculation process for the G-color, the interpolation calculation unit 130 executes a process of selecting reference pixels from the pixel array for the G-color inside the pixel value storage unit 120 that is shown in FIG. 33 and reading the pixel values.

However, because a pixel array is prepared on a new square lattice for each color, the original pixel array and the newly prepared pixel array differ in pixel pitch. Thus when the position of the interpolation point Q has been defined by an address on the original pixel array, normalization must be performed according to the difference in pixel pitch. Also, for the B-color and G-color, offset amounts concerning the position of the interpolation point Q must be taken into consideration.

For example, when a pixel 1 at the upper left is used as a reference point, the interpolation point Q on the original pixel array shown in FIG. 32A can be defined as a point at a position of a distance Hx in the lateral direction and a distance Hy in the vertical direction. However, on the pixel array for the R-color shown in FIG. 32B, the corresponding interpolation point Q is a point at a position of a distance Kxr in the lateral direction and a distance Kyr in the vertical direction when a pixel 4 at the upper left is used as a reference point. This is because, whereas in the original pixel array shown in FIG. 32A, the R-color pixel 1 and an R-color pixel 3 are separated by just a pitch of 2, in the pixel array for the R-color shown in FIG. 32B, the interval between adjacent R-color pixels is reduced to a pitch of 1. The relationships, Kxr=Hx/2 and Kyr=Hy/2 thus hold, and on the pixel array for the R-color, a conversion process based on these relationships must be applied to the address values of the interpolation point Q, the position of which has been defined on the original pixel array.

Likewise, on the pixel array for the B-color shown in FIG. 32C, the corresponding interpolation point Q is a point at a position of a distance Kxb in the lateral direction and a distance Kyb in the vertical direction when a pixel 5 at the upper left is used as a reference point. The causes of this are that in addition to the interval between adjacent B-color pixels being reduced to a pitch of 1, a position of the R-color pixel 1 and a position of the B-color pixel 2 are shifted in the vertical and lateral directions by 1 pitch respectively as shown in FIG. 32A. That is, because the R-color pixel 4 shown in FIG. 32B, is a result of repositioning the R-color pixel 1, shown in FIG. 32A, at the upper left position on the new square lattice, and the B-color pixel 5, shown in FIG. 32C, is a result of repositioning the B-color pixel 2, shown in FIG. 32A, at the upper left position on the new square lattice, there are offsets of 1 pitch each in the vertical and lateral directions between the two. The relationships, Kxb=(Hx−1)/2 and Kyb=(Hy−1)/2 thus hold, and on the pixel array for the B-color, a conversion process based on these relationships must be applied to the address values of the interpolation point Q, the position of which has been defined on the original pixel array.

Also, with the pixel array for the G-color, shown in FIG. 33, the corresponding interpolation point Q is a point at a position of a distance Kxg in the lateral direction and a distance Kyg in the vertical direction with respect to a G-color pixel 6 at the upper left when the G-color pixels are repositioned on an array that is rotated counterclockwise by 45°. The relationships, Kxg=(Hy+Hx−1)/2 and Kyg=(Hy−Hx+1)/2 thus hold (conversion equation based on the geometric conversion mentioned in FIG. 15), and on the pixel array for the G-color, a conversion process based on these relationships must be applied to the address values of the interpolation point Q, the position of which has been defined on the original pixel array.

Thus with the modification example described here, the interpolation reference frame determining unit 150 is arranged to execute conversion processes to make the upper address (X, Y) and the lower address (x, y), designated by the interpolation point designating unit 170, compatible to the pixel arrays for the respective individual colors that are stored in the pixel value storage unit 120 and to determine interpolation reference frames using the respective converted addresses, and the interpolation proportion determining unit 140 is arranged to execute conversion processes to make the upper address (X, Y) and the lower address (x, y), designated by the interpolation point designating unit 170, compatible to the pixel arrays for the respective individual colors that are stored in the pixel value storage unit 120 and to determine the interpolation proportions using the respective converted addresses.

(2) Methods of Using Other Pixel Arrays

Figure 34:
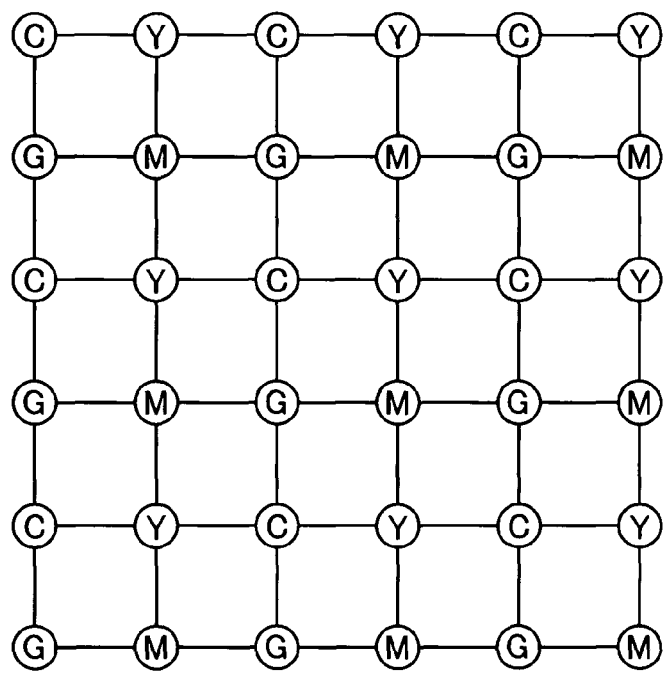
FIG. 34 is a plan view of an example of an array of light receiving elements for four colors.

Although the embodiments that have been described thus far are for pixel arrays that take on the form of Bayer pattern arrays of the three primary colors R, G, and B, the interpolation device according to the present invention is not restricted in application to such a pixel array and can be applied to other Bayer pattern arrays as well. For example, FIG. 34 is a plan view of a four-color Bayer pattern array example of light receiving elements for the four colors of cyan (C), magenta (M), yellow (Y), and green (G). Even in the case of such a pixel array, because the pixels of each individual color are positioned periodically according to a predetermined regular pattern and a table similar to that of FIG. 30 can be defined, the present invention can be applied in the same manner as in the embodiments described thus far.

Needless to say, pixel arrays to which the present invention is applicable are not necessarily restricted to Bayer pattern arrays. That is, the present invention is widely applicable to an interpolation device that determines pixel values of m types of colors of an interpolation point Q at any position on an XY coordinate system by interpolation calculation based on individual pixel values obtained by an image pickup apparatus, in which a total of m types of optical elements, each having functions of detecting, in regard to a received light, a light amount of a specific color and outputting the light amount as a pixel value, are respectively positioned periodically according to predetermined regular patterns at positions of specific lattice points on a square lattice defined on the XY coordinate system.

What is claimed is:

1. An interpolation device that determines pixel values of m types of colors of an interpolation point Q at any position on an XY coordinate system by interpolation calculation based on individual pixel values obtained by an image pickup apparatus, in which a total of m types of light receiving elements, each having functions of detecting, in regard to a received light, a light amount of a specific color and outputting the light amount as a pixel value, are respectively positioned periodically according to predetermined regular patterns at positions of specific lattice points on a square lattice defined on the XY coordinate system, the interpolation device comprising:

a pixel value input unit that inputs the pixel values output from the individual light receiving elements that constitute the image pickup apparatus;

a pixel value storage unit that stores the input pixel values in a form of a pixel value array, with which the pixel values are associated with positions of respective lattice points;

an interpolation point designating unit that, in regard to the interpolation point Q for which pixel values are to be determined by interpolation calculation, determines a smallest square which contains the interpolation point Q and whose four vertices are constituted by the lattice points, as a position reference frame, determines, as a position origin α, a vertex, which, among the four vertices constituting the position reference frame, occupies a relative position that has been determined in advance, and designates a position of the interpolation point Q by an upper address (X, Y) that indicates a position of the position origin α in the square lattice and a lower address (x, y) that indicates the position of the interpolation point Q in an xy coordinate system defined as a local coordinate system inside the position reference frame;

a calculation target color designating unit that designates one of the m types of colors in turn as a calculation target color for which a pixel value is to be computed;

an interpolation reference frame determining unit that uses the upper address (X, Y) and the lower address (x, y) and a regular pattern of the calculation target color designated by the calculation target color designating unit to determine an interpolation reference frame, formed of a smallest square which contains the interpolation point Q and whose four vertices are constituted by lattice points, at which are positioned pixels corresponding to light receiving elements having a function of detecting the calculation target color, and determining, as an interpolation origin β, a vertex, which, among the four vertices forming the interpolation reference frame, occupies a relative position that has been determined in advance;

an interpolation proportion determining unit that, when a direction parallel to a first pair of opposing sides that constitute the interpolation reference frame is set as a first direction and a direction parallel to a second pair of opposing sides is set as a second direction, determines a distance d between the interpolation origin β and the interpolation point Q in regard to the first direction and a distance e in regard to the second direction on a basis of the upper address (X, Y) and the lower address (x, y) and determines values d* and e*, with which the determined distances d and e are normalized by a length of a side of the interpolation reference frame, respectively as an interpolation proportion in regard to the first direction and an interpolation proportion in regard to the second direction; and an interpolation calculation unit that reads the pixel values of at least the light receiving elements positioned at the four vertices of the interpolation reference frame as interpolation reference values from the pixel value storage unit and performs an interpolation calculation based on the interpolation reference values and the interpolation proportions d* and e* to determine a pixel value of the interpolation point Q for each calculation target color.

2. The interpolation device according to claim 1, wherein the interpolation point designating unit uses integer portions of coordinate values, on the XY coordinate system, of the interpolation point Q as the upper address (X, Y) and uses decimal portions of the coordinate values as the lower address (x, y), wherein vertical and lateral lattice intervals of the square lattice defined on the XY coordinate system are set to 1.

3. The interpolation device according to claim 2, wherein the interpolation point designating unit automatically designates, on a basis of vertical direction and lateral direction magnification factors provided from an exterior, a plurality of interpolation points Q, for each of which interpolation calculation is required, at pitches that are an inverse of the magnification factors.

4. The interpolation device according to claim 2, wherein the interpolation reference frame determining unit determines the interpolation origin β using one of four mutually different interpolation origin determining algorithms according to whether X in the designated upper address (X, Y) is even or odd and whether Y in the designated upper address (X, Y) is even or odd.

5. The interpolation device according to claim 1, wherein the interpolation reference frame determining unit determines the interpolation reference frame using the upper address (X, Y) when the calculation target color is designated to be a color having a pixel array, with which is formed an interpolation reference frame having respective sides that are parallel to the lattice line of the square lattice, and determines the interpolation reference frame using both the upper address (X, Y) and the lower address (x, y) when the calculation target color is designated to be a color having a pixel array, with which is formed an interpolation reference frame having respective sides that are not parallel to the lattice lines of the square lattice.

6. The interpolation device according to claim 1, wherein the interpolation reference frame determining unit selects, from among vertices of the smallest Y coordinate value among the four vertices forming the interpolation reference frame, a vertex of the smallest X coordinate value and determines a selected vertex as the interpolation origin β.

7. The interpolation device according to claim 1, wherein the interpolation reference frame determining unit uses a predetermined regular pattern based on a Bayer pattern array to determine the interpolation reference frame, and the interpolation calculating unit determines the interpolation reference values to be read by taking into consideration the predetermined regular pattern based on the Bayer pattern array.

8. The interpolation device according to claim 7, wherein in regard to three primary colors R, G, and B, a Bayer pattern array, with which odd-number rows have an RGRGRGRGR . . . arrangement and even-number rows have a GBGBGBGBGB . . . arrangement, is used.

9. The interpolation device according to claim 8, wherein the interpolation point designating unit uses integer portions of coordinate values, on the XY coordinate system, of the interpolation point Q as the upper address (X, Y) and uses decimal portions of the coordinate values as the lower address (x, y), wherein vertical and lateral lattice intervals of the square lattice defined on the XY coordinate system are set to 1.

10. The interpolation device according to claim 9, wherein when i and j are integers, the interpolation reference frame determining unit determines a position of a lattice point indicated by an address (2i, 2j) as the interpolation origin β when the designated calculation target color is the R-color and the designated upper address (X, Y) is expressed in a form of (2i, 2j), determines a position of a lattice point indicated by the address (2i, 2j) as the interpolation origin β when the designated calculation target color is the R-color and the designated upper address (X,Y) is expressed in a form of (2i+1, 2j), determines a position of a lattice point indicated by the address (2i, 2j) as the interpolation origin β when the designated calculation target color is the R-color and the designated upper address (X,Y) is expressed in a form of (2i, 2j+1), determine a position of a lattice point indicated by the address (2i, 2j) as the interpolation origin β when the designated calculation target color is the R-color and the designated upper address (X,Y) is expressed in a form of (2i+1, 2j+1), determines a position of a lattice point indicated by an address (2i−1, 2j−1) as the interpolation origin β when the designated calculation target color is the B-color and the designated upper address (X, Y) is expressed in a form of (2i, 2j), determines a position of a lattice point indicated by an address (2i+1, 2j+1) as the interpolation origin β when the designated calculation target color is the B-color and the designated upper address (X, Y) is expressed in a form of (2i+1, 2j), determines a position of a lattice point indicated by an address (2i−1, 2j−4−1) as the interpolation origin β when the designated calculation target color is the B-color and the designated upper address (X, Y) is expressed in a form of (2i, 2j+1), determines a position of a lattice point indicated by an address (2i+1, 2j+1) as the interpolation origin β when the designated calculation target color is the B-color and the designated upper address (X, Y) is expressed in a form of (2i+1, 2j+1), determines a position of a lattice point indicated by an address (2i, 2j−1) as the interpolation origin β when the designated calculation target color is the G-color, the designated upper address (X,Y) is expressed in a form of (2i, 2j), and the designated lower address (x, y) meets a condition, y≦−x+1, determines a position of a lattice point indicated by an address (2i+1, 2j) as the interpolation origin β when the designated calculation target color is the G-color, the designated upper address (X,Y) is expressed in a form of (2i, 2j), and the designated lower address (x, y) meets a condition, y>−x+1, determines a position of a lattice point indicated by an address (2i+2, 2j−1) as the interpolation origin β when the designated calculation target color is the G-color, the designated upper address (X,Y) is expressed in a form of (2i+1, 2j), and the designated lower address (x, y) meets a condition, y≦x, determines a position of a lattice point indicated by the address (2i+1, 2j) as the interpolation origin β when the designated calculation target color is the G-color, the designated upper address (X,Y) is expressed in a form of (2i+1, 2j), and the designated lower address (x, y) meets a condition, y>x, determines a position of a lattice point indicated by the address (2i+1, 2j) as the interpolation origin β when the designated calculation target color is the G-color, the designated upper address (X,Y) is expressed in a form of (2i, 2j+1), and the designated lower address (x, y) meets a condition, y≦x, determines a position of a lattice point indicated by the address (2i, 2j+1) as the interpolation origin β when the designated calculation target color is the G-color, the designated upper address (X,Y) is expressed in a form of (2i, 2j+1), and the designated lower address (x, y) meets a condition, y>x, determines a position of a lattice point indicated by the address (2i+1, 2j) as the interpolation origin β when the designated calculation target color is the G-color, the designated upper address (X,Y) is expressed in a form of (2i+1, 2j+1), and the designated lower address (x, y) meets a condition, y≦−x+1, and determines a position of a lattice point indicated by the address (2i+2, 2j+1) as the interpolation origin β when the designated calculation target color is the G-color, the designated upper address (X,Y) is expressed in a form of (2i+1, 2j+1), and the designated lower address (x, y) meets a condition, y>−x+1.

11. The interpolation device according to claim 9, wherein when i and j are integers, the interpolation proportion determining unit determines the respective interpolation proportions d* and e* by using the designated lower address (x, y) to perform calculations, d*=x/2 and e*=y/2, when the designated calculation target color is the R-color and the designated upper address (X,Y) is expressed in a form of (2i, 2j), determines the respective interpolation proportions d* and e* by using the designated lower address (x, y) to perform calculations, d*=(x+1)/2 and e*=y/2, when the designated calculation target color is the R-color and the designated upper address (X,Y) is expressed in a form of (2i+1, 2j), determines the respective interpolation proportions d* and e* by using the designated lower address (x, y) to perform calculations, d*=x/2 and e*=(y+1)/2, when the designated calculation target color is the R-color and the designated upper address (X,Y) is expressed in a form of (2i, 2j+1), determines the respective interpolation proportions d* and e* by using the designated lower address (x, y) to perform calculations, d*=(x+1)/2 and e*=(y+1)/2, when the designated calculation target color is the R-color and the designated upper address (X, Y) is expressed in a form of (2i+1, 2j+1), determines the respective interpolation proportions d* and e* by using the designated lower address (x, y) to perform calculations, d*=(x+1)/2 and e*=(y+1)/2, when the designated calculation target color is the B-color and the designated upper address (X, Y) is expressed in a form of (2i, 2j), determines the respective interpolation proportions d* and e* by using the designated lower address (x, y) to perform calculations, d*=x/2 and e*=(y+1)/2, when the designated calculation target color is the B-color and the designated upper address (X,Y) is expressed in a form of (2i+1, 2j), determines the respective interpolation proportions d and e by using the designated lower address (x, y) to perform calculations, d*=(x+1)/2 and e*=y/2, when the designated calculation target color is the B-color and the designated upper address (X,Y) is expressed in a form of (2i, 2j+1), determines the respective interpolation proportions d* and e* by using the designated lower address (x, y) to perform calculations, d*=x/2 and e*=y/2, when the designated calculation target color is the B-color and the designated upper address (X,Y) is expressed in a form of (2i+1, 2j+1), determines the respective interpolation proportions d* and e* by using the designated lower address (x, y) to perform calculations, d*=(y+x+1)/2 and e*=(y−x+1)/2, when the designated calculation target color is the G-color, the designated upper address (X, Y) is expressed in a form of (2i, 2j), and the designated lower address (x, y) meets a condition, y≦−x+1, determines the respective interpolation proportions d* and e* by using the designated lower address (x, y) to perform calculations, d*=(y+x−1)/2 and e* =(y−x+1)/2, when the designated calculation target color is the G-color, the designated upper address (X, Y) is expressed in a form of (2i, 2j), and the designated lower address (x, y) meets a condition, y>−x+1, determines the respective interpolation proportions d* and e* by using the designated lower address (x, y) to perform calculations, d*=(y+x)/2 and e*=(y−x+2)/2, when the designated calculation target color is the G-color, the designated upper address (X, Y) is expressed in a form of (2i+1, 2j), and the designated lower address (x, y) meets a condition, y ≦x, determines the respective interpolation proportions d* and e* by using the designated lower address (x, y) to perform calculations, d*=(y+x)/2 and e*=(y−x)/2, when the designated calculation target color is the G-color, the designated upper address (X, Y) is expressed in a form of (2i+1, 2j), and the designated lower address (x, y) meets a condition, y>x, determines the respective interpolation proportions d* and e* by using the designated lower address (x, y) to perform calculations, d*=(y+x)/2 and e*=(y−x+2)/2, when the designated calculation target color is the G-color, the designated upper address (X, Y) is expressed in a form of (2i, 2j+1), and the designated lower address (x, y) meets a condition, y ≦x, determines the respective interpolation proportions d* and e* by using the designated lower address (x, y) to perform calculations, d*=(y+x)/2 and e*=(y−x)/2, when the designated calculation target color is the G-color, the designated upper address (X, Y) is expressed in a form of (2i, 2j+1), and the designated lower address (x, y) meets a condition, y>x, determines the respective interpolation proportions d* and e* by using the designated lower address (x, y) to perform calculations, d*=(y+x+1)/2 and e*=(y−x+1)/2, when the designated calculation target color is the G-color, the designated upper address (X, Y) is expressed in a form of (2i+1, 2j+1), and the designated lower address (x, y) meets a condition, y≦−x+1, and determines the respective interpolation proportions d* and e* by using the designated lower address (x, y) to perform calculations, d*=(y+x−1)/2 and e* =(y−x+1)/2, when the designated calculation target color is the G-color, the designated upper address (X, Y) is expressed in a form of (2l+1, 2j+1), and the designated lower address (x, y) meets a condition, y>−x+1.

12. The interpolation device according to claim 10, wherein
in a portion or all of the cases in which a conditional judgment concerning the lower address (x, y) is made, "<" is used in place of the "≦" in the conditional formulae and ">" is used in place of the "≧" in the conditional formulae.

13. The interpolation device according to claim 1, wherein the interpolation calculation unit reads pixel values of light receiving elements positioned at four vertices of the interpolation reference frame as the interpolation reference values from the pixel value storage unit and performs a linear interpolation calculation based on four pixel values read and the interpolation proportions d* and e*.

14. The interpolation device according to claim 1, wherein the interpolation calculation unit reads pixel values of light receiving elements positioned at a total of sixteen vertices, with which twelve surrounding vertices in surroundings of four vertices of the interpolation reference frame are added to said four vertices, as the interpolation reference values from the pixel value storage unit and performs a high-order interpolation calculation based on sixteen pixel values read and the interpolation proportions d* and e*.

15. The interpolation device according to claim 1, wherein
the pixel value input unit executes, in inputting respective individual pixel values, a process of extracting only pixel values of a specific color and repositioning said pixel values at positions of respective lattice points of a new square lattice, the pixel value storage unit stores pixel values for each individual color as a pixel array according to each individual color, the interpolation reference frame determining unit executes conversion processes to make the upper address (X, Y) and the lower address (x, y), designated by the interpolation point designating unit, compatible to the pixel arrays for the respective individual colors and determines the interpolation reference frames using respective converted addresses, and the interpolation proportion determining unit executes conversion processes to make the upper address (X, Y) and the lower address (x, y), designated by the interpolation point designating unit, compatible to the pixel arrays for the respective individual colors and determines the interpolation proportions using respective converted addresses.

16. The interpolation device according to claim 11, wherein
in a portion or all of the cases in which a conditional judgment concerning the lower address (x, y) is made, "<" is used in place of the "≦" in the conditional formulae and ">" is used in place of the"≧" in the conditional formulae.

* * * * *